(12) United States Patent
Vetsuypens et al.

(10) Patent No.: US 11,300,860 B2
(45) Date of Patent: Apr. 12, 2022

(54) LASER DRIVER

(71) Applicant: BARCO N.V., Kortrijk (BE)

(72) Inventors: Arnout Vetsuypens, Ostend (BE); Nico Coulier, Zulte (BE)

(73) Assignee: BARCO N.V., Kortrijk (BE)

( * ) Notice: Subject to any disclaimer, the term of this patent is extended or adjusted under 35 U.S.C. 154(b) by 40 days.

(21) Appl. No.: 16/485,474

(22) PCT Filed: Feb. 19, 2018

(86) PCT No.: PCT/EP2018/054053
§ 371 (c)(1),
(2) Date: Aug. 13, 2019

(87) PCT Pub. No.: WO2018/150032
PCT Pub. Date: Aug. 23, 2018

(65) Prior Publication Data
US 2020/0218142 A1     Jul. 9, 2020

(30) Foreign Application Priority Data
Feb. 17, 2017 (GB) ...................... 1702649

(51) Int. Cl.
*G03B 21/20* (2006.01)
*H04N 9/31* (2006.01)

(52) U.S. Cl.
CPC ..... *G03B 21/2013* (2013.01); *G03B 21/2033* (2013.01); *G03B 21/2053* (2013.01);
(Continued)

(58) Field of Classification Search
CPC ............ G03B 21/2013; G03B 21/2033; G03B 21/2053; H04N 9/3155; H04N 9/3158; H04N 9/3161; H04N 9/3182
(Continued)

(56) References Cited

U.S. PATENT DOCUMENTS

| | | | |
|---|---|---|---|
| 2010/0328616 A1* | 12/2010 | Silverstein | H04N 9/73 353/31 |
| 2012/0050693 A1* | 3/2012 | Yanai | G03B 33/12 353/31 |

(Continued)

FOREIGN PATENT DOCUMENTS

| | | |
|---|---|---|
| CN | 101165762 A | 4/2008 |
| CN | 101352028 A | 1/2009 |

(Continued)

OTHER PUBLICATIONS

Chinese Office Action in corresponding Chinese Application 201880012568.1, dated Feb. 9, 2021.
(Continued)

*Primary Examiner* — Jerry L Brooks
(74) *Attorney, Agent, or Firm* — Hamre, Schumann, Mueller & Larson, P.C.

(57) ABSTRACT

A light projection system and method for generating an image with three primary colors having a module of first blue lasers, second lasers and a wavelength conversion element configured to emit light at a plurality of wavelengths after absorption of a light beam from the second lasers at an excitation wavelength, the output of the module being a combined light beam having a pre-defined chromaticity where the projector is calibrated so as to provide the pre-defined chromaticity of the combined beam over at least a range of laser drive current values to correct for non-linear performance of the wavelength conversion element.

20 Claims, 29 Drawing Sheets

(52) U.S. Cl.
CPC ......... *H04N 9/3155* (2013.01); *H04N 9/3158* (2013.01); *H04N 9/3161* (2013.01); *H04N 9/3182* (2013.01)

(58) Field of Classification Search
USPC .......................................................... 353/31
See application file for complete search history.

(56) References Cited

U.S. PATENT DOCUMENTS

| | | | |
|---|---|---|---|
| 2014/0192331 | A1 | 7/2014 | Toyooka |
| 2014/0312376 | A1 | 10/2014 | Wilcox et al. |
| 2015/0002823 | A1* | 1/2015 | Yan ........................ G03B 33/08 353/31 |
| 2016/0173837 | A1* | 6/2016 | Miyata ...................... F21V 5/10 353/31 |

FOREIGN PATENT DOCUMENTS

| | | |
|---|---|---|
| CN | 101897191 A | 11/2010 |
| CN | 102301722 A | 12/2011 |
| CN | 102714687 A | 10/2012 |
| CN | 102804784 A | 11/2012 |
| CN | 103348401 A | 10/2013 |
| CN | 104793453 A | 7/2015 |
| CN | 105204279 A | 12/2015 |
| CN | 105700279 A | 6/2016 |
| WO | 2016192221 A1 | 12/2016 |

OTHER PUBLICATIONS

International Preliminary Report on Patentability in corresponding PCT/EP2018/054053, dated Aug. 20, 2019.
International Search Report and Written Opinion in corresponding PCT/EP2018/054053, dated Aug. 3, 2018.
No et al., "U-LD-650543A 650nm Laser Diode Union Optronics Corp", Taoyuan County Taiwan (R.O.C., Dec. 31, 2008 (Dec. 31, 2008), XP055474150, Retrieved from the Internet: URL:http://www.uocnet.com/pdf/LD/U-LD-650543A., pdf p. 2, diagram optical output power v.s. foward current.
Office Action issued in corresponding Chinese application No. CN20188012568, dated Dec. 22, 2021, English translation is provided.
Communication issued in European Application No. 18710333.8-1020, dated Feb. 7, 2022.

* cited by examiner

Overview x chromaticity shift over brightness level on white image, reference at highest level, uncorrected Overview y chromaticity shift over brightness level on white image, reference at highest level, uncorrected

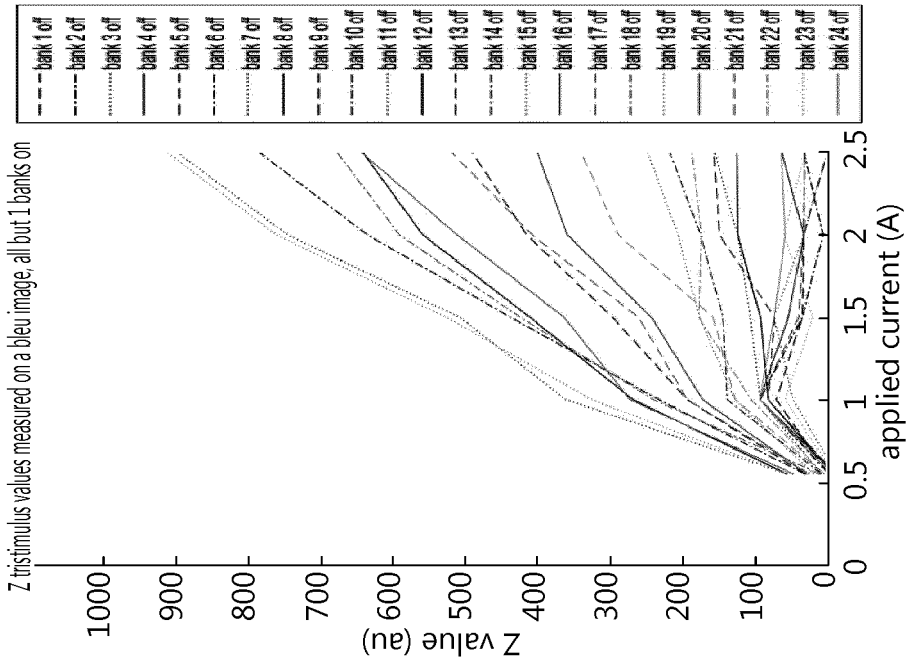
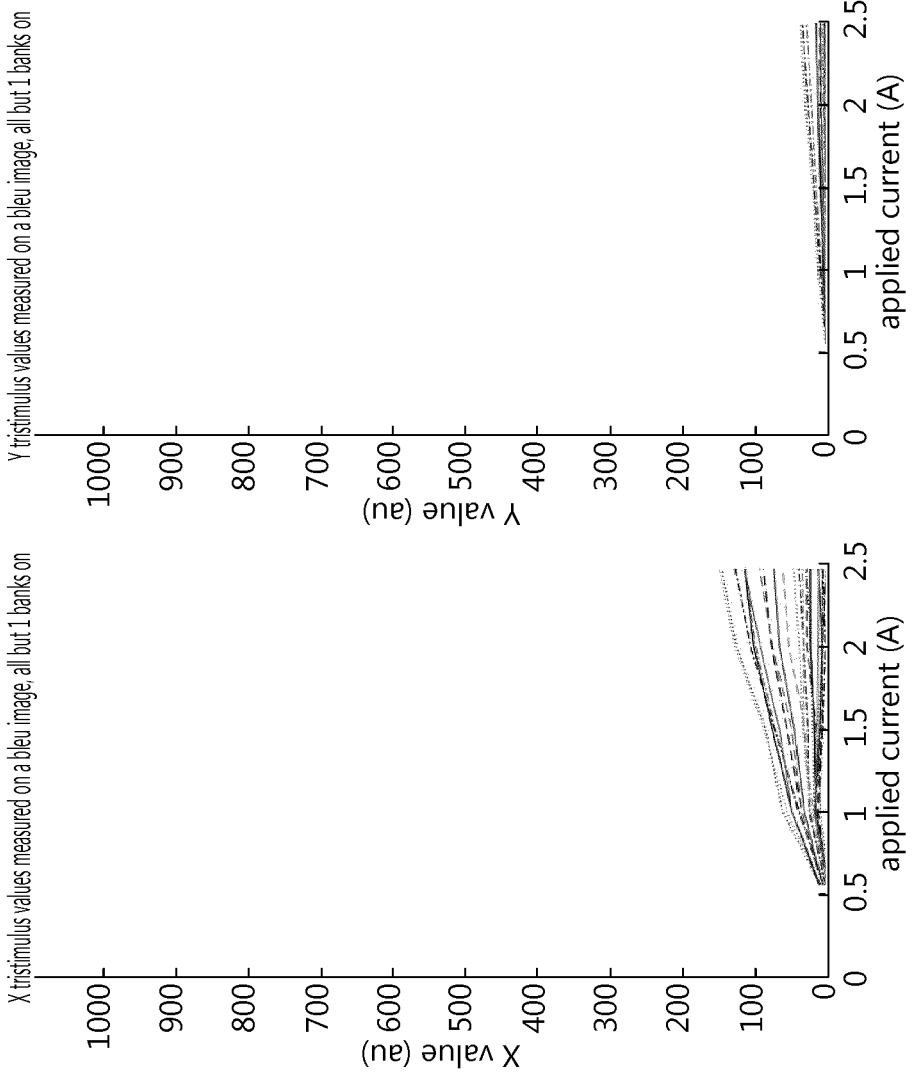

Overview x chromaticity shift over brightness level

Relative brightness level

Overview y chromaticity shift over brightness level

Relative brightness level

LASER DRIVER

FIELD OF THE INVENTION

The present invention pertains to the field of projectors, and more particularly to the field of projector design and projector calibration, both in the factory and in the field, as well as to projectors and optical arrangements for use in projectors.

BACKGROUND OF THE INVENTION

Projection technology has shown an increased interest in the adoption of solid state light sources instead of the conventional technologies such as xenon arc lamps used until now.

An example, of this newer laser technology started in 2010 when Casio unveiled the first mercury-free hybrid laser/LED light source, described as generating over 2000 lumens on a single-chip DLP projector.

Since then many manufacturers have announced their own variation of laser-based solid state projectors and although there are many projection architectures present on the market, the laser-based solid state projectors can be briefly separated in two main categories:
Full laser projectors, e.g. using direct red, green and blue lasers for the primary colours, or
Laser phosphor projectors, e.g. using blue lasers both for direct light generation as well as to excite a wavelength convertor material to generate the three primaries.

Conversion schemes for laser phosphor based projectors have been developed using blue light from InGaN laser diodes. For example, yellow (cerium-doped) YAG (Yttrium Aluminum Garnet) phosphor on a spinning sapphire disk is known to convert the blue (typically around 455 nm) light from (an array of) laser diodes (LDs). The combination of the blue light from the LDs and the yellow light generated by the phosphor produces the white light.

While being elegant and cost-effective, this solution also has its drawbacks. Aside from the potentially less saturated colors compared to direct laser solutions, a major disadvantage is that, when the laser light impinging on the phosphor increases in intensity, the phosphor can start to behave nonlinearly (or more non-linearly compared to the lower impinging light levels), resulting in a non-constant white point depending on the dimming level. This non-linear behavior is illustrated in the plot of FIG. 1. This plot shows that the conversion becomes less efficient at higher impinging light levels.

An example of the measured instability of the projector's chromaticity depending on the light output level or relative brightness level, resulting from this effect, is illustrated in FIG. 2 and FIG. 3.

SUMMARY OF THE INVENTION

Embodiments of the present invention make a compensation at least partly for a non-linear behavior of one or more wavelength conversion materials, e.g. for a projector.

Embodiments of the present invention are not solely dependent upon algorithms that suitably use light modulating elements of a projector, intended for image content generation, to alter the amounts of red, green and blue light proceeding to the projector lens. Such projectors or methods of operating these waste useful light. Hence embodiments of the present invention, can have the advantage of good image quality as contrast (or contrast of the individual primary colors), bit depth and/or light output are not reduced significantly. Additionally, the lifetime of the lasers and/or wavelength conversion elements can be longer and the power consumption can be lower.

In one aspect the present invention provides a light projection system for generating an image with three primary colors, in particular, blue, green, and red, each primary color being respectively defined by a first, second and third waveband, said light projection system comprising a laser module comprising a plurality of lasers comprising first blue lasers, second lasers for exciting the wavelength conversion element, a wavelength conversion element, and at least a first and second laser driver, wherein
the first blue lasers emit a first light beam in a first waveband, and the intensity of the light in the first waveband is controlled by at least a first drive current applied to the first laser driver,
the wavelength conversion element is configured to emit light at a plurality of wavelengths after absorption of a light beam from the second lasers at an excitation wavelength, said wavelength conversion element being arranged such that a part of the light emitted by the second lasers is re-emitted from the wavelength conversion element, resulting in the emission of a converted beam having a waveband comprising at least the second waveband, wherein the intensity of the converted light beam is controlled by at least the second drive current applied to the second laser driver, said intensity being non-linear over a first range of second drive current values;
the output of the module being a combined light beam of the converted light beam and the first beam so as to generate a beam having a pre-defined chromaticity;
characterized in that the first and second drive currents are calibrated so as to provide the pre-defined chromaticity of the combined beam over at least the first range of drive current values of the first and second laser driver. The removal of non-linear performance allows use of the projector into non-linear regions of the wavelength conversion element, without resulting in major shifts in the projector's whitepoint.

Reference to a laser also refers to a bank of lasers all producing laser light of a similar or same wavelength. Laser refers to laser diode but the invention is not limited thereto and can be used with other light sources such as solid-state light sources, such as light emitting diode, but also OLED. More generally, any type of light source suitable to excite a wavelength conversion element or a phosphor can be used for the present invention, as the present invention solves the problem of providing a constant chromaticity over a non-linear range of the wavelength conversion element. The intensity of the light in the first waveband can further also be controlled by the second drive current applied to the second laser driver. The intensity of the converted light beam can also further be controlled by the first drive current applied to the first laser driver. By using different laser drivers for different lasers or bank of lasers allows more accurate correction.

The plurality of first lasers emitting light in the first waveband can be in a laser bank, wherein each laser bank is controlled by a drive current applied to a laser driver dedicated to each laser bank. The first lasers emitting in the first waveband and/or second lasers can also comprise LED banks. This reduces the number of different drive currents and makes compensation for non-linear effects easier.

XYZ tristimulus values, XBT,YBT,ZBT for a blue component of the combined light beam can be expressed as the sums of the tristimulus blue values of the individual first blue laser, each first laser being driven by its individually controlled current $I_N$, N=1 ... M, wherein M corresponds to the number of lasers, defined by first equations $$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

wherein XBT, YBT and ZBT are the target tristimulus values to be reached, and $XB_N$, $YB_N$ and $ZB_N$ are the functions expressing the blue tristimulus values emitted by blue laser N as a function of the input current $I_N$ applied.

The XYZ tristimulus values, XYT,YYT,ZYT for a yellow or green component of the combined light beam can be expressed as a function representing the response of the wavelength conversion element which depends on the sum of the intensities of each second laser N exciting the wavelength conversion element, each second laser being driven by its individually controlled current $I_N$, N=1 ... M, defined by second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1, f_2, f_3$ are non-linear functions and $PB_{i,N}$ are representative of the intensity of the power from the second lasers impinging on the light conversion element.

The plurality of lasers can be divided in a plurality of groups P, each group being characterized by the chromaticity of the light of the combined beam it produces, the number of groups P being preferably comprised in the range of 2 to 10, more preferably 3 to 5, and even more preferably 3. This has the advantage that averaging reduces noise and the lower number of groups simplifies correction for non-linearity. Accordingly, it is preferred if each group of lasers is driven by a same current.

The XYZ tristimulus values for a blue component of the light XBT,YBT,ZBT and for the yellow or green component of the light XYT,YYT,ZYT are preferably pre-defined, and the first and second equations are solved for the unknown currents $I_N$, N=1 ... M, or when grouped $I_N$, N=1 ... P.

The first and second equations can be solved by using any suitable algorithm for non-linear equations of which the Levenberg-Marquardt algorithm is one. Alternatives are the Gauss-Newton method, the Powell's Dog Leg Method or a grey box model.

An optimization can be carried out to reduce a residue value to a minimum or increase it to a maximum, this residue value being used as a metric to characterize the results obtained for a particular set of currents over a range of light intensities.

The non-linear equations can be solved starting from initial currents, iteratively searching for better suited currents with test currents, calculating what the obtained luminance and chromaticity values are for these currents under test, and then comparing these values to the desired luminance and chromaticity values.

A residue can be used which expresses how much an obtained result deviates from a desired result, and a minimum value can be found for the residue, whereby the corresponding currents at that minimum residue are the optimized currents.

The functions XBN, YBN and ZBN, expressing the blue tristimulus values emitted by first blue lasers N as a function of the input current applied, are preferably determined using subtractive measurements.

The non-linear functions f1, f2, f3 are preferably determined indirectly by measuring the tristimulus response for the yellow or green component of the light beam as a function of the driving current, for each second laser N using subtractive measurements.

The blue lasers can emit in the waveband 440-470 nm wavelength and the green waveband can be in the range 495-575 nm. These ranges allow the selection of standard components.

The wavelength conversion element is a phosphor such as the type YAG:Ce or LUAG:Ce. These allow the selection of standard components.

A red laser source emitting a third beam in the third waveband can be used, said third red laser source having a third laser driver. The wavelength conversion element can comprise quantum dots.

In another aspect the present invention provide a method for calibrating a light projection system emitting a combined light beam, the laser module comprising a laser module a plurality of lasers comprising first blue lasers, and second lasers, a wavelength conversion element for converting incident exciting light into yellow or green light, and a plurality of laser drivers driven by driving currents $I_N$, N=1 ... M, wherein M corresponds to the number of lasers, wherein the method comprises the steps of Expressing XYZ tristimulus values, XBT,YBT,ZBT for a blue component of the combined light beam as the sums of the tristimulus blue values of the first blue lasers, each first blue laser being driven by its individually controlled current $I_N$, N=1 ... M, wherein M corresponds to the number of lasers, according to first equations:

$$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

and wherein XBT, YBT and ZBT are pre-defined target tristimulus values, and $XB_N$, $YB_N$ and $ZB_N$ are the functions expressing the blue tristimulus values emitted by first blue laser N as a function of the input current $I_N$ applied, expressing the XYZ tristimulus values, XYT,YYT,ZYT for the yellow or green component of the light of the combined light beam as a function representing the response of the wavelength conversion element which depends on the sum of the intensities of each blue laser N exciting the wavelength conversion element, each first blue laser being driven by its individually controlled current $I_N$, N=1 . . . M, according to second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1$, $f_2$, $f_3$ are non-linear functions and $PB_{i,N}$ are representative of the intensity of the power from the second lasers impinging on the light conversion element.

The plurality of lasers can be divided in a plurality of groups P, each group being characterized by the chromaticity of the light of the combined beam it produces, the number of groups P being preferably comprised in the range of 2 to 10, more preferably 3 to 5, and even more preferably 3.

The XYZ tristimulus values for the blue component of the light XBT,YBT,ZBT and for the yellow component of the light XYT,YYT,ZYT can be predefined and the first and second equations can be solved for the unknown currents $I_N$, N=1 . . . M, or when grouped $I_N$, N=1 . . . P over a range of light intensities.

The step of solving the first and second equations can be by any algorithm for solving non-linear equations such as the Levenberg-Marquardt algorithm or the Gauss-Newton method, the Powell's Dog Leg Method or a grey box model.

An optimization can be carried out to reduce a residue value to a minimum or increase it to a maximum, this residue value being used as a metric to characterize the results obtained for a particular set of currents over a range of light intensities.

The first and second equations can be solved starting from initial currents, iteratively searching for better suited currents with test currents, calculating what the obtained luminance and chromaticity values are for these currents under test, and then comparing these values to the desired luminance and chromaticity values.

The residue can express how much an obtained result deviates from a desired result, a further step can be finding a minimum value for the residue, whereby the corresponding currents at that minimum residue are the optimized currents.

The functions XBN, YBN and ZBN, expressing the blue tristimulus values of the combined light beam emitted by first blue laser number N as a function of the input current applied to the laser can be determined using subtractive measurements.

The functions f1, f2, f3 can be determined by measuring the tristimulus response for the yellow or green component of the combined light beam as a function of the driving current applied to each second laser, using subtractive measurements.

In another aspect the present invention provides a method for re-calibrating a light projection system comprising a laser module comprising blue lasers, a wavelength conversion element for converting blue light into yellow light, and a plurality of lasers driven by driving currents $I_N$, N=1 . . . M, wherein M corresponds to a number of lasers, or a plurality of groups of lasers driven by driving currents $I_N$, N=1 . . . P, wherein P corresponds to a number of laser groups, and wherein XBT, YBT, ZBT are the tristimulus responses for the blue component of the beam of the projection system and XYT, YYT, ZYT are the tristimulus responses for the yellow component as a function of the driving currents are known from the calibration of the present invention, the method comprising the steps of selecting a set of brightness levels within a range, deriving the corresponding set of driving currents for each brightness level for each laser source or each laser group, driving each laser or laser group with the set of driving currents sequentially for each brightness level, measuring the X, Y and Z tristimulus values for the blue and yellow components of the light beam at the set of brightness levels, the combined output of all lasers is measured for the yellow or green and blue components at each brightness level, in case there are red lasers in the optical system, the same applies to red, calculating a linear correction comprising a scaling factor and an offset factor to be applied to the pre-calibrated $XB_N(I_N)$ and $PB_{i,N}(I_N)$ functions. of the different lasers or laser groups.

The step of calculating a linear correction can comprise the step of solving a linear system of equations for the tristimulus responses XBT, YBT, ZBT of the blue component of the light.

The step of calculating a linear correction can comprise the step of solving a non-linear system of equations for the tristimulus responses YBT, YYT, YBT of the yellow or green component of the light.

The step of calculating a linear correction for the yellow or green and blue components further comprises the steps of approximating the correction coefficients using a least squares algorithm, from the first approximation, refining the correction coefficients, in particular the offsets, using an algorithm for solving non-linear equations such as the Levenberg-Marquardt algorithm.

Adjusted driving currents for the N lasers or M groups of lasers can be determined by applying the algorithm.

In another aspect of the present invention a controller can be provided for use with a projection system for carrying out the method as define above.

In another aspect of the present invention computer program product which when executed on a processor is used to implement a projection system or for carrying out any method of the present invention. A non-transitory signal storage means can be used to store the computer program product. The storage means can be an optical disk, a magnetic disk, a magnetic tape, a solid state memory such as a flash memory or similar.

Embodiments of the present invention can have any, some or all of the following advantages:

Performing corrections at the level of laser driving does not require such significant sacrifices in image quality. Alternative methods can require lowering the contrast and, for example contrast of the individual primary colors, bit depth and/or light output.

An algorithm can be created that calculates and for example stores driving currents for example in a memory such as in look-up tables for the different lasers in the projector's light source, in order to assure a predefined chromaticity e.g. constant chromaticity of a light beam exiting the light source independent of the brightness of the light emitted by the light source or at least to reduce its variation with light output or dimming level. In particular, a predefined chromaticity e.g. constant chromaticity of the white point of a light beam exiting the light source can be assured independent of the brightness of the light emitted by the light source or at least to reduce its variation with light output or dimming level.

For cinema projection the colour performance can be controlled in a simpler way, as the light source behaves more stably at its range of intended brightness levels. This can for instance be beneficial for a digital cinema projector, which has to project images according to a standard, such as the DCI standard.

Aside from the benefits in terms of image quality, the laser lifetime can also be extended, as the lasers can potentially be driven at lower currents in order to reach the same light output level when using alternative methods. This can also reduce the power consumption.

Embodiments of the present invention provide methods, projectors and optical arrangements for projectors that result in a predefined chromaticity such as a white point during their production process when the lasers are brand new, as well as during their lifetime when imperfections can occur. Such imperfections can for instance occur due to gradual laser degradation, degradation of the wavelength conversion element or sudden catastrophic failure. So at any given moment in time, the predefined, e.g. stable chromaticity over dimming level can be obtained for example while minimizing the losses by properly driving the lasers.

Embodiments of the present invention can allow for a fast production process. Only minor changes are expected between different projectors of the same type. These differences are for instance due to differences between individual lasers, variations in the optical design of the light source and so on. Generic corrections can in many cases be used, without specific finetuning procedures for individual projectors.

Embodiments of the present invention provide methods, projectors and optical arrangements able to perform a suitable correction using only a limited set of measurements during the projector's production process or in the field.

A linear relation between dimming level and brightness of the projector can be obtained. Alternative relationships can also be introduced. The dimming level can correspond to a 1 to 1 relationship with the laser driving current. This level can be selected electronically. A mapping such as provided by a LUT can be calculated in this algorithm to make sure that the electronic driving of the laser banks, after applying this mapping, results in the suitable behavior of the light output.

Embodiments of the present invention provide methods, projectors and optical arrangements that are able to make measurements that can be performed using an integrated light sensor or optical color sensor, or an external light sensor or optical color sensor, or a combination thereof. The latter scenario can for instance be useful when the projector is continuously monitoring the changes over time using the internal sensor, and every now and then an external reference measurement is performed, for instance to cope with potential degradations of the internal sensor over time. The light sensor can be at least one of a photodiode sensor, a photoresistor, organic photoreceptor, spectrometer, photo-amplifiers, CCD- or CMOS sensors.

Alternatively, embodiments of the present invention provide methods, projectors and optical arrangements that can provide non-measurement based solutions. For example, a simple indication depicting which light sources are still operational can be used as input during the projector's lifetime instead of actual measurements. Although the correction based on this knowledge will not be perfect, a temporary solution can be found which is sufficiently good to avoid loss of projection ability.

The problems addressed by embodiments of the present invention which provide methods, projectors and optical arrangements is complex because of various reasons:

The conversion of the incident laser light from an exciting light source such as a blue InGaN laser diode to longer wavelength light can be non-linear and temperature dependent, The spectrum of primaries may vary depending on the impinging power level, for instance due to the wavelength conversion material such as a "phosphor", The efficiency of the wavelength conversion material can be affected by degradation over time, The conversion characteristics of the individual wavelength conversion materials ("phosphors") may differ, Individual blue and red laser diodes have different I-V, P-I characteristics and spectral power densities, for instance due to the manufacturing process, There can be degradation over time of the light output of the light sources such as diode lasers, This degradation may vary for different light sources depending on differences in drive currents in operation, There can be catastrophic failure of the light sources such as diode lasers.

Embodiments of the present invention provide methods, projectors and optical arrangements in which different types of blue lasers with different wavelengths can be used, for instance to obtain the most suitable chromaticity of the blue primary or to reduce speckle. The right balance between the driving of different laser banks can be made, to obtain the correct chromaticity of the blue primary as well, aside from obtaining the correct chromaticity for white.

The lifetime of the projector will improve compared to conventional color adjustment techniques. In these techniques, light is thrown away in order to maintain a proper color balance. When using this algorithm, instead of throwing the light away, the lasers are steered at a lower driving current, which extends the lifetime of the projector.

This algorithm can be adapted for instance for HDR techniques, which quickly shift from one driving level to another. Without applying this color calibration algorithm, the colorpoint can visibly alter when switching between different light output levels of the light source. This could be enhanced further: the algorithm detailed above is created in a steady state, meaning that the projector is stabilized in terms of light and color output. However, it is known that laser phosphor based projectors can have some latency in terms of color and light output when switching from one level to another. This effect may be important in HDR applications. To overcome this limitation, intermediate correction currents can be used that make sure that, during the stabilization period, the projector remains stable.

Different whitepoints can be set as targets, for instance the DCI theater whitepoint, or the REC 709 whitepoint.

In another aspect the present invention provides a light projection system for generating an image with three primary colors, in particular, blue, green, and red, each primary color being respectively defined by a first, second and third waveband, said light projection system comprising a laser module comprising a plurality of lasers comprising at least first blue lasers, second lasers, a wavelength conversion element, and at least a first and second laser driver, wherein
- the first blue lasers are controlled by the first laser driver and emit a first light beam in at least the first waveband,
- the second lasers are controlled by at least the second laser driver, and emit a second light beam in at least the first waveband,
- the wavelength conversion element being configured to emit light at a plurality of wavelengths after absorption of a light beam at an excitation wavelength in the first waveband, said wavelength conversion element being arranged such that a part of the second light beam is re-emitted from the wavelength conversion element, resulting in the emission of a converted beam having a waveband comprising at least the second waveband, the intensity of the converted beam being non-linear over a range of drive currents for the second laser driver;
- the output of the module being a combined light beam of the converted light beam and the first beam so as to generate a combined beam;
- characterized in that the first and second laser drivers are calibrated so as to provide a pre-defined chromaticity of the combined beam over a brightness range.

The pre-defined chromaticity can be a pre-defined white point, thus to ensure a stable white point over the brightness range.

Advantageously, the deviation of the chromaticity of the combined beam has a chromaticity error over the drive current range, expressed in values x and y, which is limited in absolute value to 0.01, or more preferably to 0.006, or even more to 0.003

In embodiments of the present invention, the brightness range is preferably comprised in the range of 70 to 90% of the maximum brightness defined by the maximum driving current of at least one laser driver, more preferably in the range of 50 to 95% even more preferably 30 to 100%.

The maximum brightness depends on the maximum driving current of at least one laser driver, as the other laser drivers may not reach their maximum driving current for a pre-defined chromaticity, or for a given white point.

Advantageously, a part of the second light beam directly contributes to light in the first waveband of the combined light beam.

Advantageously, a part of the first light beam is converted by the wavelength conversion element and partly contributes to the converted beam having a waveband comprising at least the second waveband.

Thus, the first and second light beam are mixed and both contribute to the direct blue beam and to the converted beam which provides light in the second waveband.

In embodiments of the present invention, the plurality of lasers comprising at least first blue lasers, second lasers are arranged in a first and second laser bank respectively, the first and second laser bank being respectively controlled by the first and second drive current applied by the first and second laser driver dedicated to each laser bank.

Preferably, the plurality of lasers further comprise at least third lasers arranged in a third laser bank, the third laser bank being controlled by a third drive current applied by a third laser driver dedicated to the third laser bank.

Advantageously, XYZ tristimulus values, XBT,YBT,ZBT for a blue component of the combined light beam are expressed as the sums of the tristimulus blue values of the first blue and second lasers, each laser being driven by its individually controlled current $I_N$, N=1 ... M, wherein M corresponds to the number of lasers, defined by first equations $$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

wherein $XB_N$, $YB_N$ and $ZB_N$ are the functions expressing the blue tristimulus values emitted by laser N as a function of the input current $I_N$ applied.

Advantageously, XYZ tristimulus values, XYT,YYT, ZYT for a yellow or green component of the combined light beam are expressed as a function representing the response of the wavelength conversion element which depends on the sum of the intensities of each laser N exciting the wavelength conversion element, each laser being driven by its individually controlled current $I_N$, N=1 ... M, defined by second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1$, $f_2$, $f_3$ are non-linear functions and $PB_{i,N}$ are representative of the intensity of the power from the lasers impinging on the light conversion element.

In preferred embodiments, the plurality of lasers is divided in a plurality of groups P, each group being characterized by the chromaticity of the light of the combined beam it produces, the number of groups P being preferably comprised in the range of 2 to 10, more preferably 3 to 5, and even more preferably 3.

Preferably, each laser from a particular group of lasers is driven by a same current.

Advantageously, the XYZ tristimulus values for a blue component of the light XBT,YBT,ZBT and for the yellow or green component of the light XYT,YYT,ZYT are pre-defined over a range of brightness levels, and the first and second equations are solved for the unknown currents $I_N$, N=1 ... M, or when grouped $I_N$, N=1 ... P.

In another embodiment of the present invention, the laser module further comprises a red laser source emitting a third beam in the third waveband, said third red laser source having a third red laser driver, the third beam being combined with the combined beam to further form the combined beam.

Advantageously, the XYZ tristimulus values, XRT, YRT, ZRT for a red component of the combined light beam are expressed as a function representing the response of the wavelength conversion element which depends on the sum of the intensities of each laser N exciting the wavelength conversion element, each laser being driven by its individually controlled current $I_N$, N=1 ... M, defined by second equations:

$$XRT = XR1(Ir1) + \ldots + XRn(Irn) + f_4(PB4,1(I_1) + \ldots + PB4,N(I_N))$$

$$YRT = YR1(Ir1) + \ldots + YRn(Irn) + f_5(PB5,1(I_1) + \ldots + PB5,N(I_N))$$

$$ZRT = ZR1(Ir1) + \ldots + ZRn(Irn) + f_6(PB6,1(I_1) + \ldots + PB6,N(I_N))$$

wherein functions $f_4$, $f_5$, $f_6$ are non-linear functions and $PB_{i,N}$ are representative of the intensity of the power from the red lasers impinging on the light conversion element and wherein $XR_N$, $YR_N$ and $ZR_N$ are the functions expressing the red tristimulus values emitted by red laser N as a function of the input current $I_N$ applied.

Preferably, the XYZ tristimulus values for a red component of the light XRT, YRT, ZRT are pre-defined over a range of brightness levels, and the first, second and third equations are solved for the unknown currents $I_N$, N=1 ... M, or when grouped $I_N$, N=1 ... P.

In preferred embodiments, the first and second equations are solved by using an algorithm for solving non-linear equations.

In another embodiment, the third equations are solved by using an algorithm for solving non-linear equations.

Advantageously, the Levenberg-Marquardt algorithm, the Gauss-Newton method, the Powell's Dog Leg Method or a grey box model is used to solve the non-linear system of equations.

More preferably, an optimization is carried out to reduce a residue value to a minimum or increase it to a maximum, this residue value being used as a metric to characterize the results obtained for a particular set of currents over a brightness range.

Even more preferably, the equations are solved starting from initial currents, iteratively searching for better suited currents with test currents, calculating what the obtained luminance and chromaticity values are for these currents under test, and then comparing these values to the desired luminance and chromaticity values.

Advantageously, using the residue which expresses how much an obtained result deviates from a desired result, further comprising finding a minimum value for the residue, whereby the corresponding currents at that minimum residue are the optimized currents.

In preferred embodiments, the functions XBN, YBN and ZBN, expressing the blue tristimulus values emitted by first blue lasers N as a function of the input current applied, are determined using subtractive measurements.

Advantageously, wherein the non-linear functions f1, f2, f3 are determined indirectly by measuring the tristimulus response for the yellow or green component of the light beam as a function of the driving current, for each laser N using subtractive measurements.

This method can be used to both obtain the non-linear function, as well as the relative contribution of the different lasers to the impinging blue power which is converted.

Preferably, the non-linear functions f4, f5, f6 are determined indirectly by measuring the tristimulus response for the red component of the light beam as a function of the driving current, for each laser N using subtractive measurements.

In embodiments of the present invention, the blue lasers emit in the waveband 440-470 nm wavelength. Preferably, the green waveband is in the range 495-575 nm.

In embodiments of the present invention, the wavelength conversion element is a phosphor. Preferably, the phosphor is of the type YAG:Ce. Advantageously, the phosphor is of the type LUAG:Ce. In other embodiments of the present invention, the wavelength conversion element comprises quantum dots.

In another aspect, the present invention also provides a method for calibrating a light projection system emitting a combined light beam, the laser module comprising a laser module a plurality of lasers comprising first blue lasers, and second lasers, a wavelength conversion element for converting incident exciting light into yellow or green light, and a plurality of laser drivers driven by driving currents $I_N$, N=1 ... M, wherein M corresponds to the number of lasers, wherein the method comprises the steps of Expressing XYZ tristimulus values, XBT,YBT,ZBT for a blue component of the combined light beam as the sums of the tristimulus blue values of the lasers, each laser being driven by its individually controlled current $I_N$, N=1 ... M, wherein M corresponds to the number of lasers, according to first equations:

$$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

and wherein $XB_N$, $YB_N$ and $ZB_N$ are the functions expressing the blue tristimulus values emitted by laser N as a function of the input current $I_N$ applied, expressing the XYZ tristimulus values, XYT,YYT,ZYT for the yellow or green component of the light of the combined light beam as a function representing the response of the wavelength conversion element which depends on the sum of the intensities of each laser N exciting the wavelength conversion element, each laser being driven by its individually controlled current $I_N$, N=1 ... M, according to second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1$, $f_2$, $f_3$ are non-linear functions and $PB_{i,N}$ are representative of the intensity of the power from the lasers impinging on the light conversion element.

In an embodiment, the laser module further comprises red lasers, the method for calibrating further comprises the steps of Expressing XYZ tristimulus values, XRT, YRT, ZRT for a red component of the combined light beam as the sums of the tristimulus red values of the lasers, each laser being driven by its individually controlled current $I_N$, N=1 . . . M, wherein M corresponds to the number of lasers, according to third equations:

$XRT=XR1(Ir1)+ \ldots +XRn(Irn)+f_4(PB4,1(I_1)+ \ldots +PB4,N(I_N))$ $YRT=YR1(Ir1)+ \ldots +YRn(Irn)+f_5(PB5,1(I_1)+ \ldots +PB5,N(I_N))$ $ZRT=ZR1(Ir1)+ \ldots +ZRn(Irn)+f_6(PB6,1(I_1)+ \ldots +PB6,N(I_N))$ wherein functions $f_4$, $f_5$, $f_6$ are non-linear functions and $PB_{i,N}$ are representative of the intensity of the power from the red lasers impinging on the light conversion element and wherein $XR_N$, $YR_N$ and $ZR_N$ are the functions expressing the red tristimulus values emitted by red laser N as a function of the input current $I_N$ applied.

Advantageously, the method further comprises the step of dividing the plurality of lasers in a plurality of groups P, each group being characterized by the chromaticity of the light of the combined beam it produces, the number of groups P being preferably comprised in the range of 2 to 10, more preferably 3 to 5, and even more preferably 3.

Preferably, the method further comprises the step of pre-defining the XYZ tristimulus values for the blue component of the light XBT,YBT,ZBT and for the yellow component of the light XYT,YYT,ZYT, and solving the first and second equations for the unknown currents $I_N$, N=1 . . . M, or when grouped $I_N$, N=1 . . . P over a brightness range.

Preferably, the method further comprises the step of pre-defining the XYZ tristimulus values for the red component of the light XRT, YRT, and solving the third equations for the unknown currents $I_N$, N=1 . . . M, or when grouped $I_N$, N=1 . . . P over a brightness range.

Preferably, the method further comprises the step of solving the first and second equations by using the Levenberg-Marquardt algorithm.

In another embodiment, the method further comprises the step of solving the third equations by using the Levenberg-Marquardt algorithm.

In a further aspect, the method comprises the step of solving the non-linear system of equations with the Gauss-Newton method, the Powell's Dog Leg Method or a grey box model.

In a further aspect, the method further comprises the step of carrying out an optimization to reduce a residue value to a minimum or increase it to a maximum, this residue value being used as a metric to characterize the results obtained for a particular set of currents over a range of light intensities.

Preferably, the method further comprises the step of solving the first and second equations starting from initial currents, iteratively searching for better suited currents with test currents, calculating what the obtained luminance and chromaticity values are for these currents under test, and then comparing these values to the desired luminance and chromaticity values.

In a further aspect, the step of using the residue which expresses how much an obtained result deviates from a desired result, further comprising the step of finding a minimum value for the residue, whereby the corresponding currents at that minimum residue are the optimized currents.

Preferably, the functions XBN, YBN and ZBN, expressing the blue tristimulus values of the combined light beam emitted by first blue laser number N as a function of the input current applied to the laser is determined using subtractive measurements.

Advantageously, the functions f1, f2, f3 are determined by measuring the tristimulus response for the yellow or green component of the combined light beam as a function of the driving current applied to each laser, using subtractive measurement.

In embodiments, the functions f4, f5, f6 are determined by measuring the tristimulus response for the red component of the combined light beam as a function of the driving current applied to each laser, using subtractive measurement.

In a further aspect, the present invention also provides a method for re-calibrating a light projection system comprising a laser module comprising blue lasers, a wavelength conversion element for converting blue light into yellow light, and a plurality of lasers driven by driving currents $I_N$, N=1 . . . M, wherein M corresponds to a number of lasers or groups of lasers driven by driving currents $I_N$, N=1 . . . P, wherein P corresponds to a number of laser groups, and wherein XBT,YBT,ZBT are the tristimulus responses for the blue component of the beam of the projection system and XYT,YYT,ZYT are the tristimulus responses for the yellow component as a function of the driving currents are known from calibration, the method comprising the steps of selecting a set of brightness levels within a range, deriving the corresponding set of driving currents for each brightness level for each laser source or each laser group, driving each laser or laser group with the set of driving currents sequentially for each brightness level, measuring the X, Y and Z tristimulus values for the blue and yellow components of the light beam at the set of brightness levels, the combined output of all lasers is measured for the yellow or green and blue components at each brightness level, calculating a linear correction comprising a scaling factor and an offset factor to be applied to the pre-calibrated $XB_N(I_N)$ and $PB_{i,N}(I_N)$ functions of the different lasers or laser groups.

In practice, it is possible to measure on the blue and white components and to derive the yellow contribution therefrom.

Advantageously, the step of calculating a linear correction comprises the step of solving a linear system of equations for the tristimulus responses XBT, YBT, ZBT of the blue component of the light.

Preferably, the step of calculating a linear correction comprises the step of solving a non-linear system of equations for the tristimulus responses YBT, YYT, YBT of the yellow or green component of the light.

In another embodiment, the laser module further comprises red lasers driven by driving currents $I_N$, N=1 . . . M, wherein M corresponds to a number of lasers or groups of lasers driven by driving currents $I_N$, N=1 ... P, wherein P corresponds to a number of laser groups, and wherein XRT, YRT, ZRT are the tristimulus responses for the red component of the beam of the projection system as a function of the driving currents are known from calibration, the method comprising the steps of selecting a set of brightness levels within a range, deriving the corresponding set of driving currents for each brightness level for each laser source or each laser group, driving each laser or laser group with the set of driving currents sequentially for each brightness level, measuring the X, Y and Z tristimulus values for the red components of the light beam at the set of brightness levels, the combined output of all lasers is measured for the red component at each brightness level, calculating a linear correction comprising a scaling factor and an offset factor to be applied to the pre-calibrated $XR_N(I_N)$ and $PB_{i,N}(I_N)$ functions of the different lasers or laser groups.

Preferably, the step of calculating a linear correction comprises the step of solving a linear system of equations for the tristimulus responses XRT, YRT, ZRT of the red component of the light.

Advantageously, the step of calculating a linear correction for the yellow or green and blue and/or red components further comprises the steps of approximating the correction coefficients using a least squares algorithm, from the first approximation, refining the correction coefficients using Levenberg-Marquardt algorithm.

Preferably, the adjusted driving currents for the N lasers or M groups of lasers is determined by applying the Levenberg-Marquardt algorithm.

In another aspect of the present invention a controller can be provided for use with a projection system for carrying out the method as define above.

In another aspect of the present invention computer program product which when executed on a processor is used to implement a projection system or for carrying out any method of the present invention. A non-transitory signal storage means can be used to store the computer program product. The storage means can be an optical disk, a magnetic disk, a magnetic tape, a solid-state memory such as a flash memory or similar.

The technical effects and advantages of embodiments of the present invention correspond mutatis mutandis to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which:

FIG. 6a shows the X tristimulus responses of the blue component of the light as emitted by the projector depending on the driving current of each individual bank 1 to 24.

FIG. 6b shows the Y tristimulus responses of the blue component depending on the driving current for each individual bank 1 to 24.

FIG. 6c shows the Z tristimulus responses of the blue component depending on the driving current for each individual bank 1 to 24.

DETAILED DESCRIPTION OF THE INVENTION

Figure 1:
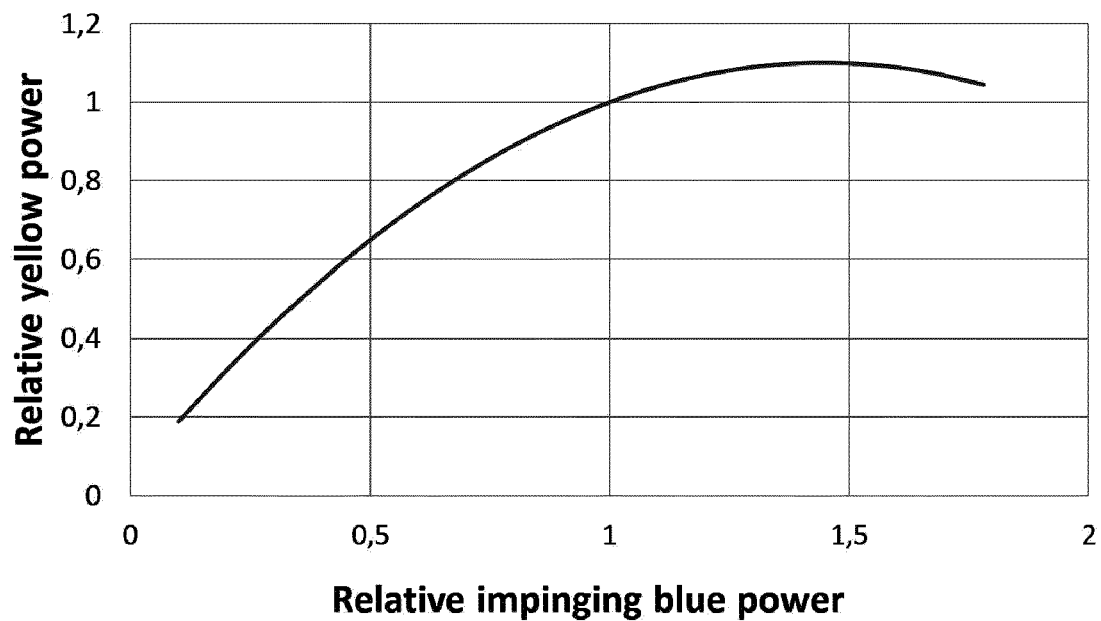
FIG. 1 shows the non-linear response of a yellow phosphor excited by blue light.
Figure 2:
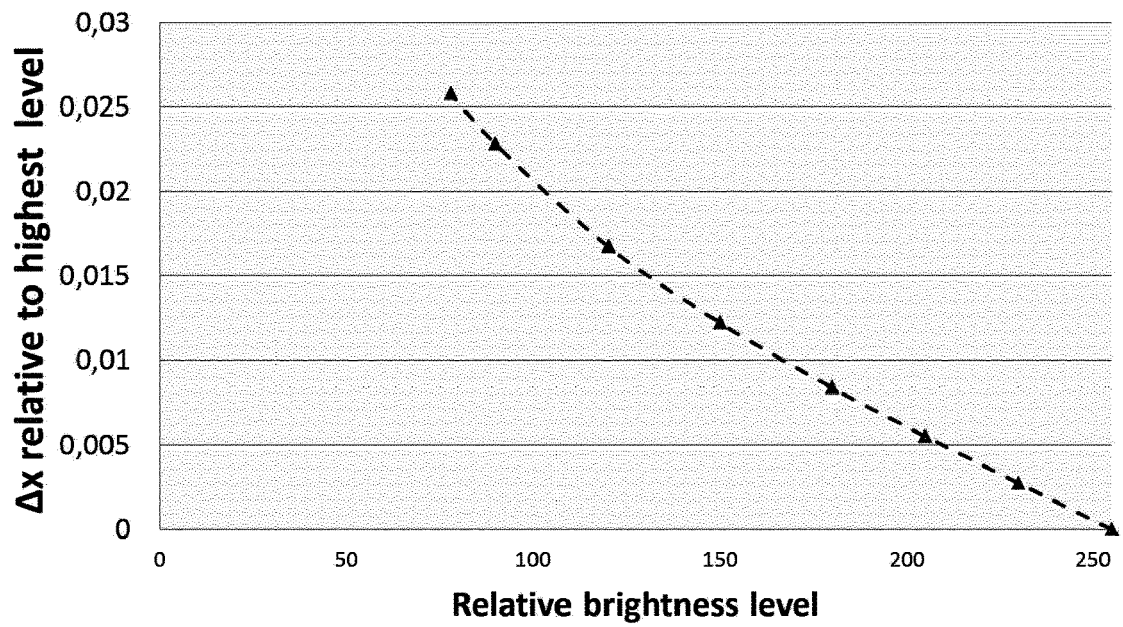
FIG. 2 shows the x chromaticity shift of the light generated by a projector as a function of the brightness level.
Figure 3:
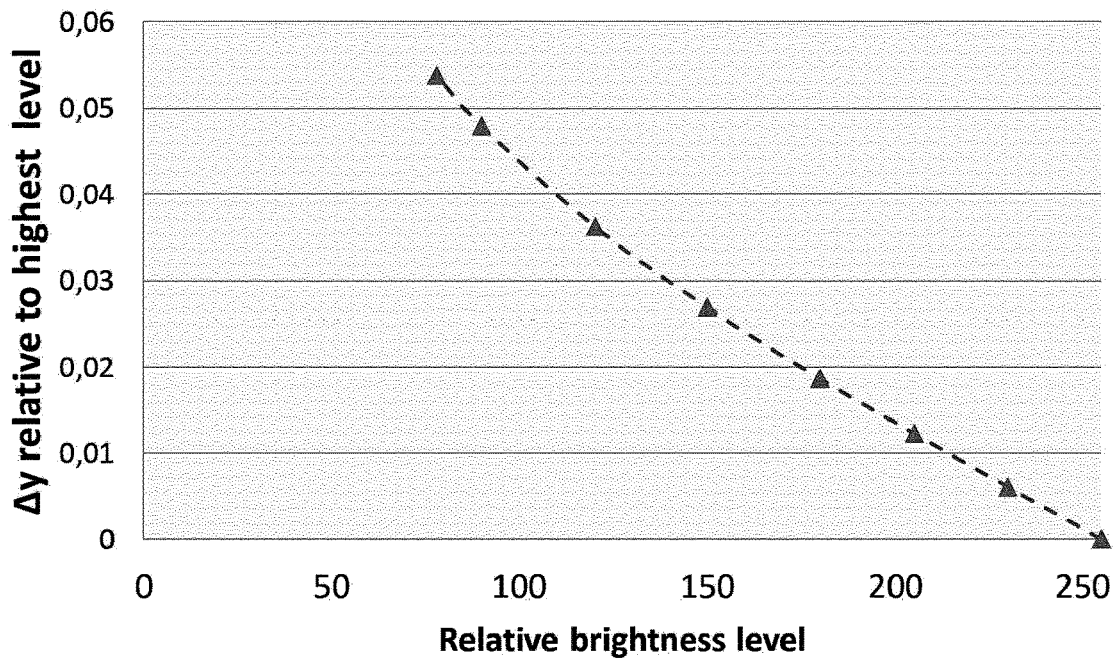
FIG. 3 shows the y chromaticity shift of the light generated by a projector as a function of the brightness level.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

While the invention has been described hereinabove with reference to specific embodiments, this was done to clarify and not to limit the invention. The skilled person will appreciate that various modifications and different combinations of disclosed features are possible without departing from the scope of the invention.

Definitions

A "wavelength conversion element" receives light from a light source such as a blue laser and emits light at different wavelengths. Such elements can be made with a phosphor, with quantum dots, or fluorescent dyes. Quantum dots plates/films can sustain around 5 W/cm² laser power illumination.

In the presently described embodiments of the present invention, light sources are advantageously laser light sources, comprising an array of lasers. However, the invention is not limited to laser light sources, and can also comprise LED light sources or superluminescent diodes or OLED.

In the description and the claims, any reference to a laser is also to be interpreted as a reference to a bank of lasers.

Lasers of the present invention used to excite the wavelength conversion element according to embodiments of the present invention can emit light in the violet, cyan, blue, UV.

Additional red lasers can be added to the projector or optical arrangement for a projector according to embodiments of the present invention. The red laser can emit in the range 630 to 650 nm although longer wavelengths are also suitable.

In projector design often trade-offs are used, e.g. a reduced contrast can be accepted in order to improve something else. An aim of embodiments of the present invention is to provide corrections to control color contrast for each of a projector's primaries at several light output levels as can be seen when displaying dedicated patterns that are designed to particularly show the relevant effects. The corrections proposed in embodiments of the present invention will affect the projector's color contrast and luminance/chromaticity variation with dimming level. Embodiments of the present invention provide correction at light source drive level. Optionally these can be augmented by use of the light modulator in a projector. Alternatively, no other particular correction needs to be used even if the wavelength conversion element is driven into a non-linear regime.

If no DMD or source current correction is used in a projector there can be a luminance non-linearity and color shift depending on the dimming level. For example, relatively more yellow light can be expected at the lower light levels compared to the higher levels. This effect can be more or less pronounced depending on how far the wavelength conversion element is driven into the non-linear regime. The non-linearity can be seen even at lower levels. From the color contrast measurements, it is possible to determine if a DMD correction is used or not. Alternatively, from the behavior of the color contrast variation with dimming level, it is possible to determine if a correction at source level is used.

If only a DMD correction is used, color contrast and luminance non-linearity can be observed, as the DMD corrections will be different at different light output levels dependent upon the non-linear behavior due to saturation of the wavelength conversion element. For example if the light source is measured at multiple dimming levels, the color contrast correction should be different at different dimming levels. The extent to which the wavelength conversion element is saturating at higher light levels will result in loss in color contrast at different dimming levels. Using the DMD to correct for non-linearity of the wavelength conversion can be seen as more light which is reflected to the beam dump. If a DMD correction method is used, the "drop" in some light is corrected by other components of the incoming light being sent to the beam dump instead of being sent to the projector's projection lens. So by analyzing the amount of light diverted to the beam dump, the magnitude of the correction being applied at DMD level can be determined.

Embodiments of the present invention can render better performance. For example, there can be much less extra light diverted to the beam dump at certain light output levels. Any slight imperfections can be corrected using a DMD correction technique, for example. Corrections at different light output levels will usually have another dimming-level dependent behavior compared to the imperfections directly related to the native non-linearity, as the algorithm compensates for the drift in whitepoint, which implies that the DMD correction should be more or less the same, independently of the light output level. Embodiments of the present invention can render better performance when widely separated light output levels are demanded. For instance, the highest light output can be demanded as is typically done for cinema when a 3D movie is played which can be followed by situations where the light source emits a lower amount of light. Embodiments of the present invention can render better performance of the color contrast in these two situations when they occur in a single video sequence.

An aim of embodiments of the present invention is to provide corrections relating to performance of a laser exited wavelength conversion element to improve the projector's color point variation with dimming level. Chromaticity can be kept constant if the wavelength conversion element is not driven into its non-linear regime. But when the wavelength conversion element is driven in the non-linear regime a correction method using a DMD correction method is not as good as correction at light source level according to embodiments of the present invention.

Embodiments of the present invention may not need an additional correction using the light modulation elements from the projector because embodiments of the present invention correct the light output of the light source. The light source's color point can be kept stable with respect to variations in dimming level even before the light has reached the light modulator as the correction technique is applied at the source level.

Corrections at light source level and at light modulation element level can be combined as described above, such that the second level correction, i.e. at the light modulation element, provides an additional fine tuning of the corrections to be applied to achieve the desired white point or chromaticity values. A two-level correction, at light source and a light modulator level, can provide benefits for example when The desired whitepoint may not be achieved in absolute value. There may be an offset because the source may only have 2 primaries.

The correction over dimming level can be very good, but it may not be perfect. Imperfections can be corrected with the light modulator.

Driving the wavelength conversion element into its non-linear regime can affect ageing. There can be relative degradation of the blue and yellow light with respect to time, if the wavelength conversion element is driven into its non-linear regime. Embodiments of the present invention provide on-site calibration methods which are efficient in order to re-calibrate for ageing effects.

Driving the wavelength conversion element in its non-linear regime can affect its light conversion efficiency. Temperature sensors can be used for monitoring this change in efficiency.

In embodiments of the present invention actual currents applied to the lasers by the projector's laser driving hardware are adjusted. For correction at a number of dimming levels, a special curve can be used for the correction at light source level. Such a special curve can be included in a projector's hardware and software using a look up table that is used to determine a current to be applied when a certain light output level is requested. The content of the look up table is arranged to store values of a non-linear function that is used to correct for the non-linearity of the wavelength conversion element at light source level. FIG. 1 shows the non-linear response of a yellow phosphor excited by blue light.

In a first embodiment according to the present invention, the light source comprises a set of one or more blue lasers and a single wave conversion or "phosphor" element, light from which can be combined into a white light beam, or more generally combined light beam. The light of any or each blue laser can either be emitted directly without wavelength conversion, or it can be partially converted by the wavelength conversion element ("phosphor"), or it can be completely converted by the wavelength conversion element ("phosphor").

Embodiments of the present invention can provide a projector, a method or an optical arrangement for use in a projector for calculating the better suited driving current of each laser in the optical design, using a set of optical measurements as input, in order to achieve a desired white point which is constant throughout a dimming range or has a variation which keeps the white point within boundaries, e.g. of the DCI standard.

Embodiments of the present invention provide methods, projectors and optical arrangements which make use of a mathematical model describing the behavior of a laser or lasers and the wavelength conversion element or elements ("phosphors") based on measurement data that characterizes the behavior of the laser or lasers and wavelength conversion element or elements ("phosphors").

In embodiments of the present invention which provide methods, projectors and optical arrangements, optical equipment can be used which is capable of performing accurate color and luminance measurements, for instance the LMT C3300™ or the LMT C 1210™ provided by LMT LICH-TMESSTECHNIK GMBH, BERLIN, Germany, Yeti Specbos™, or Mazet™ true colour sensors for the internal sensor.

Embodiments of the present invention which provide methods, projectors and optical arrangements, can make use of a mathematical algorithm that considers the electro-optical behavior of the light sources. The light sources in embodiments of the present invention which provide a method, a projector and/or optical arrangements include a plurality of laser diode banks.

In general, there are two types of light emission by the light source resulting from the banks, whereby these can be emitted at the same time:

The blue light emission (e.g. the blue component of the emitted light by the projector), which is roughly linear depending on the applied drive current, as this is the natural behavior of the lasers, and there is no conversion element used. In some embodiments of the present invention the blue light can partially comprise phosphor-converted light. This part can behave non-linearly depending on the drive current.

The yellow light emission (in other words the yellow component of the emitted light by the projector), which is non-linear depending on the applied drive current, as described before, due to the characteristics of the wavelength conversion element ("phosphor").

Figure 4:
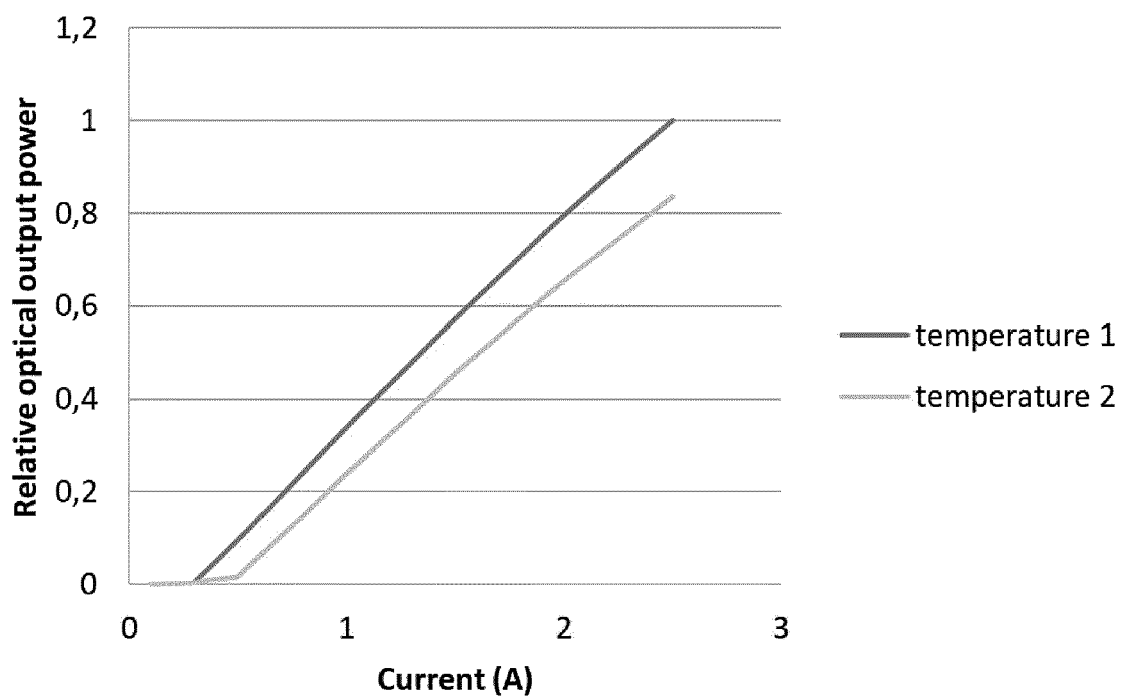
FIG. 4 shows temperature-dependent IP curves of laser diode banks.
Figure 5A:
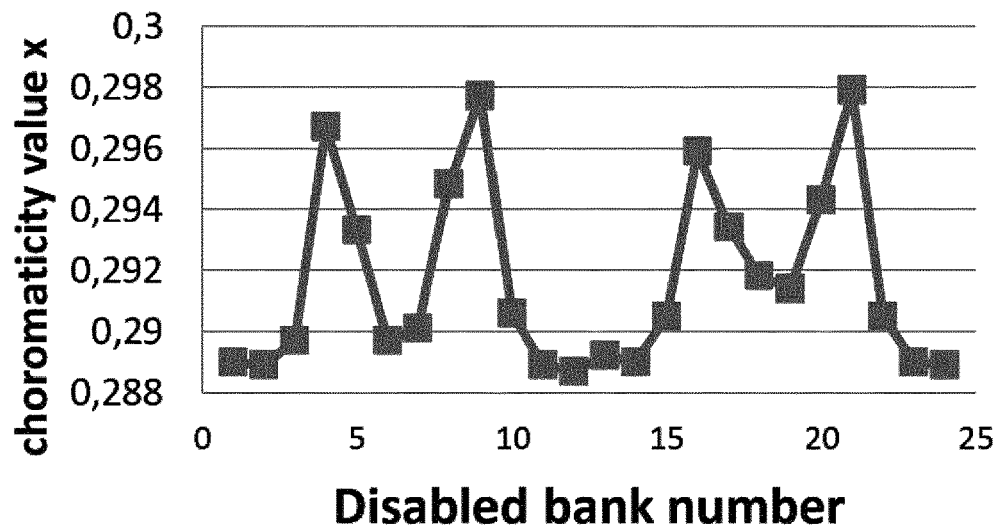
FIG. 5a shows the white x chromaticity value measured when all but one banks are on, each individual bank 1 to 24 being disabled sequentially.
Figure 5B:
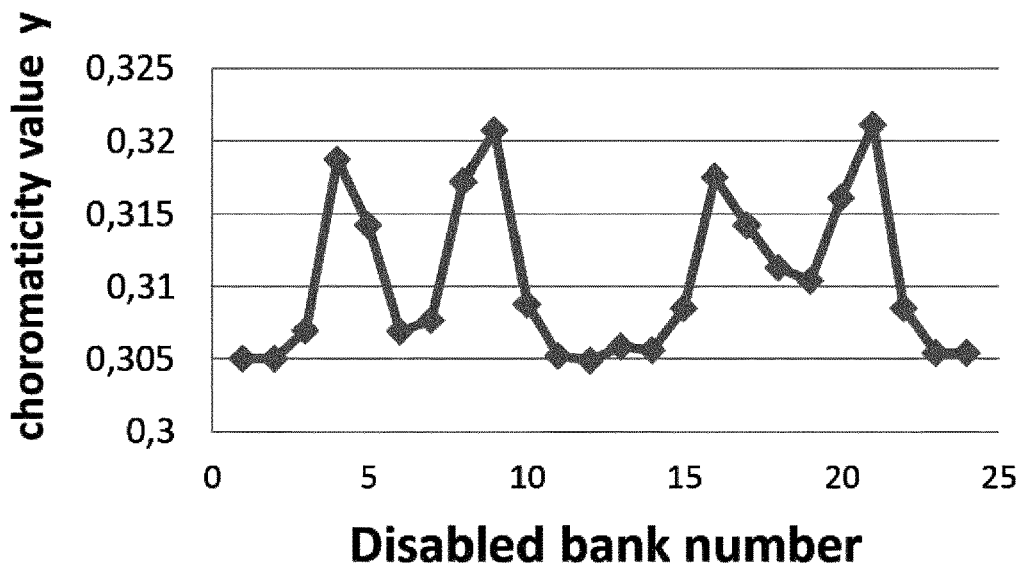
FIG. 5b shows the white y chromaticity value measured when all but one banks are on, each individual bank 1 to 24 being disabled sequentially.
Figure 5C:
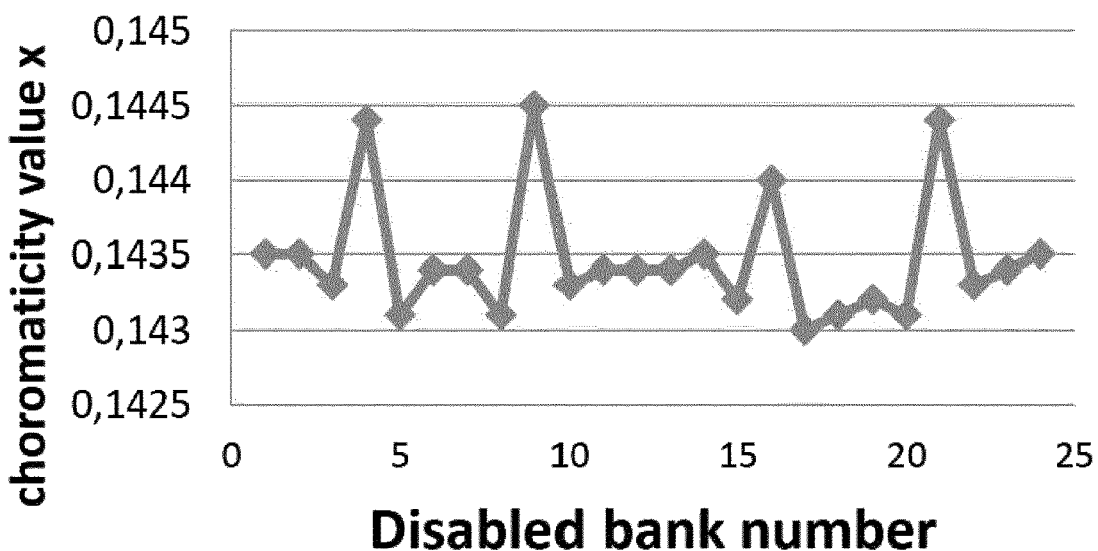
FIG. 5c shows the blue x chromaticity value measured when all but one banks are on each individual bank 1 to 24 being disabled sequentially.
Figure 5D:
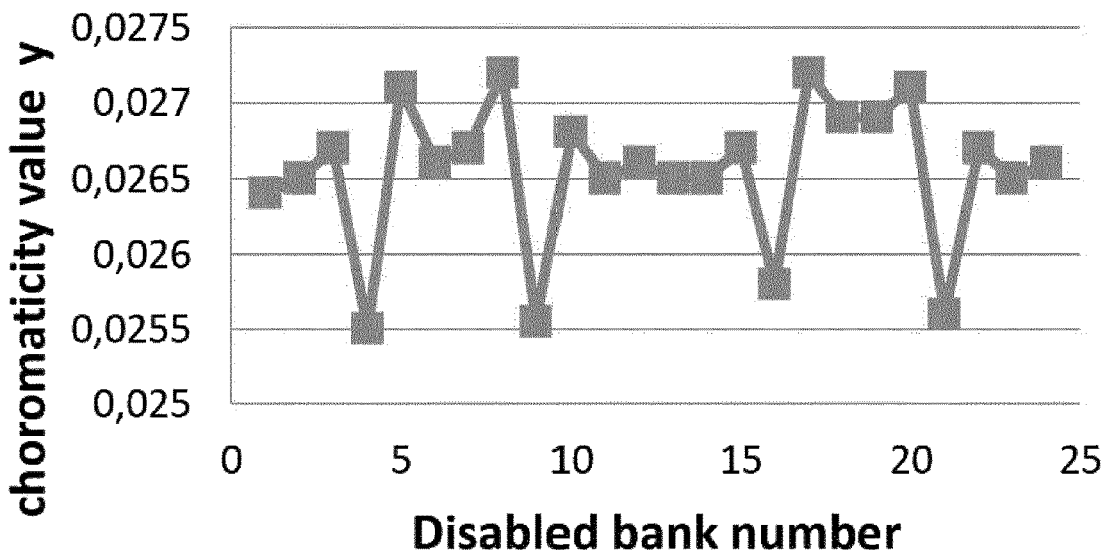
FIG. 5d shows the blue y chromaticity value measured when all but one banks are on each individual bank 1 to 24 being disabled sequentially.

FIG. 4 shows the dependence of the optical output, or intensity of the light, for two different temperatures, as a function of the driving current for direct blue light provided by a bank of light sources such as a laser diode bank which can be used in embodiments according to the present invention.

Embodiments of the present invention which provide methods, projectors and an optical arrangement for a projector are based on a methodology used to create a set of mathematical equations to mathematically describe the behavior of the light emitted by the projector which can be controlled by altering the driving currents of the light sources such as lasers in a projector. In embodiments of the present invention which provide methods, projectors and optical arrangements for projectors the blue and yellow light emissions of the projector are expressed as a function of the driving currents applied to them, as each bank can have a certain blue or yellow (or combined blue/yellow) light response resulting from applied driving currents.

Note that the blue and yellow components of the projector's light output are obtained by combining the light source with suitable optical components. The light from the light source can be incident upon an imaging engine, e.g. including a TIR prism and a Philips prism structure, for example, which splits the white light into three primary colours such as red green and blue beams. These beams can be each incident upon a light valve such as a DMD. Reflected light from the DMDs which is modulated in accordance with an image such as a video can be reformed by a Philips prism structure to form the projection beam which is directed through a projection lens. The blue light emission (or component) is the native output of the projector's blue primary) and the yellow output is the combination of the projector's green and red primaries.

Figure 20:
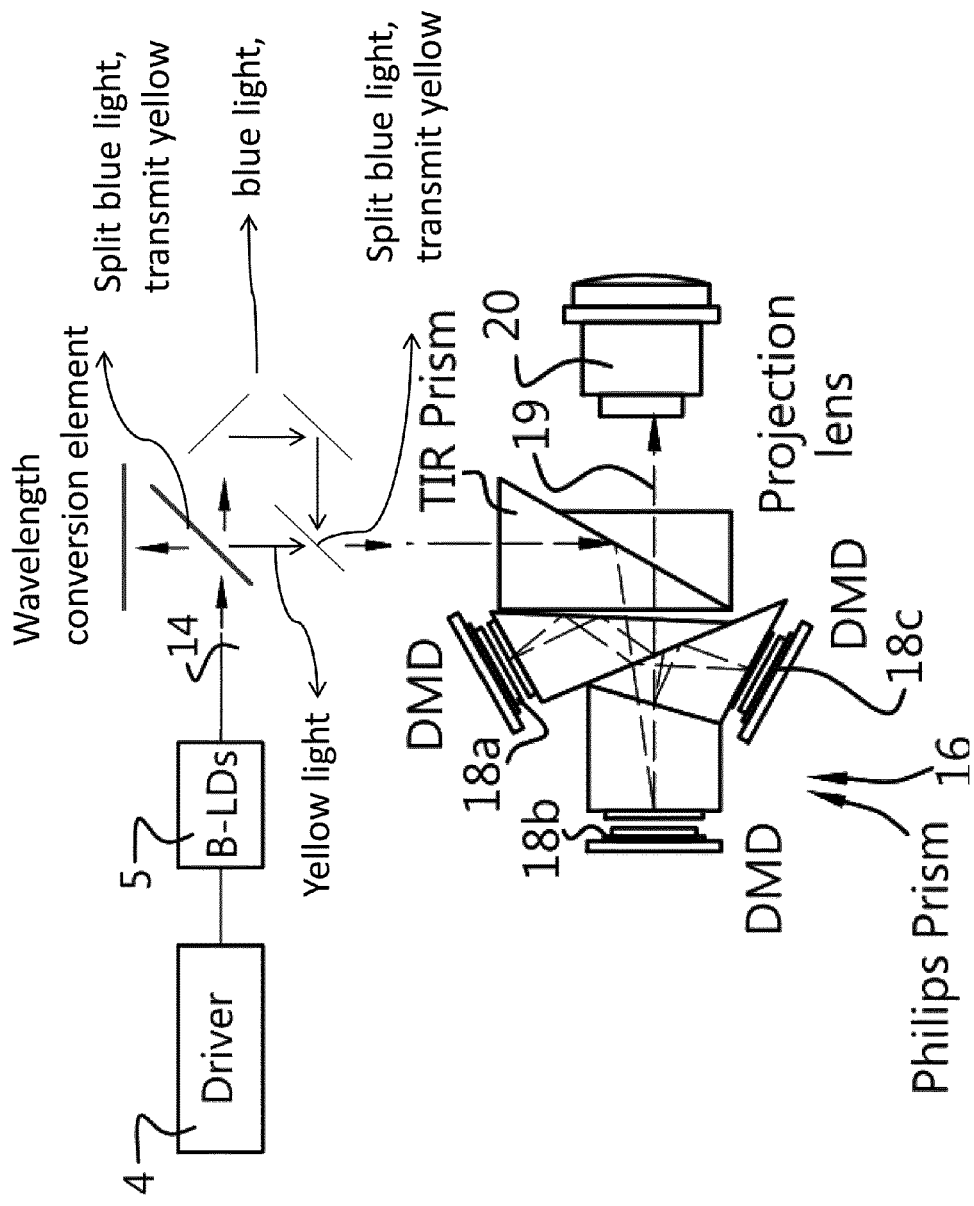
FIG. 20 illustrates an embodiment according to the present invention of a projector or an optical arrangement for a projector.

For details of a projector, see FIG. 20.

In addition there can be other conditions that are to be considered to be in the representative range when performing measurements on the output of a projector or an optical arrangement for a projector.

For example, the blue component of the light emitted by the projector or the optical arrangement for a projector can be evaluated in the projector or in a controller of the projector as a function of the contribution of each bank of blue light sources, e.g. laser diode bank, as the yellow wavelength conversion element ("phosphor") in some embodiments does not contribute to the blue component of the white light beam, or is negligible for the present model. However, in other embodiments for instance the prism can have coatings that cut the spectrum such that light from the wavelength conversion element partially contributes to the blue primary.

The set of equations for the blue component of the light express that the target XYZ tristimulus values for blue are the sums of the tristimulus blue values of the individual blue light source banks, each bank (of N banks) being driven by its individually controlled current IN, N=1 . . . 24:

$$XBT = XB1(I1) + XB2(I2) + \ldots + XB24(I24)$$

$$YBT = YB1(I1) + YB2(I2) + \ldots + YB24(I24)$$

$$ZBT = ZB1(I1) + ZB2(I2) + \ldots + ZB24(I24)$$

where XBT, YBT and ZBT are the target tristimulus values to be reached, and XBN, YBN and ZBN are linear or approximately linear functions expressing the blue tristimulus values emitted by bank number N as a function of the input current applied to that bank. Note that the powers are simply summed, as the light emitted by each of the different banks is independent of what the other banks emit (ignoring any secondary effects that may occur). Note that there are 24 currents in this example, as it is based on a design with 24 individually controllable laser banks. The present invention is not limited to 24 banks.

The yellow component of the light emitted by the projector or the optical arrangement for a projector is evaluated in a projector or in a controller for the projector as a function of the contribution of each blue light source, e.g. laser diode bank, which excites the wavelength conversion element ("phosphor"). For the yellow banks, the equations become:

$$XYT = f1(PB1,1(I1) + PB1,2(I2) + \ldots + PB1,24(I24))$$

$$YYT = f2(PB2,1(I1) + PB2,2(I2) + \ldots + PB2,24(I24))$$

$$ZYT = f3(PB3,1(I1) + PB3,2(I2) + \ldots + PB3,24(I24))$$

where XYT, YYT and ZYT are the target tristimulus values to be reached for yellow, and PBi,N are the blue stimuli emitted by bank number N, which excite the yellow wavelength conversion element ("phosphor"). Functions PBi,N are representative for the impinging blue power, but they are made in a relative way, such that, at the lowest currents where there are little to no non-linearities, the functions f1, f2, f3 are equal to 1. The functions f1, f2 and f3 are the non-linear functions that describe the non-linear response in light of the wavelength conversion element ("phosphor") when excited by the impinging blue light.

At the lowest levels, the functions have a 1 to 1 relation between input and output. At higher levels, the output of the functions corresponds to the measured non-linearity of the phosphor. The input is assumed to be proportional to the input blue laser light, which has a quite linear relation to the laser driving current.

In the above mathematical expressions, the functions f1, f2 and f3 are the non-linear functions that describe the non-linear response in light of the wavelength conversion element ("phosphor") when excited by the impinging blue light. Functions PBi,N are representative for the impinging blue power, exciting the phosphor. Note that the functions operate on the total blue power impinging on the phosphor, which is the sum of the blue powers of each laser bank.

The functions f1, f2 and f3 are determined empirically from measurements. More specifically, the currents applied to the blue lasers are set to a few distinct setpoints, and the corresponding XYZ values are measured on a yellow image for all these setpoints. These measurements are then interpreted, taking into account that the blue lasers have an approximately linear behavior, and that the phosphor has an approximately linear behavior at lower impinging power levels. Taking these linearities into account, the measured current vs X Y and Z relation of the phosphor can be used to determine the current vs power relation of the total blue laser power, by linearly extrapolating the current vs X, Y and Z values using the lowest measured values. One can then link the measured XYZ values on the yellow image to the extrapolated blue power values corresponding to these current levels, to determine the non-linear relation (which is described by the functions f1, f2 and f3). Note that the impinging blue light vs current relation is not an exact match, the function derived for blue this way is only relative, it does not correspond to the absolute value of the impinging blue power. In fact, at the lower levels, the functions have a one to one relation between the impinging blue power and the consequent XYZ converted values.

By means of curve fitting, functions can be determined express the non-linear relation of yellow converted phosphor light vs impinging blue power for any blue power level.

In embodiments of the present invention which provide methods, projectors and an optical arrangement for a projector, measurements can show that some banks can be combined due to their similar behavior. In embodiments of the present invention which provide methods, projectors and an optical arrangement for a projector, not all 24 currents will be independent variables in the equations above, as each bank belonging to the same group will be driven by the same current. Note that in this embodiment, two types of blue lasers are used, a first one, e.g. with a wavelength around 455 nm and a second one, e.g. with a wavelength around 465 nm. This is not a limitation of the present invention, as it can also be used when limiting the design to only a single laser type.

In order to combine various banks in a same group, the chromaticity of for example both the white light and the blue primary (or blue component) of the light emitted by the projector can be analyzed, as presented in FIGS. 5a to 5d.

In an embodiment according to the present invention, three groups of banks can for example be defined according to their chromaticity. In this embodiment, shown on FIGS. 5a to 5d, the three groups would each comprise the following banks:

Group 1: Banks 1, 2, 3, 6, 7, 10, 11, 12, 13, 14, 15, 18, 19, 22, 23, 24
This group combines the banks that mainly result in yellow light
Group 2: Banks 4, 9, 16, 21
This group combines the banks that emit a second blue light such as a 465 nm light. It can be seen in both the white and blue chromaticity that these banks are different from the others. Moreover, the max current for these lasers can be different from the one of the first blue light such as 455 nm lasers, so they should be separately controllable.
Group 3: Banks 5, 8, 17, 20
This group combines the 455 nm banks that have a smaller (or no) contribution to the yellow light.

Figure 23A:
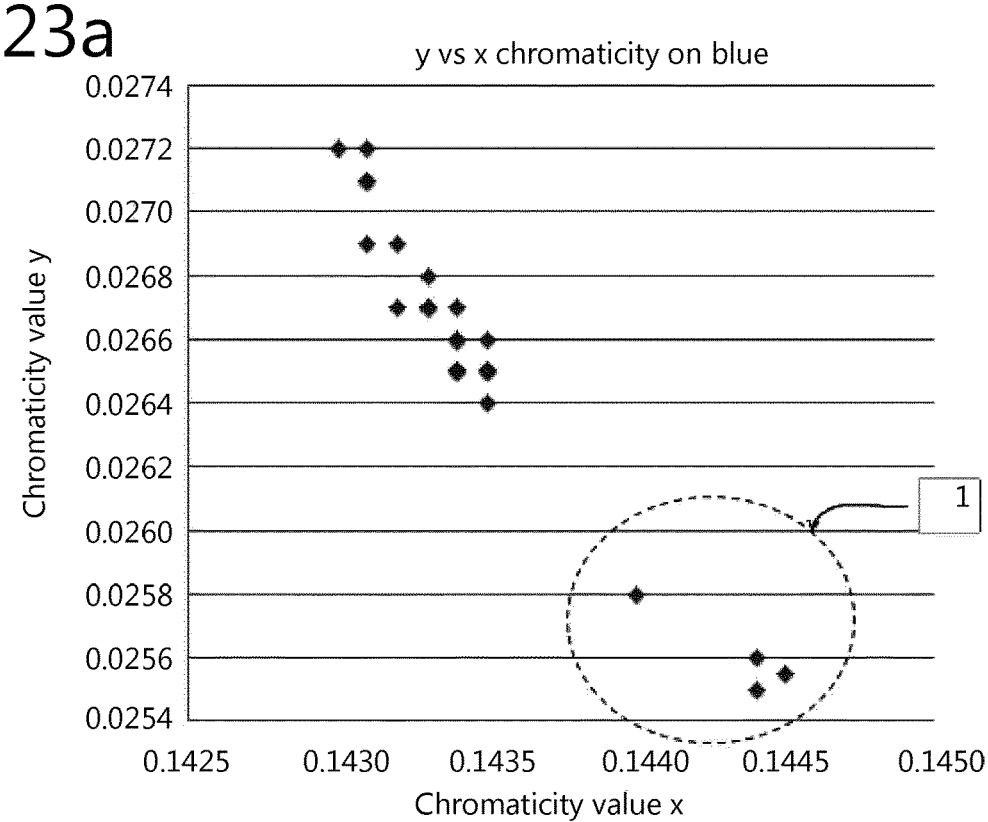
FIG. 23b shows the y vs x chromaticity values measured on the white combined beam.
FIG. 23c shows the y vs x chromaticity values measured on a reference projector by means of a subtractive test (all but one laser banks are on for each measurement). 2 groups of laser banks are marked in this figure.
FIG. 23d shows the y vs x chromaticity values measured on another projector of the same type as the one presented in FIG. 23c, also measured by means of a subtractive test (all but one laser banks are on for each measurement). The same laser bank grouping is used as the one in FIG. 23c. One can see that using the mapping algorithm on this projector would render a different result.
Figure 23B:
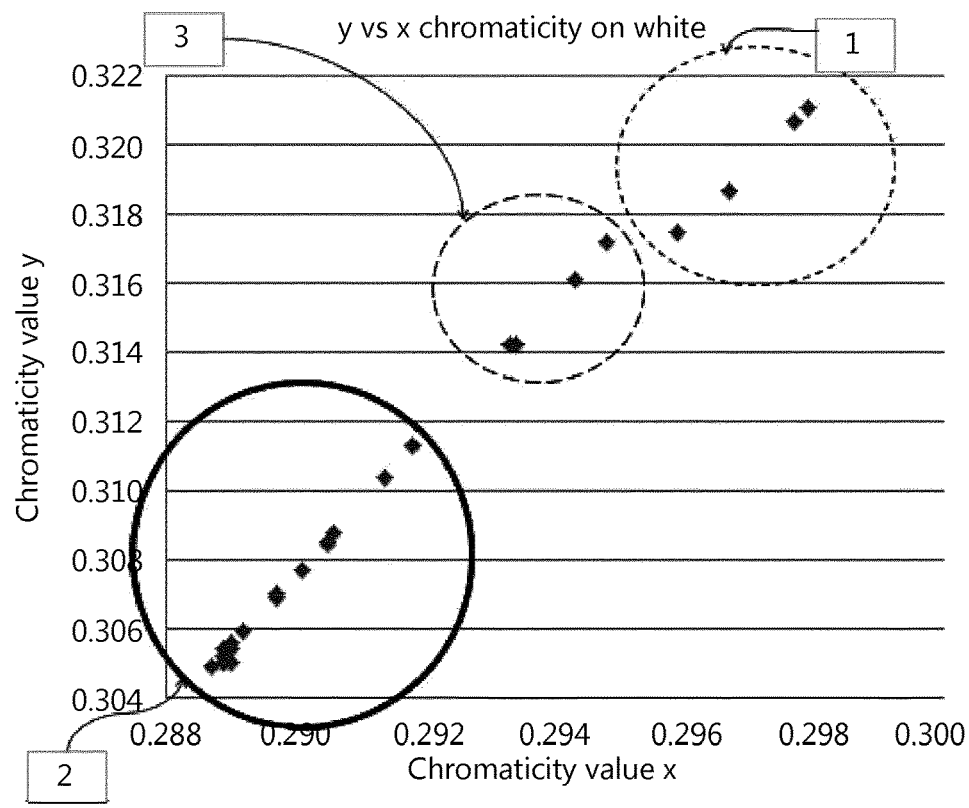

The light source will thus be driven with three independent currents instead of currents for all banks, e.g. 24. In other embodiments, less or more groups can be defined. The light sources can be grouped as a function of the chromaticity of the combined light beam and the blue component of the light beam, thus the groups are formed depending on the similarities in the chromaticity of the combined light beam and the blue component of that beam. This is illustrated in FIGS. 23a and 23b. In FIG. 23a, they vs x chromaticity values measured on the blue component clearly show the four 465 nm banks, which are marked with a circle and the number 1, and they are the group 2 banks. They are clear outliers compared to the bulk of the chromaticity values measured on the other banks. In FIG. 23b, the same four 465 nm banks are also marked with the number 1. In addition, the other 2 groups can easily be distinguished. The bulk of the remaining are marked with a circle and the number 2, these are the group 1 banks. The remaining four banks are the intermediate banks, marked with the number 3 and which correspond to group 3 defined above. An algorithm can be used to distinguish these groups. This algorithm can bundle the laser banks with similar chromaticities. As long as the lasers have close enough chromaticities they are considered to be part of the same group. This can be expressed mathematically using a threshold for instance, if the difference in chromaticity surpasses this threshold, the lasers can be split in different groups. The algorithm can be refined to make sure that the groups don't contain a very small amount of banks which can lead to noise.

Figure 23C:
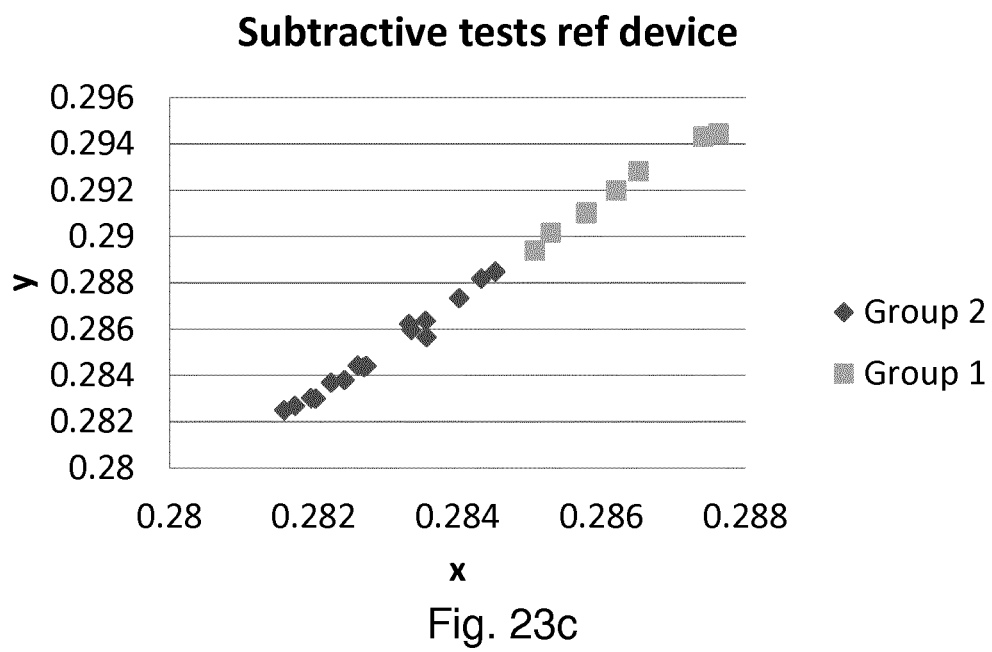
Figure 23D:
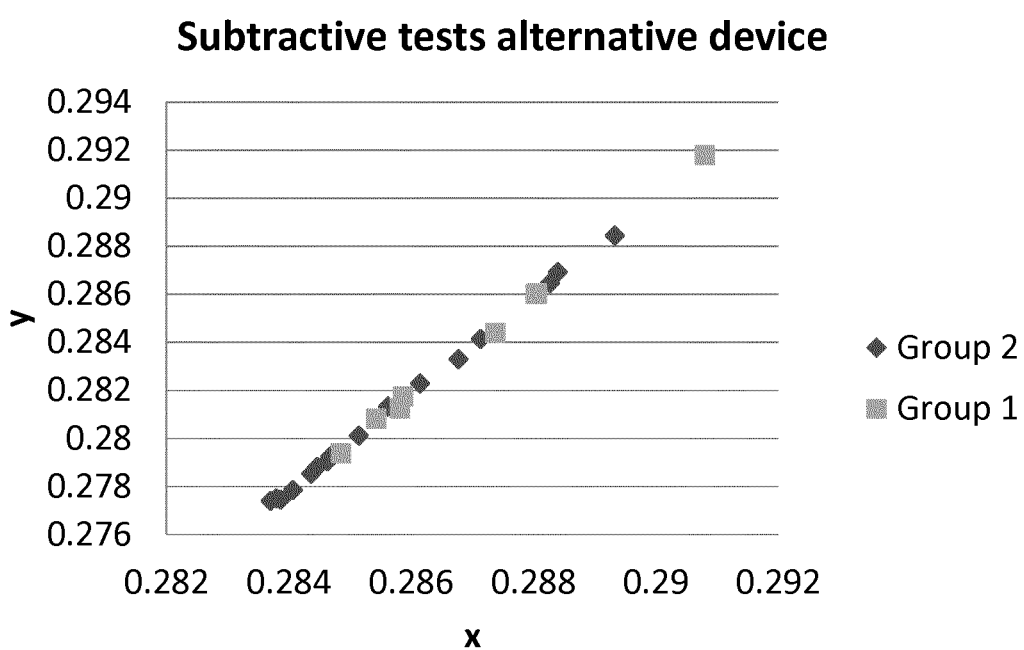

One would expect that there is a one to one relation between the physical location of a bank in the design to its corresponding group, meaning that individual banks are expected to result in consistent relative chromaticities among projectors with the same light source design. An example is shown on FIG. 23c. This implies that, when using the grouping algorithm on individual projectors of the same type, one would expect always to obtain the same result. However, in some cases there can be design variations which lead to changes in the relative amount of emitted blue vs converted light, which can lead to banks altering group, as illustrated in FIG. 23d where the behavior of group 1 and 2 does not form two distinct groups anymore.

For such projectors, an additional procedure shall be foreseen. In fact, due to variations in a projector's optical design with respect to the average one, the algorithm may fail to attain the proper color point stability over dimming level, because the difference between the average whitepoint of the groups is very minor for example, and knowing that the allowed driving current range is also restricted, the desired whitepoint stability over the dimming level may not be attainable. In other cases, the algorithm may reach the desired color point, but at the cost of compromising other aspects as for example the lifetime of the projector. As the difference between the groups is less pronounced, some lasers may be pushed to higher currents, causing them to age more rapidly.

To avoid such issues, an alternative procedure can be foreseen, which can regroup the banks, based on their yellow/blue balance. Using this additional procedure, the behavior of the groups should again match the reference one. This way, the algorithm ensures that the standard curves can be used with better results, and the finetuning procedure does not result in excessive current levels, making sure that the lifetime is not significantly reduced.

The next step of the method for a projector or for an optical arrangement for a projector according to the present invention is to solve the set of equations described above.

This set of equations can be solved for example using suitable known methods for non-linear equations. For example, the Levenberg-Marquardt algorithm can be used to solve non-linear least squares problems. In embodiments of the present invention which provide methods, projectors and an optical arrangement for a projector, this solution method can be used by starting from a set of initial currents, which are estimated. An optimization is then carried out to reduce a residue value to a minimum (or increase it to a maximum).

This residue can be used as a metric to define how good the obtained result is for a particular set of currents.

The linear functions XBN, YBN and ZBN, expressing the contribution to the blue tristimulus values by bank number N as a function of the input current applied to the bank, can be determined using a subtractive methodology. In this methodology, the reference condition is the condition where all banks are turned on. A reference measurement is made in this condition. Then an individual bank N is turned off, and the measurement is performed again. The difference between these two corresponds to the contribution of that bank. This is done for all banks. This method is used to make sure that the projector is characterized in a condition which is roughly representative for its normal operating condition. FIGS. 6a to 6c show the X, Y, Z tristimulus measurements for each bank as a function of the current applied.

Note that the data is limited, as these measurements are very time-consuming. These responses are roughly linear, which is to be expected from the behavior of the lasers. A polynomial fit of degree 2 can be used in the mathematical model, as it proved to be a better fit due to the slight non-linearity.

In embodiments of the present invention which provide methods, projectors and an optical arrangement for a projector these assumptions are taken into consideration in the algorithm.

Figure 7A:
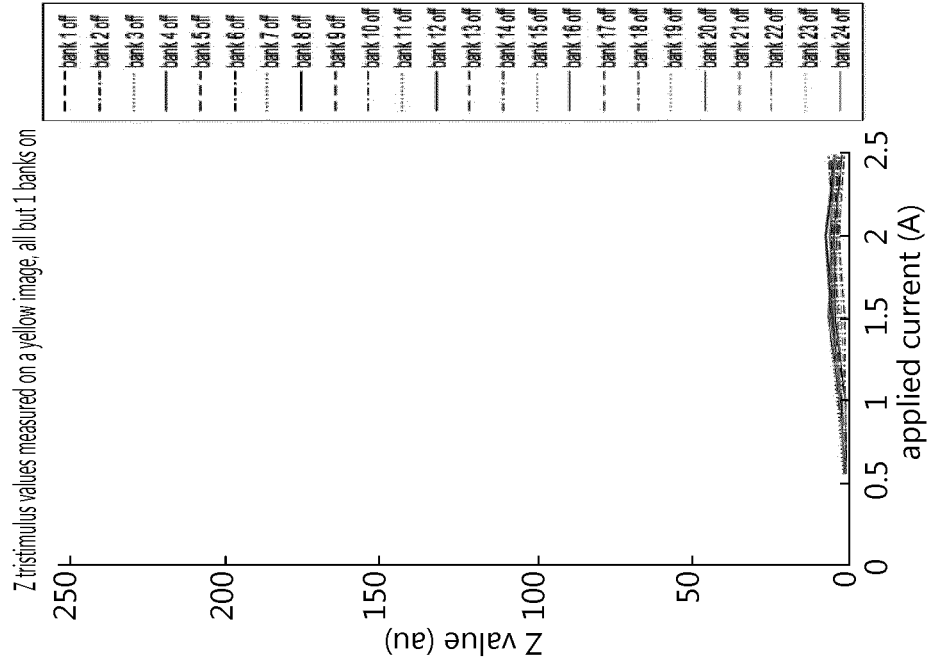
FIG. 7a shows the X tristimulus responses of the yellow component of the light depending on the driving current for each individual bank 1 to 24.
Figure 7B:
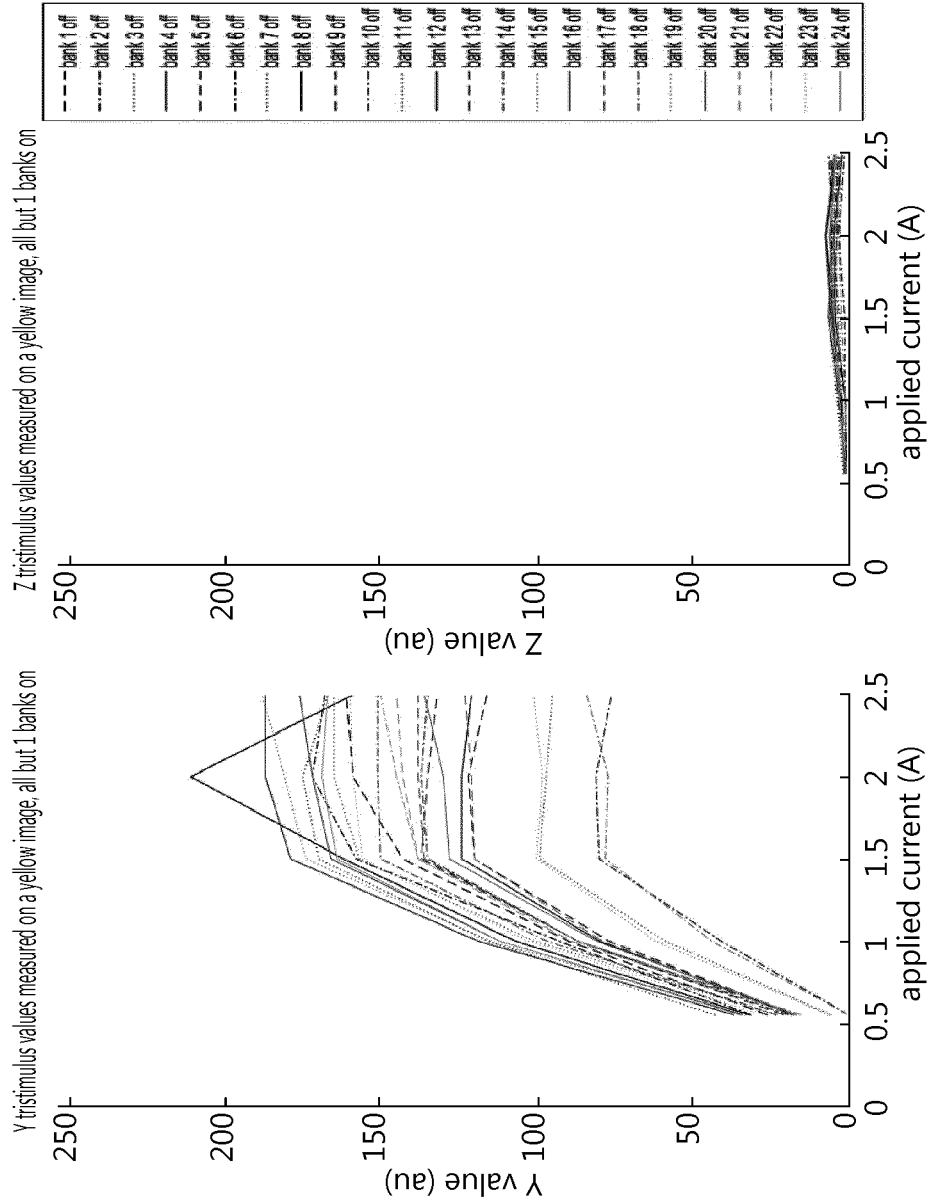
FIG. 7b shows the Y tristimulus responses of the yellow component of the light depending on the driving current for each individual bank 1 to 24.
Figure 7C:
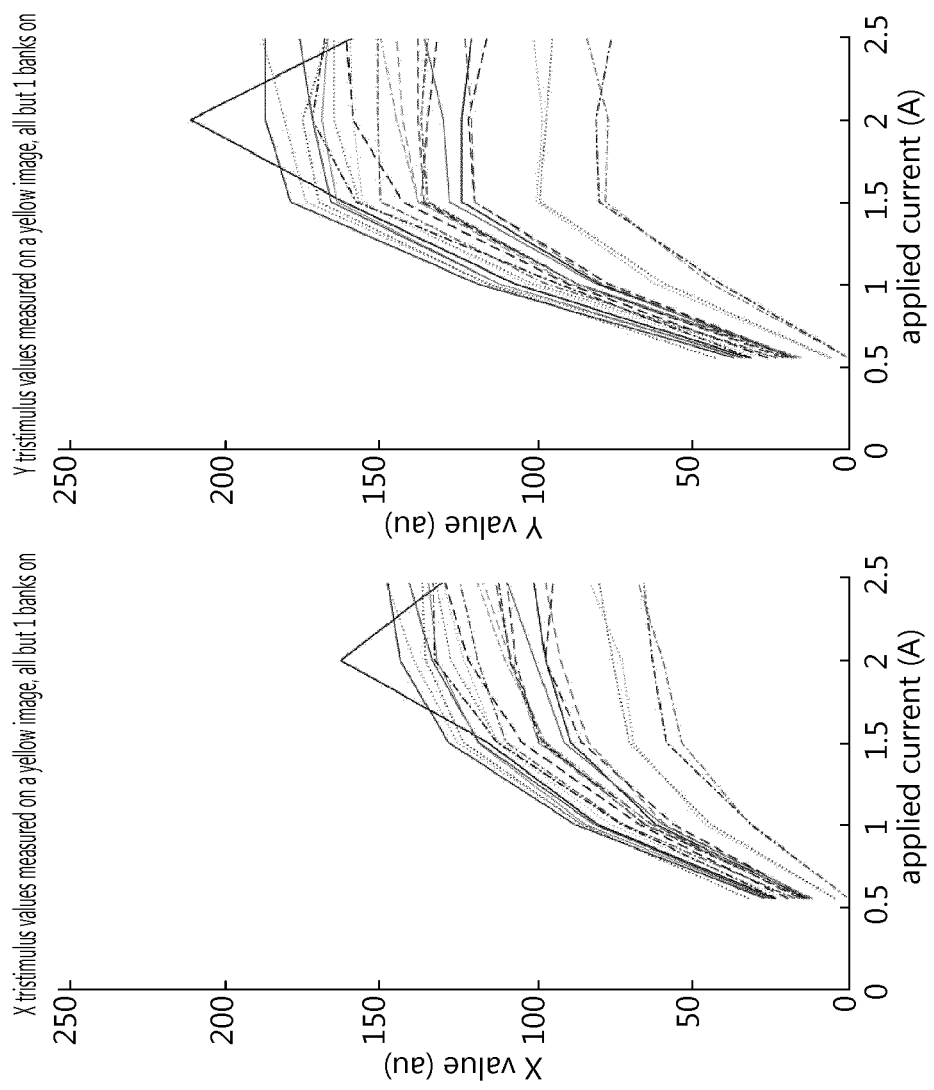
FIG. 7c shows the Z tristimulus responses of the yellow component of the light depending on the driving current for each individual bank 1 to 24.

The curves of FIGS. 6a to 6c and 7a to 7c can also be used to classify the banks into different groups. FIGS. 6a, 6b and 6c respectively correspond to the X, Y, Z tristimulus values measured on a blue image, all but 1 bank on. FIGS. 7a, 7b and 7c respectively correspond to the X, Y, Z tristimulus values measured on a yellow image, all but 1 bank on. Note that the measurements shown in FIGS. 6a-c and 7a-c are subtractive measurements, i.e. the difference between a situation where all banks are on, and a situation where all but one banks are on, to assess the contribution of that particular bank as shown on the plots.

From the curves of FIG. 6c for tristimulus value Z, which mostly represents the response to blue, some banks have a nearly flat response. These same banks have a maximal response in FIGS. 7a and 7b. Thus, it means that some banks mostly contribute to the X and Y tristimulus values, or in other words, the light of these banks is converted by the wavelength conversion element. On the other hand, other banks show a high response in the graph of FIG. 6c. These same banks have a lower response in the graphs of FIGS. 7a and 7b, thus these banks contribute mostly to the blue component of the light beam.

Finally, there are banks which contribute partially to the blue tristimulus value Z of FIG. 6c and partially to the X and Y tristimulus values of FIGS. 7a and 7b. Thus, from those Figures, it is possible to identify which groups contribute more to which component of the combined light beam. The number of groups P varies on the precision desired, on the type of projectors, the number of different laser types used in the design, on the speed of the method one wishes to achieve etc. However, the grouping has the advantage of averaging noise and small differences in performance of the responses of the various banks, which was for instance beneficial to define generic curves that can be used for different types of the same projector. Thus, in a first embodiment, three groups which comprise a group contributing mostly to the blue component, one mostly to the yellow component and one to both the blue and yellow components of the light beam can be used. In other embodiments, more groups with intermediate values of contributions to the various components of the light beam can be used, such as 4, 5, 7, 9, etc.

To determine the aforementioned non-linear functions $$XYT=f1(PB1,1(I1)+PB1,2(I2)+\ldots+PB1,24(I24))$$

$$YYT=f2(PB2,1(I1)+PB2,2(I2)+\ldots+PB2,24(I24))$$

$$ZYT=f3(PB3,1(I1)+PB3,2(I2)+\ldots+PB3,24(I24))$$

the following can be determined:
The blue stimuli depending on the driving current that excite the wavelength conversion element: PBi,N(IN).
The non-linear functions f1, f2 and f3 that link the sum of the total blue stimuli to the total yellow stimuli.

This can be done by measuring the tristimulus response for the yellow component of the light beam as a function of the driving current, using the same subtractive method as the one described above. The results of the measurements are shown on FIGS. 7a to 7c.

At lower levels, the wave conversion element ("phosphor") can respond roughly linearly to the impinging blue power, while at higher levels there is a non-linear effect, as can be seen on FIGS. 7a to 7c. This allows determining the functions f1, f2 and f3 and the functions PBi,N(IN). The linear functions PBi,N(IN) are more specifically derived by determining the linear function that matches the yellow measurements at the lowest light outputs, and extrapolating them to higher levels, as it can be assumed that the blue light emission is approximately linear. Due to this method, the sum of these functions will match the yellow light emission at the lowest levels. So the function fi can render the same output as input at the lowest levels. However, as the derived functions PBi,N(IN) are linear and the yellow stimuli are non-linear, the function fi will be non-linear as one would expect.

Note that these obtained functions PBi,N(IN) are relative functions; there is no need to retrieve the absolute value of the blue stimuli.

The curves were also rescaled to make sure that the sum of the individual banks adds up to the light emitted by all the banks.

Linking the total blue excitation at a certain current to the emitted yellow X, Y and Z value (as represented on this graph) at the same current will render the desired non-linear functions f1, f2 and f3. Note that the obtained functions are relative functions; the actual absolute value of the blue stimuli is not retrieved. The obtained curves are fitted with polynomial functions, such that they can be used as mathematical functions in the model used in this algorithm.

Figure 8C:
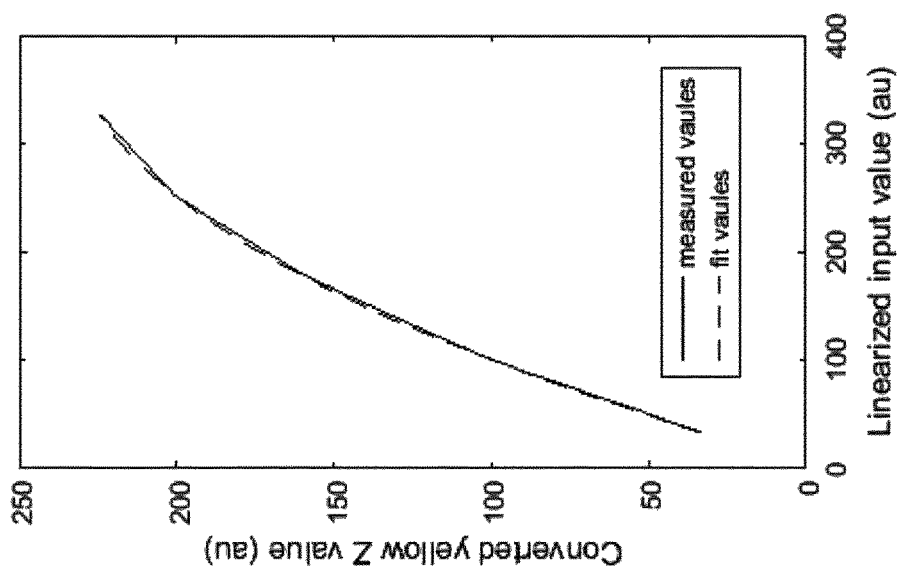
FIG. 8c shows the non-linear yellow response of the Z tristimulus as used in the model.
Figure 8B:
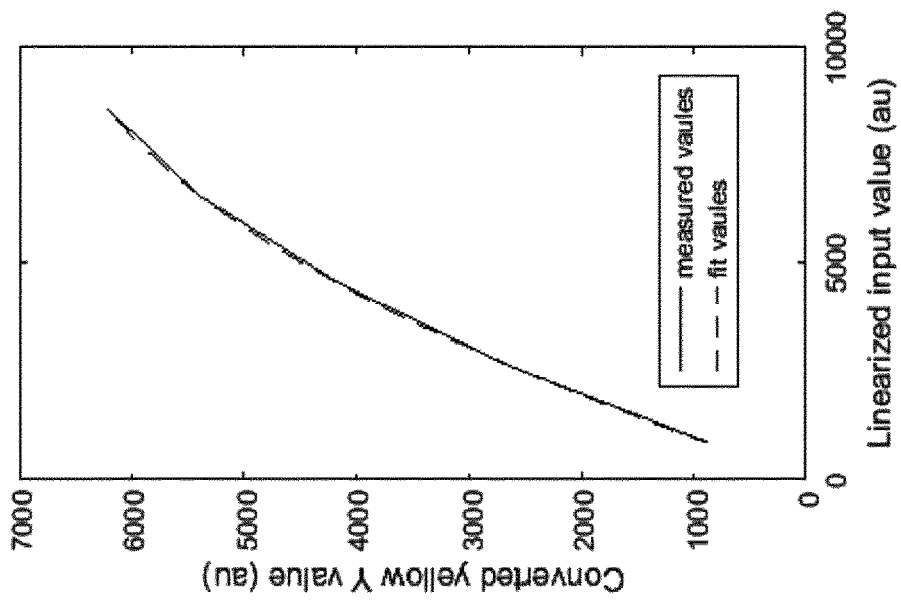
FIG. 8b shows the non-linear yellow response of the Y tristimulus as used in the model.
Figure 8A:
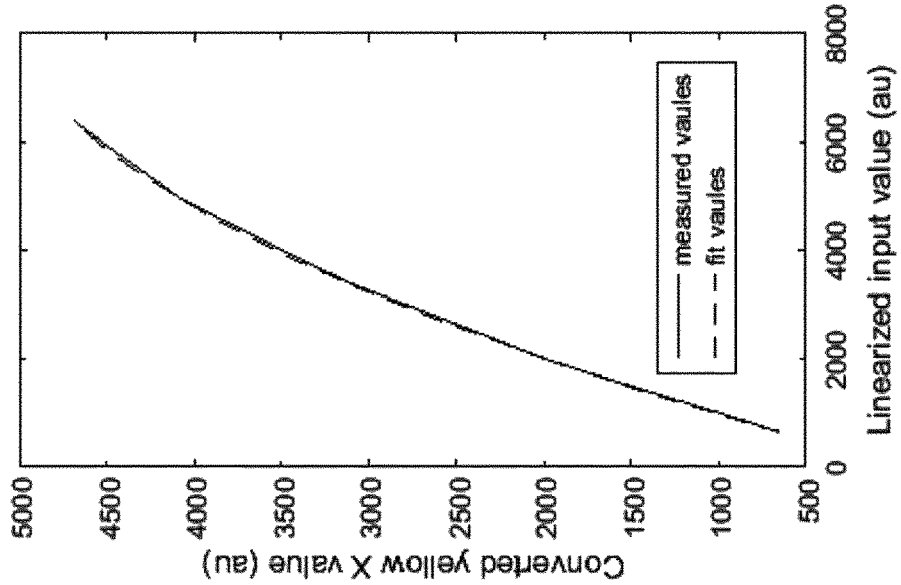
FIG. 8a shows the non-linear yellow response of the X tristimulus as used in the model.

FIGS. 8a to 8c respectively show the non-linear curves for yellow response for each X, Y and Z tristimulus respectively using the above methodology, so in other words, these are the non-linear functions f1, f2 and f3. The mathematical fit of the measurements is also depicted on the plot, which clearly show that a suitable mathematical fit has been found that represents the measurement data properly.

Once these empirical equations have been determined, for example by fitting, the set of equations can be solved in order to obtain the best suited driving currents for the different banks. Note that, in order to at least partly compensate for the non-linear behavior of one or more wavelength conversion materials, suitable solutions need to be found for the entire brightness range.

In embodiments of the present invention which provide methods, projectors and an optical arrangement for a projector, the Levenberg-Marquardt algorithm can be used. However, other methods to solve non-linear least squares problem can be used, as known by the skilled person. For example, the Gauss-Newton method, the Powell's Dog Leg Method, etc. or more generally a grey box model can be used.

In embodiments of the present invention which provide methods, projectors and an optical arrangement for a projector, it is advantageous to define the residue that should be minimized by the algorithm. The residue should be suitably defined such that any or some or all constraints should be optimized simultaneously:

The brightness and chromaticity of the targeted white point.
The brightness and chromaticity of the primaries.
The currents should not go beyond the maximum allowed current, specified in the datasheets.
The currents should obviously never be negative.
The currents of the banks that are driven up to 2.5 A should not be extremely different, otherwise the different banks will degrade very differently.

Accordingly, the optimization is one which must stay within constraints. Preferably, all these constraints are taken into consideration. Preferably they can be given suitable weights. These weights can be determined based on how critical a particular constraint is.

For instance, the maximum current should never be exceeded, otherwise the lasers could get damaged. Hence this criterion can be given a very high weighting. Instead, for example, the criterion that makes sure that the currents don't differ too much does not need an excessively high weight (or it can be omitted entirely), as otherwise the algorithm would not have enough freedom to obtain the intended targets. If the weight is too high, this would mean that all currents have to be equal, which can limit the freedom of the algorithm to find a suitable solution.

In embodiments of the present invention which provide methods, projectors and an optical arrangement for a projector an iterative process, while optimizing the residue, can work in the following way:

In embodiments of the present invention which provide methods, projectors and an optical arrangement for a projector, starting from initial currents, the algorithm iteratively looks for better suited currents with test currents, by calculating (potentially among other factors as described above) what the obtained luminance and chromaticity values are for these currents under test, and these are then compared to the desired luminance and chromaticity values. This comparison can be performed by using a residue which expresses how much an obtained result deviates from the desired one. The algorithm then attempts to find the minimum value for the residue, and the corresponding currents at that minimum residue are the optimized currents.

Calculate Obtained Responses for a Set of Input Currents

As mentioned before, the mathematical expressions used to express the XYZ tristimulus values of the blue and yellow emitted light as function of the driving currents are the following:

$$X\text{Blue} = XB1(I1) + XB2(I2) + \ldots + XB24(I24)$$

$$Y\text{Blue} = YB1(I1) + YB2(I2) + \ldots + YB24(I24)$$

$$Z\text{Blue} = ZB1(I1) + ZB2(I2) + \ldots + ZB24(I24)$$

$$X\text{Yellow} = f1(PB1,1(I1) + PB1,2(I2) + \ldots + PB1,24(I24))$$

$$Y\text{Yellow} = f2(PB1,1(I1) + PB1,2(I2) + \ldots + PB1,24(I24))$$

$$Z\text{Yellow} = f1(PB1,1(I1) + PB1,2(I2) + \ldots + PB1,24(I24))$$

In embodiments of the present invention which provide methods, projectors and an optical arrangement for a projector these equations are used to look for suitable currents I1, I2, . . . I24. Note that, grouping can be used to reduce the number of currents, e.g. to only 3 currents I1, I2 and I3 rather than using all of the 24 currents, as mentioned before. This illustrates that grouping or not grouping is not a limitation, more or less currents can be used. The algorithm will iteratively attempt currents (we call these currents I1_test, I2_test, . . . I24_test), and these currents are used in the above mathematical equations. For these test currents, the above equations become:

$$\text{obtained\_blue\_}X = XB1(I1\_\text{test}) + XB2(I2\_\text{test}) + \ldots + XB24(I24\_\text{test})$$

$$\text{obtained\_blue\_}Y = YB1(I1\_\text{test}) + YB2(I2\_\text{test}) + \ldots + YB24(I24\_\text{test})$$

$$\text{obtained\_blue\_}Z = ZB1(I1\_\text{test}) + ZB2(I2\_\text{test}) + \ldots + ZB24(I24\_\text{test})$$

$$\text{obtained\_yellow\_}X = f1(PB1,1(I1\_\text{test}) + PB1,2(I2\_\text{test}) + \ldots + PB1,24(I24\_\text{test}))$$

$$\text{obtained\_yellow\_}Y = f1(PB1,1(I1\_\text{test}) + PB1,2(I2\_\text{test}) + \ldots + PB1,24(I24\_\text{test}))$$

$$\text{obtained\_yellow\_}Z = f1(PB1,1(I1\_\text{test}) + PB1,2(I2\_\text{test}) + \ldots + PB1,24(I24\_\text{test}))$$

The obtained XYZ values for blue are named:
obtained_blue_X, obtained_blue_Y, obtained_blue_Z,
and for yellow are named:
obtained_yellow_X, obtained_yellow_Y, obtained_yellow_Z We can then calculate the obtained chromaticities of yellow, blue and white:

$$\text{obtained\_blue\_}x = \frac{\text{obtained\_blue\_}X}{\text{obtained\_blue\_}X + \text{obtained\_blue\_}Y + \text{obtained\_blue\_}Z}$$

$$\text{obtained\_blue\_}y = \frac{\text{obtained\_blue\_}Y}{\text{obtained\_blue\_}X + \text{obtained\_blue\_}Y + \text{obtained\_blue\_}Z}$$

$$\text{obtained\_yellow\_}x = \frac{\text{obtained\_yellow\_}X}{\text{obtained\_yellow\_}X + \text{obtained\_yellow\_}Y + \text{obtained\_yellow\_}Z}$$

$$\text{obtained\_yellow\_y} = \frac{\text{obtained\_yellow\_Y}}{\text{obtained\_yellow\_X} + \text{obtained\_yellow\_Y} + \text{obtained\_yellow\_Z}}$$

$$\text{obtained\_white\_x} = \frac{\text{obtained\_blue\_X} + \text{obtained\_yellow\_X}}{\text{obtained\_blue\_X} + \text{obtained\_blue\_Y} + \text{obtained\_blue\_Z} + \text{obtained\_yellow\_X} + \text{obtained\_yellow\_Y} + \text{obtained\_yellow\_Z}}$$

$$\text{obtained\_white\_y} = \frac{\text{btained\_blue\_Y} + \text{obtained\_yellow\_Y}}{\text{obtained\_blue\_X} + \text{obtained\_blue\_Y} + \text{obtained\_blue\_Z} + \text{obtained\_yellow\_X} + \text{obtained\_yellow\_Y} + \text{obtained\_yellow\_Z}}$$

Likewise, the desired XYZ values for blue are named:
desired_blue_X,desired_blue_Y,desired_blue_Z
And for yellow:
desired_yellow_X,desired_yellow_Y,desired_yellow_Z
The desired chromaticities are calculated similarly, and are named:
desired_blue_x, desired_blue_y for blue,
desired_yellow_x desired_yellow_y for yellow, and
desired_white_x desired_white_y for white
An example for calculating the residue is hereby provided:
The algorithm calculates the difference between obtained and desired chromaticity, e.g. as follows:

blue_error=[desired_blue_$x$−obtained_blue_$x$,
 desired_blue_$y$−obtained_blue_$y$,
 (desired_blue_$Y$−obtained_blue_$Y$)/
 desired_blue_$Y$*100];

white_error=[desired_white_$x$−obtained_white_$x$,
 desired_white_$y$−obtained_white_$y$,
 (desired_white_$Y$−obtained_white_$Y$)/
 desired_white_$Y$*100];

yellow_error=[desired_yellow_$x$−obtained_yellow_$x$,
 desired_yellow_$y$−obtained_yellow_$y$,(desired_yellow_target(2)−obtained_yellow_$Y$)/
 desired_yellow_$Y$*100];

Several scaling factors can be defined:
current consistancy factor=0.8;
blue_yellow_chroma_factor=1;
blue_yellow_lumen_factor=0.1;
white_chroma_factor=1000;
white_lumen_factor=100;
Eventually, the residue r is calculated as follows:

$r$=zeros(9+$nr$_groups+size_group_consistency(1),1);

$r$(1,1)=blue_error(1)*blue_yellow_chroma_factor;

$r$(2,1)=blue_error(2)*blue_yellow_chroma_factor;

$r$(3,1)=blue_error(3)*50*blue_yellow_lumen_factor;

$r$(4,1)=yellow_error(1)*blue_yellow_chroma_factor;

$r$(5,1)=yellow_error(2)*blue_yellow_chroma_factor;

$r$(6,1)=yellow_error(3)*0.8*blue_yellow_lumen_factor;

$r$(7,1)=white_error(1)*white_chroma_factor*10;

$r$(8,1)=white_error(2)*white_chroma_factor*10;

$r$(9,1)=white_error(3)*0.5*white_lumen_factor;

This means that the residue vector comprises 9 elements that are minimized together. The residues corresponding to the errors in luminance and chromaticity of white are given the highest weights, as this is a primary goal in embodiments of the present invention which provide methods, projectors and an optical arrangement for a projector.

To determine the driving currents at multiple brightness levels, the algorithm can be applied to rescaled versions of the target X, Y and Z values, as this will result in a rescaled luminance while maintaining the chromaticity. In embodiments of the present invention which provide methods, projectors and an optical arrangement for a projector the brightness can be normalized between 0 and 1 (with 1 being the maximum light output level). For each brightness level, the XYZ values are scaled accordingly.

Starting value for the calculation

Depending on the provided starting currents, the speed of convergence can be affected. The following choices can be made for the initial currents.

The calculation is started from the highest current. To obtain a suitable solution for this first level, excessive currents can be given as initial input parameters for the currents.

Several other options are also foreseen, which are only attempted if no good solution is found using this standard method. Essentially, other input values are tested being other variations of the starting currents. For instance, one or a multiple of the starting currents are lowered significantly. If none of them render a suitable solution within the acceptable tolerance limit, the best suited one is selected based on the obtained residuals. It has proved possible to always find a practically usable solution this way.

The currents for lower light output levels were calculated starting from the obtained currents at higher levels. To obtain an appropriate solution smoothly, the currents for consecutive light output levels were calculated in small steps of decreasing target light output. For instance, the range between the max and min light output levels was divided into 1000 levels. This was done to make sure that the algorithm converges quickly when using the obtained currents for higher levels as input for the lower levels. As there are only small increments in light output level, the expected increments between consecutive current levels are also expected to be small.

In case the aforementioned method does not render a suitable solution within a realistic number of iterations, several other input variations can be attempted in order to make sure that a suitable current level is reached:

The output levels of the previous step are multiplied with a scaling factor for each current. Several variations are tested, where the outputs are for instance all scaled by the same, or by individually selected scaling parameters. For instance, they can all be multiplied by 0.95, in order to have a significant difference between the output of the previous level.

The best suited approximation is then selected based on the obtained residual, like it was done for the first level.

Obtained Simulation Results

Figure 9C:
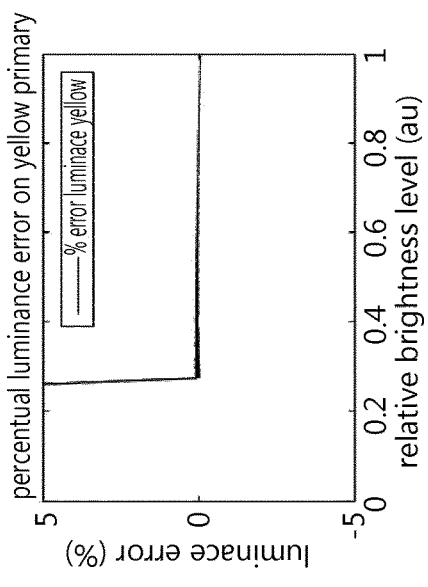
FIGS. 9a-f show the error on white, blue and yellow luminance (a-c) and chromaticity (d-f) respectively.
Figure 9B:
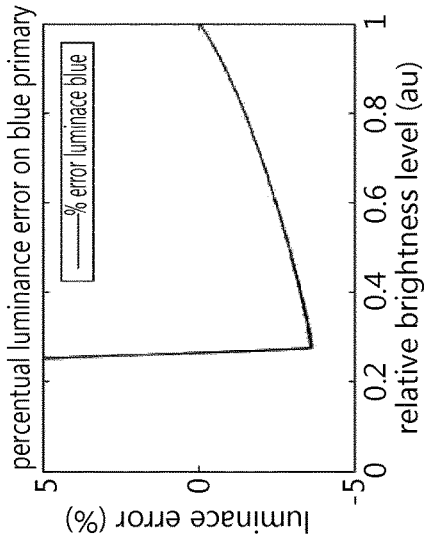
Figure 9A:
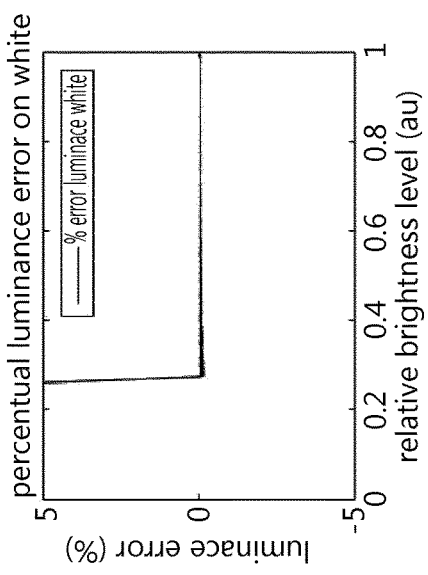
Figure 9F:
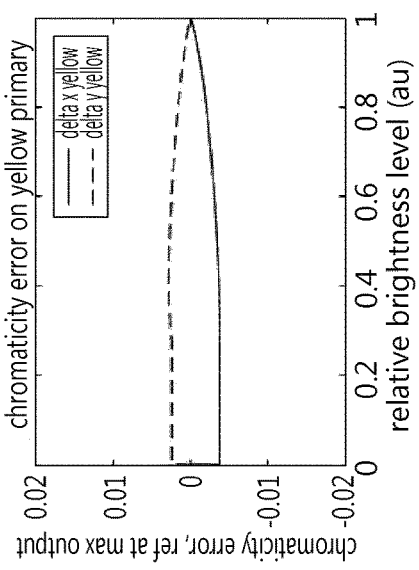
Figure 9E:
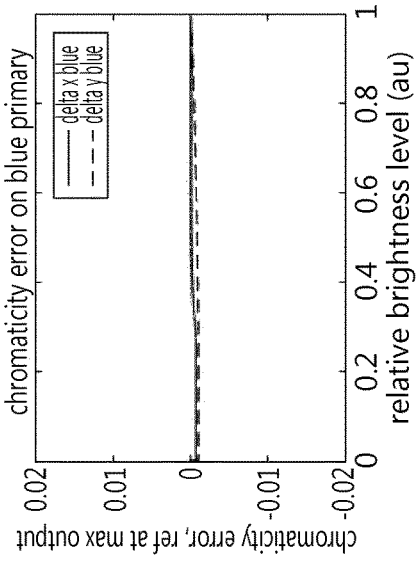
Figure 9D:
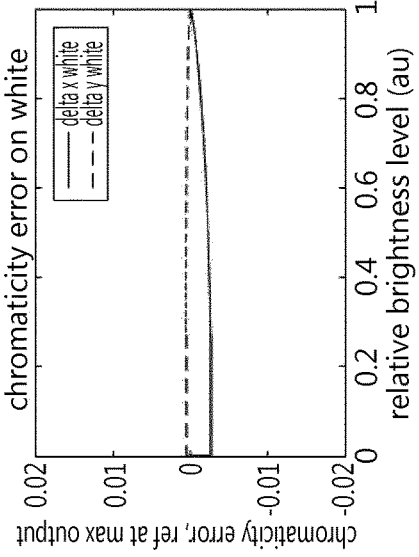

The obtained luminance and chromaticity errors for white, blue and yellow relative to the ideal output values, when limiting to 3 driving currents are shown in FIGS. 9a to 9c for errors on luminance for white, blue and yellow respectively and FIGS. 9d to 9f for errors on chromaticity for white, blue and yellow respectively.

Figure 10:
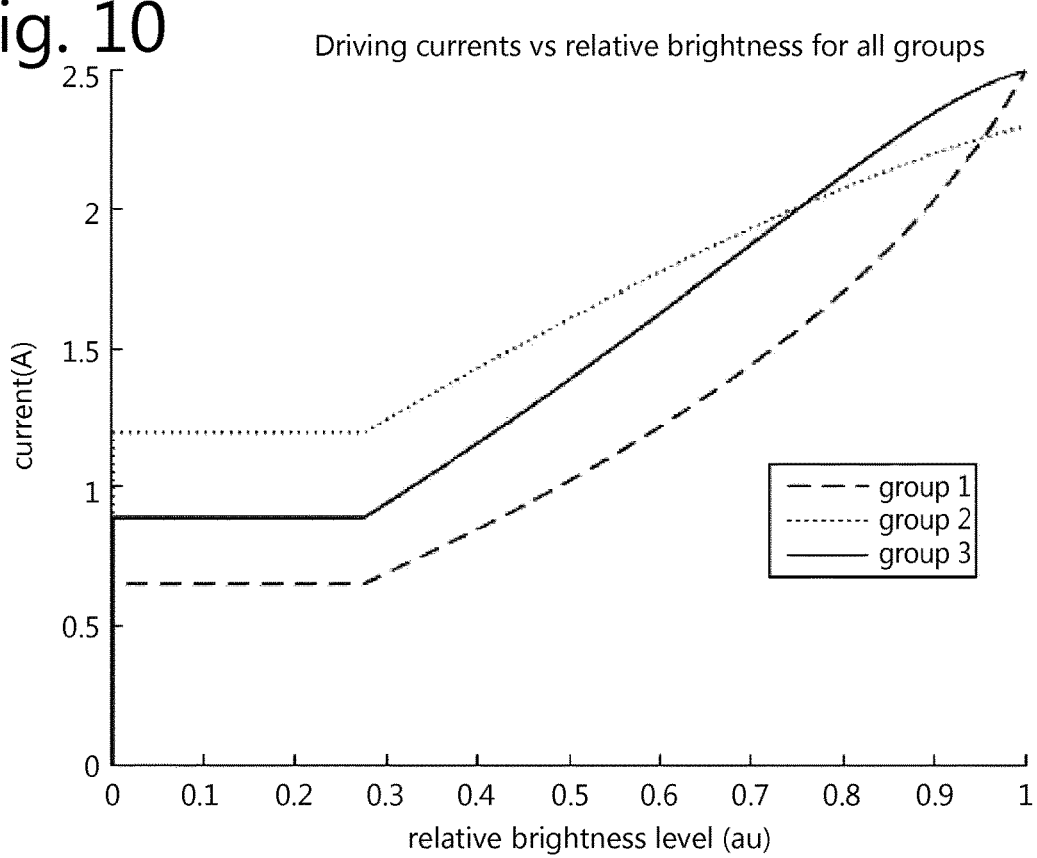
FIG. 10 shows the calculated currents of the 3 groups of banks, depending on the impinging light.

The value on the x-axis represents the normalized light output. The corresponding driving currents for the 3 groups are depicted in FIG. 10. Note that the 455 nm banks can be driven up to 2.5 A, while the 465 nm banks can be driven up to 2.3 A, hence the difference in maximum current in the Figure.

At a certain light output level, the thresholds of the lasers can be reached. Determining the actual threshold is not easy, as there is statistical variation between individual lasers, and the threshold can be temperature dependent. Therefore, a suitable threshold is calculated, at which (nearly) all lasers still operate at the edges of the allowed temperature range of the projectors. The reason the lasers are capped at lower levels, is that the colorpoint may become unstable due to the variation between individual lasers. Some may cease to emit light below a certain current while others may still operate, causing changes in the projector's whitepoint.

It is clear from the above plot that the resulting errors are minor. However, the error on the yellow chromaticity deserves a closer look as it is significantly higher compared to the other currents. To further analyze this striking difference, spectral changes of yellow depending on the driving current are presented in FIG. 11.

The projector's emission spectrum varies depending on the impinging power level and this could require determining more correct driving currents, or it could even impose a fundamental limit to what the color correction algorithm can do.

Figure 11:
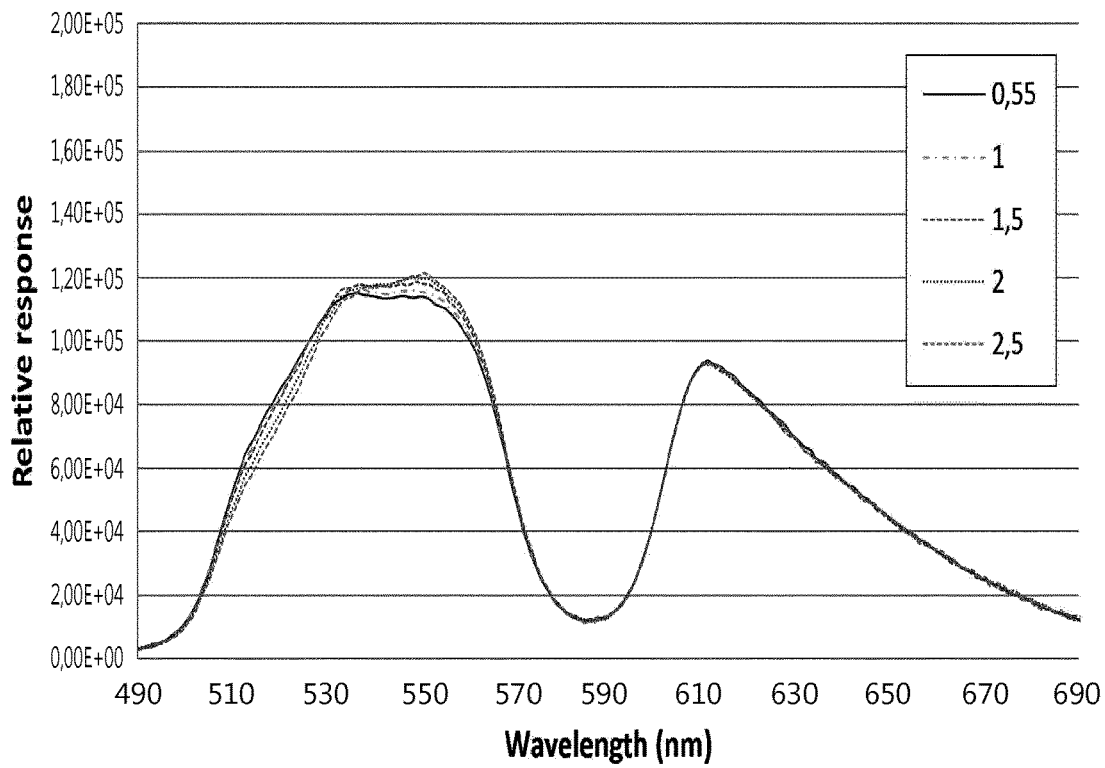
FIG. 11 shows the spectral change of the green and red component depending on the driving current of the lasers.

The spectrum of the yellow (green+red) primary is presented at different operating currents (FIG. 11). The shape is normalized in order to visualize the change in the shape of the spectrum.

Figure 12:
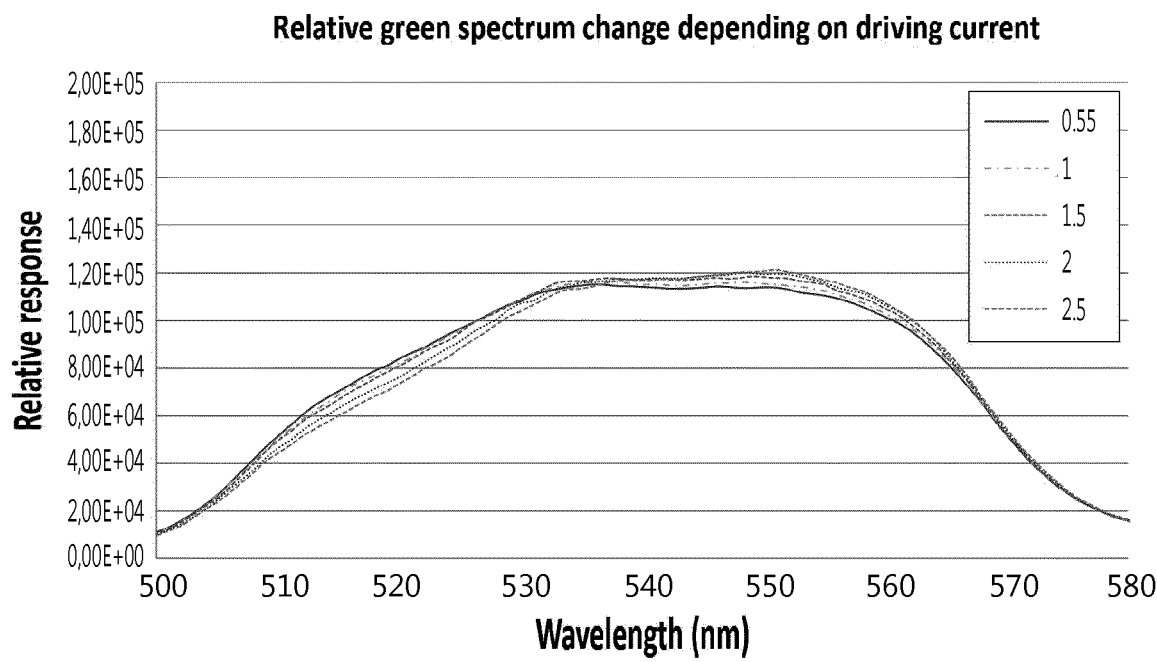
FIG. 12 shows a detailed view of the green spectrum change depending on the driving current of the lasers of FIG. 11.

A more detailed plot of the spectrum of the green primary is presented at different operating currents on FIG. 12. The shape is also normalized in order to visualize the change in the shape of the spectrum.

Figure 13:
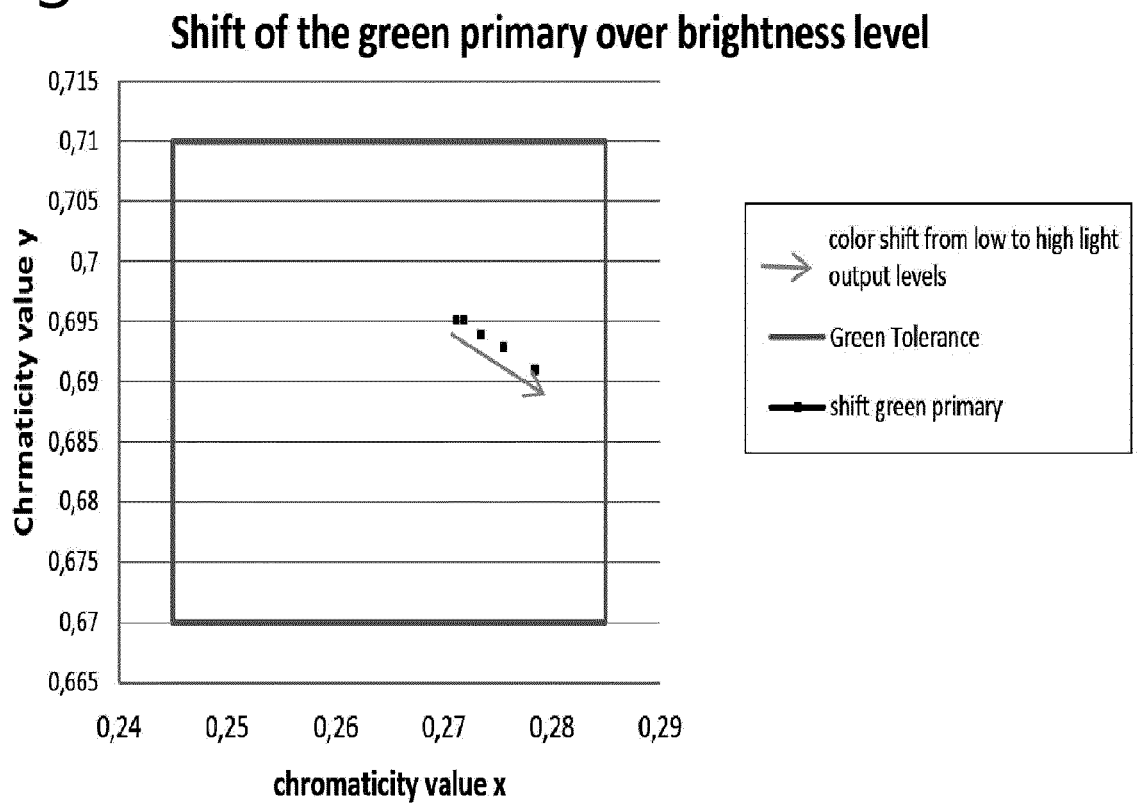
FIG. 13 shows the shift of the chromaticity of the green primary depending on the driving current.

It is clear from the plots of FIG. 11 that the red spectrum remains very stable depending on the driving current, while the green spectrum does alter somewhat. This might be caused by an altered behavior of the wavelength conversion element ("phosphor") depending on the impinging optical power, or alternatively this might be due to changes in the engine of the projector. When converting this into chromaticities, the following shift is obtained, as shown on FIG. 13. Note that the arrow indicates the shift from the lowest to highest driving current. One could consider methods where the green primary can be combined with red and blue to make sure that the chromaticity of the green remains more consistent.

This effect can also explain the small remaining errors on the chromaticity of the white patch. As the yellow chromaticity is shifting over the driving level, and there is only control over the driving of the blue and yellow primary, it can be expected that the best possible approximation that can be obtained for the white point also shifts depending on the driving level.

Measurement Results

Figure 14A:
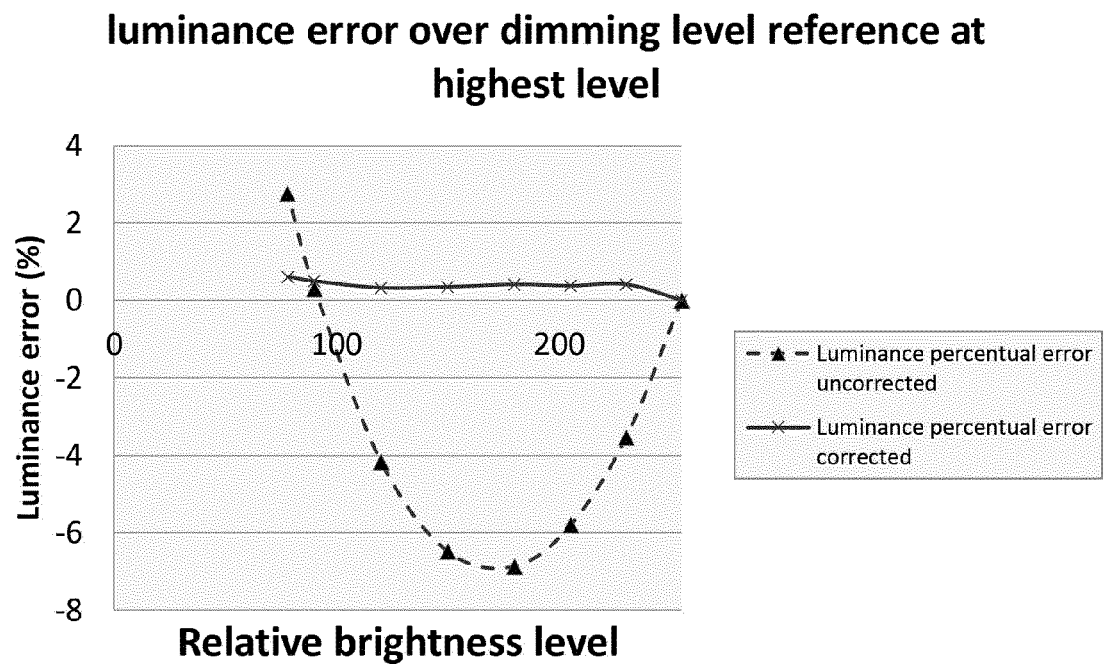
FIG. 14a shows the luminance error over dimming level reference at highest level
Figure 14B:
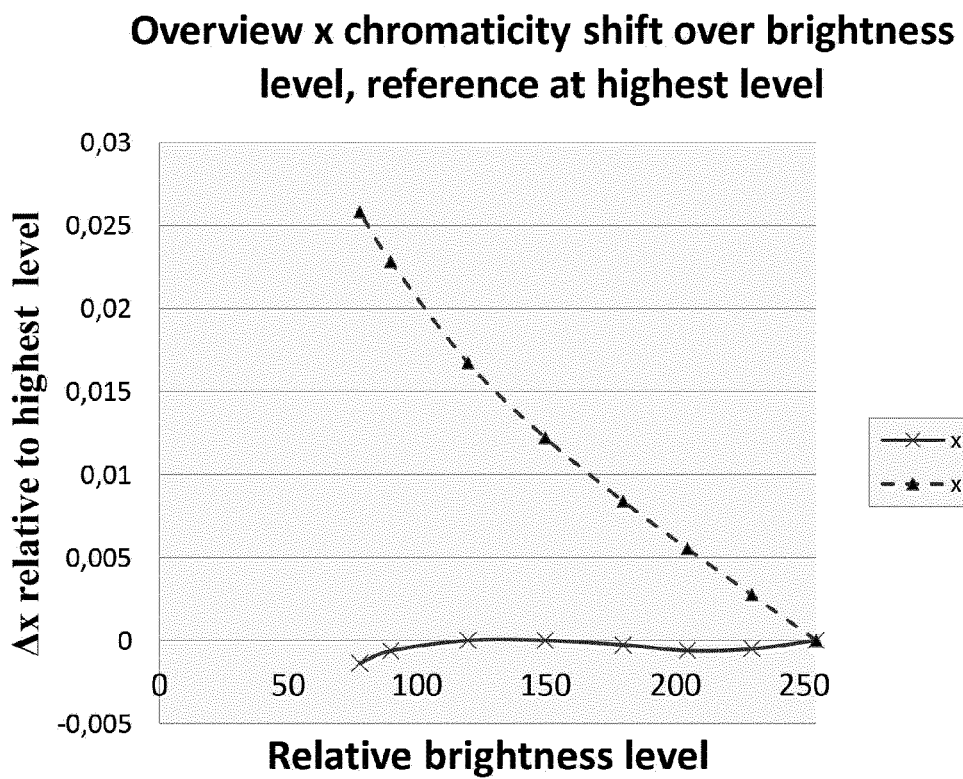
FIG. 14b shows the x chromaticity shift over brightness level, reference at highest level
Figure 14C:
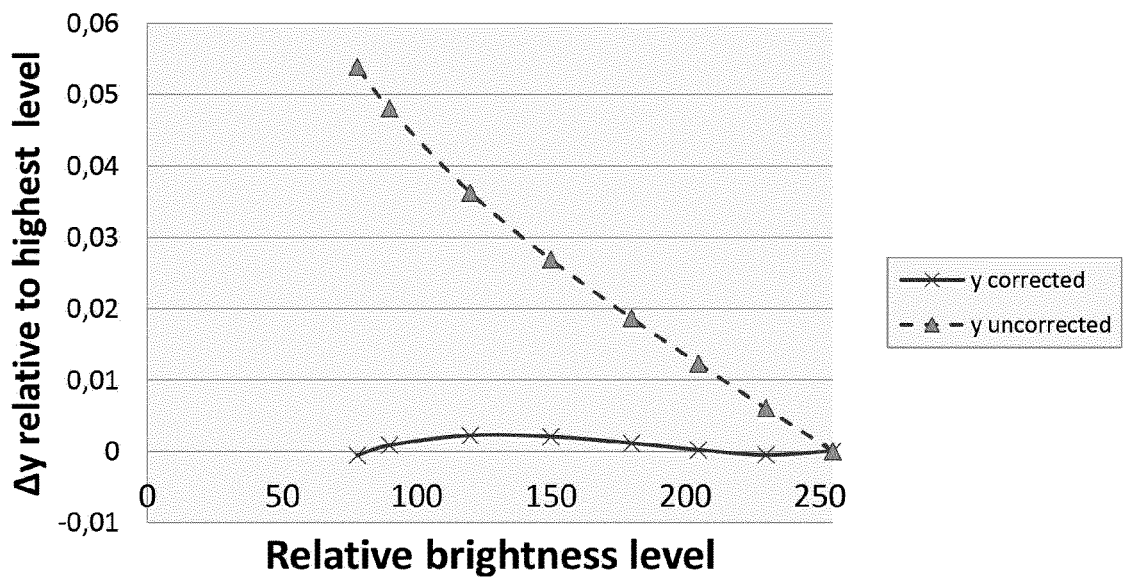
FIG. 14c shows the y chromaticity shift over brightness level, reference at highest level
Figure 14D:
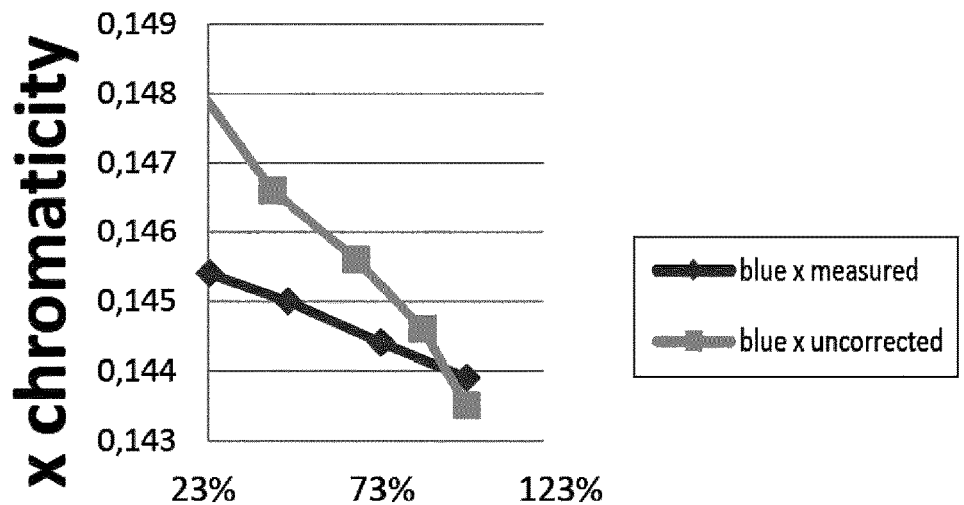
FIG. 14d shows the x chromaticity shift for the blue component as a function of the brightness level
Figure 14E:
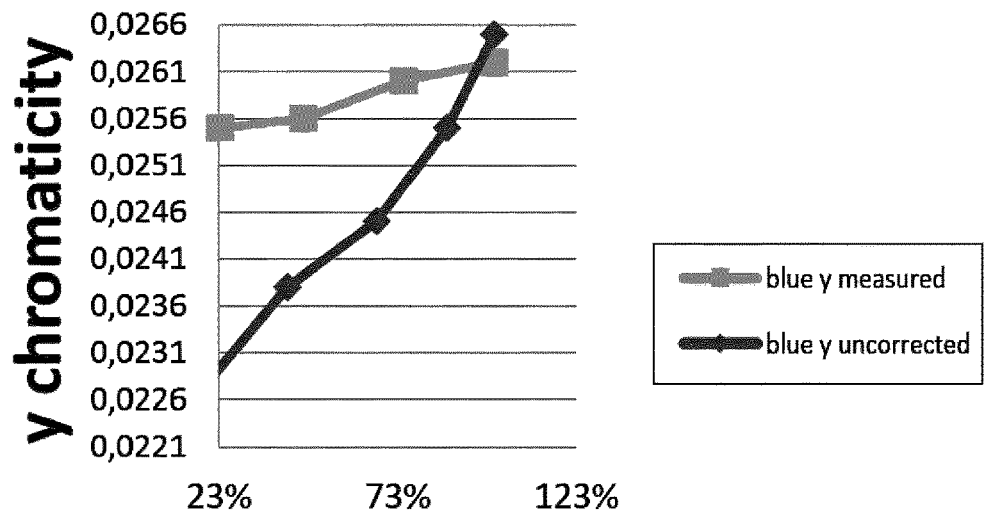
FIG. 14e shows the y chromaticity shift for the blue component as a function of the brightness level.

In embodiments of the present invention which provide methods, projectors and an optical arrangement for a projector the algorithm is implemented and the graphs of FIG. 14*a* shows a luminance error and FIGS. 14*b* to 14*e* show examples of the uncorrected and measured corrected results for respectively the x and y chromaticity of white, red, green and blue.

It is clear from FIGS. 14*a* to 14*e* that the algorithm provides a very good improvement. In particular, the improvement in luminance error can be seen in FIG. 14*a* and the improvement in the chromaticity of the white point can be seen in FIGS. 14*b* to 14*c*. The green and red primaries are not made worse, as it should be. The blue chromaticity is improved, which is a result of the possibility to control 2 types of blue lasers which allows fine-tuning the chromaticity, as can be seen on FIGS. 14*d* and *e*.

Figure 15:
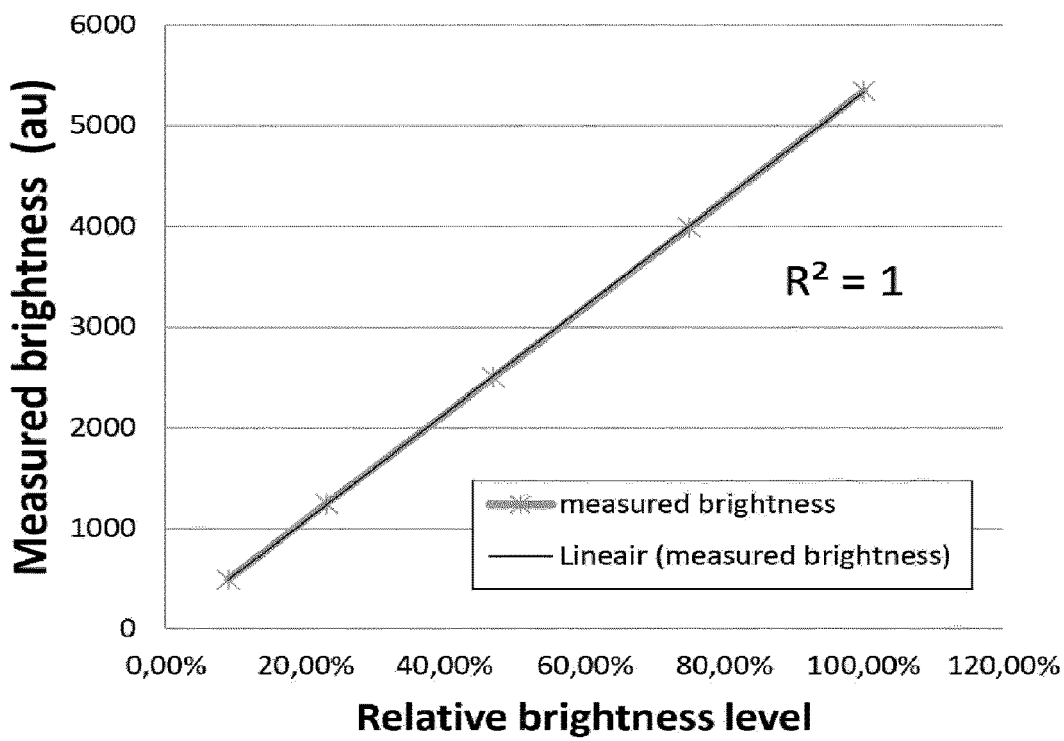
FIG. 15 shows the luminance response as a function of the dimming level.

The relative light output of white over dimming level is presented. A linear dependency is expected, and the $R^2$ value shown in FIG. 15 shows that this is perfectly achieved throughout the dimming range.

Fine-Tuning and Recalibration

In embodiments of the present invention which provide methods, projectors and an optical arrangement for a projector, while the algorithm detailed above proves to work well, it does require a lot of measurements, which is a serious downside in a time-critical production process as well as in a recalibration process in the field. Therefore, the present invention further provides a method which was conceived to perform a simple recalibration of the projector or the optical arrangement for the projector.

An initial finetuning can be needed in production because all lasers can have a slightly different intrinsic behavior (e.g. slightly different I-V and I-P curve), as known from laser manufacturers, which makes the method to calculate the most suitable currents more complex.

The lasers can degrade over time during operation of the light source, or in some particular cases, laser banks can even fail catastrophically. The recalibration algorithm according to embodiments of the present invention will need to be able to cope with these degradations and failures because recalibration of projectors in the field is required. The repercussions should not be underestimated, because in order to obtain the desired color balance, certain banks will be driven harder than others, resulting in a different degradation over time of those banks, which will again affect the required driving of the different banks. It goes without saying that a catastrophic failure will also require a severe adaptation of the driving of the banks.

Approach and Mathematical Formalism of Fine-Tuning and Recalibration

This recalibration process can start from curves obtained using the complete dataset as described above, and by using several additional measurements, the underlying models are adapted to better suit the actual measured performance.

Figure 16:
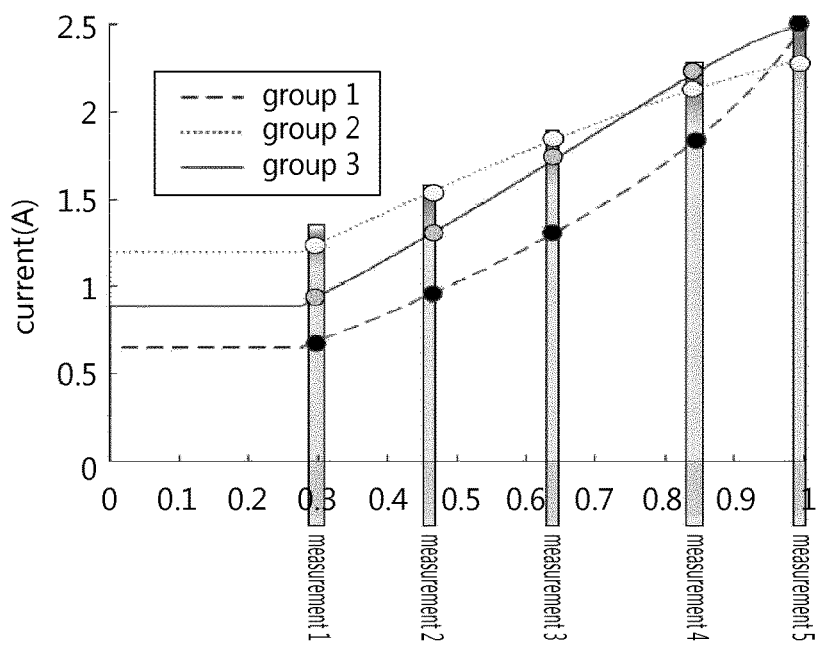
FIG. 16 shows the driving currents as a function of the relative light output for three groups of currents, and the selection of 5 measurement points.

The chosen approach can for example be the following:

After selecting a set of slider settings, as shown on FIG. 16 (note that a slider setting corresponds to a particular brightness level of the projector's light output, in its calibrated operating condition, as the suitable look-up tables for the currents are uploaded in this way in the laser drivers intended for this condition at which it is calibrated, however the behavior of the light source may have altered over time, but the applied currents at the selected slider settings are still maintained when performing the recalibration measurements), one can obtain the following for each slider setting:

The driving currents for each of the groups

The X, Y and Z tristimulus values for a yellow and a blue patch, using a suitable optical measurement device. In case there is a red laser, a red image is also acquired.

For example, a plurality of measurements can be performed in a range of 30 to 100% of brightness level, for example five measurements such that the brightness is decreased by for instance a fixed percentage of 17.5% between each measurement, starting from the lowest at 100% (alternatively, the levels 100%, 88%, 68.6%, 47%, 30.6%, can be used as this can render a better result in practice). More measurements or fewer measurements can also be performed. By using fewer measurements, the result can for instance be affected more by measurement noise and inaccuracies, while using more measurements can take more time and it can also be more labor intensive.

Also, stabilization time of the measurements is very important. This is the time between the moment when the suitable driving currents are applied in order to reach a certain relative brightness level and the moment at which the optical measurements are performed. The reason is that it appeared that it takes some time for the system to reach a stable situation in terms of brightness and color output. However, a longer waiting time will increase the duration of the recalibration procedure, which is undesired. It appeared that the brightest and darkest levels require the longest stabilization times, and the intermediate levels require less time. Also, the required stabilization time can depend on the starting condition. For instance prior to fine-tuning, the projector can for instance be completely turned off, or it can be in a stabilized on state at the brightest level. Depending on the starting condition, the suitable stabilization time can vary. This starting condition is not always under control in the field, and therefore timings that are suitable can be looked for, independently of the starting condition. Suitable waiting times are for instance 2 minutes (100%), 1 minute (88%), 1 minute (68.6%), 1 minute (47%), 2 minutes (30.6%). It also turned out that starting from the highest light output level and gradually decreasing the light output during the measurement procedure is the most suitable way to go. Note that decreasing the number of measurements is not per se useful, as this would prolong the waiting time per light output level.

The idea is then to do a linear correction for each of the underlying blue tristimulus response curves for each group. This means that the individual tristimulus of each bank will not be changed independently, but instead their combined response will be adjusted. This is done because correcting their individual response can require a lot more measurements, and it is expected that banks belonging to the same group have a similar behavior (although there can be slight differences between individual banks).

The linear correction comprises of a scaling and offset of the current-dependent tristimulus curves of the different groups.

Obtaining the Equations for the Blue Patch

The mathematical expression for the blue patch can then be obtained as follows: each measured tristimulus response on a blue patch, Xb, Yb, Zb, can be expressed as a sum of the responses of the different groups (3 groups were selected in the current example, but this is not a limitation). This is illustrated for X, but it is similar for Y and Z:

$$Xb = Xb1 + Xb2 + Xb3$$

Where Xb1,2,3 are the responses of the different banks $$Xb = (a1 \cdot Xb, \text{original}1 + b1) + (a2 \cdot Xb, \text{original}2 + b2) + (a3 \cdot Xb, \text{original}3 + b3)$$

Or, for simplicity:

$$Xb = (a1 \cdot x1 + b1) + (a2 \cdot x2 + b2) + (a3 \cdot x3 + b3)$$

Where Xb, original1,2,3 are the original responses without the additional correction, and a1,2,3 are the scaling factors, b1,2,3 are the offsets. The original responses are known from the previous more extensive measurements.

This can be written in matrix formalism as follows:

$$\begin{bmatrix} x1,1 & 1 & x2,1 & 1 & x3,1 & 1 \\ x1,2 & 1 & x2,2 & 1 & x3,2 & 1 \\ x1,3 & 1 & x2,3 & 1 & x3,3 & 1 \\ \ldots & \ldots & \ldots & \ldots & \ldots & \ldots \end{bmatrix} \begin{bmatrix} a1 \\ b1 \\ a2 \\ b2 \\ a3 \\ b3 \end{bmatrix} = \begin{bmatrix} Xb,1 \\ Xb,2 \\ Xb,3 \\ \ldots \end{bmatrix}$$

In the above mathematical expression, the second index denotes the measurement number. Thus, each row of the first matrix corresponds to a specific measurement number. The coefficients can be approximated when at least 6 measurements are available. If more measurements are available, an overdetermined system is obtained, and the best possible solution can be approximated. If fewer measurements are available, values can be interpolated/approximated at intermediate current levels, and the increased number of measurement values can be used in the calculation.

Obtaining the Equations for the Yellow Patch

As mentioned before, the main difference between the blue and yellow response is the non-linear behavior of the phosphor used to convert blue into yellow light. This is taken into consideration by applying the scaling and offset to the underlying blue bank group response curves (and hence not directly to the yellow responses). The measured stimuli on the yellow patches hence can be converted into responses of the underlying groups of blue banks. This can be done by inverting the non-linear functions for yellow, which were described previously. The matrix formalism described previously can then be reused on the groups of blue banks that are used to excite the phosphor.

Solving the Equation

The system can be solved in practice in two steps.

Step 1: Least-Squares Solution with Bounds

In the first step, linear least-squares can be used to obtain a first approximation for the coefficients a1,2,3 and b1,2,3. In this least-squares algorithm, constraints are put on the coefficients, to make sure that the solutions are both physically plausible as well as to make sure that the balance between the different driving curves doesn't divert too much from the original balance. In this step, a suitable solution can be found for the scaling coefficients a1,2,3, but the offsets b1,2,3 can still be improved in the next step.

Step 2: Levenberg-Marquardt Algorithm

In the second step, the Levenberg-Marquardt algorithm can be used to obtain the best possible approximation for the offsets b1,2,3.

For the yellow patches, the algorithm has been applied on the equations which include the phosphor response. This means that, while the scaling and offset are applied on the responses of the groups of banks, the non-linear effect of the phosphor was added on top of these responses, and the outcome of this is put equal to the measured yellow responses.

Adaptation of the Main Algorithm

Once the above steps have been taken, the obtained altered equations with the optimized offset and scaling factors can be used in the algorithm. The most suitable driving currents for the 3 groups of banks can then be determined by applying the algorithm, taking the actual measurement results performed in this fine-tuning step into account. This is done in the same way as it was described above (for the non-finetuned version), using the same algorithm with the residue. Basically, the methodology remains the same, with the only difference being that the coefficients of the equations can be altered due to the fine-tuning.

Test Results

Test 1: Generic Curves Tested in a Different Projector

In a first test, the current curves which have been determined in a first step were inserted into another projector (of the same type, but with a newer design version), without the additional fine-tuning algorithm. So, a new projector is used, different from the one which was previously used to generate the equations for the algorithm. The resulting color error versus relative luminance curves are depicted in the graph of FIG. 17.

Figure 17:
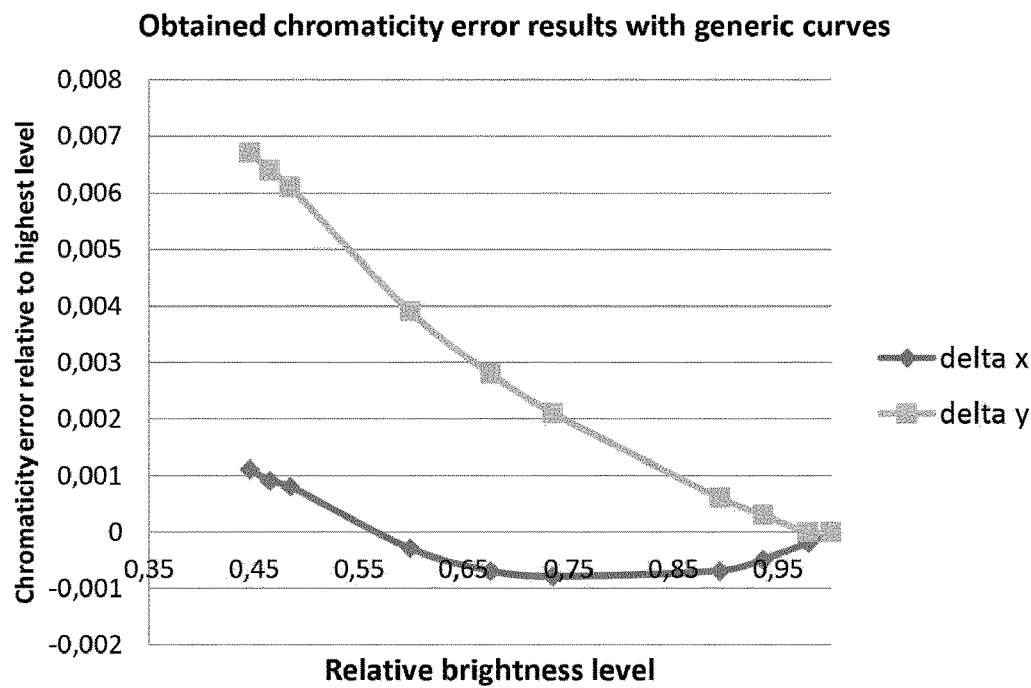
FIG. 17 shows the obtained x and y chromaticity errors as a function of the relative brightness level.

From the curves of FIG. 17, it is clear that using the generic curves yields a significant improvement in the color error, compared to the initial version without any correction. Yet, the result is not as good as the result obtained before when using actual measurements obtained specifically on the projector intended to be color corrected. Hence, the fine-tuning algorithm detailed above is then applied on top of the initial algorithm.

Test 2: Fine Tuning Algorithm

In this second test, the fine-tuning algorithm is used on top of the basic algorithm. The obtained results are depicted in the graph of FIG. 18*a*.

Figure 18A:
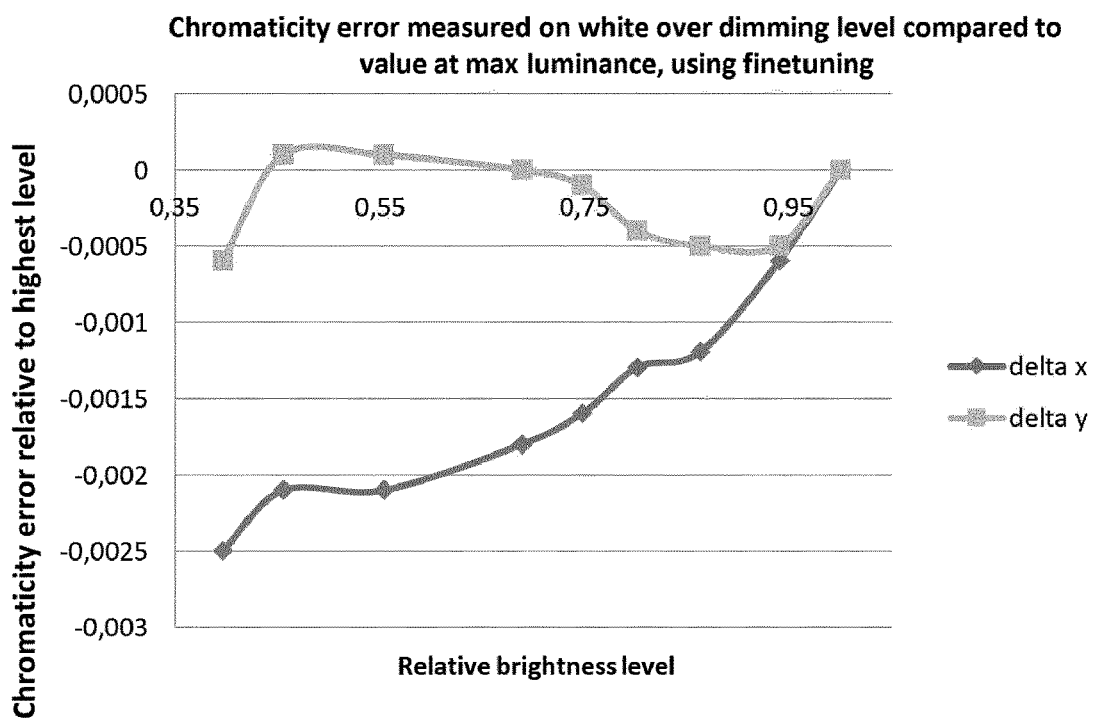
FIG. 18a shows the x and y chromaticity errors measured on white as a function of the relative brightness, after the finetuning algorithm.

From the graph of FIG. 18*a*, it is clear that the results are significantly improved compared to the generic correction. Even better, when comparing the result to the dedicated corrected curves, it is clear that the performance is improved with the dedicated correction algorithm, which is a great result.

In FIGS. 18*b*, 18*c*, 18*d*, 18*e*, a result of after performing the recalibration procedure is illustrated, in three particular situations intended to assess the performance of the recalibration procedure, in situations where catastrophic failures can occur.

Figure 18B:
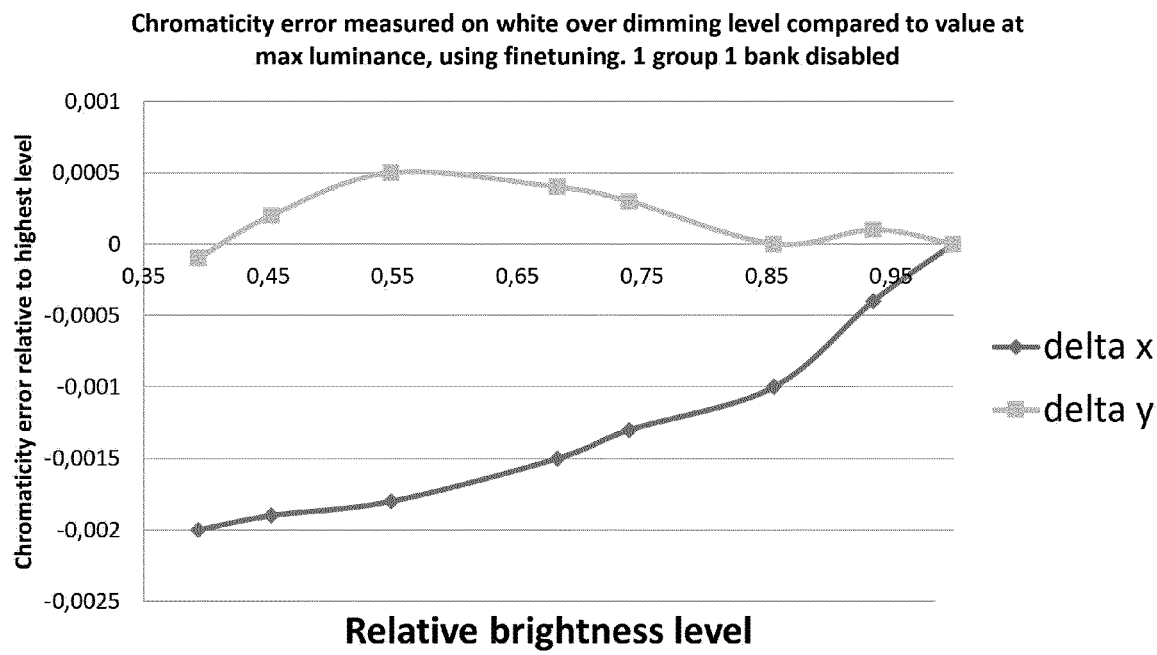
FIG. 18b shows the chromaticity error measured on white as a function of the dimming level compared to the value at max luminance, using finetuning. 1 group 1 bank disabled.

In FIG. 18*b*, the methodology is used when one of the group 1 banks is disabled electronically in the light source. This is done to mimic a situation where a group 1 bank fails catastrophically. Hence, the algorithm has to calculate suitable driving currents for the groups, such that the combined behavior of the 23 remaining operational banks results in a suitably calibrated light source with stable chromaticity over brightness level. The result is very good.

Figure 18C:
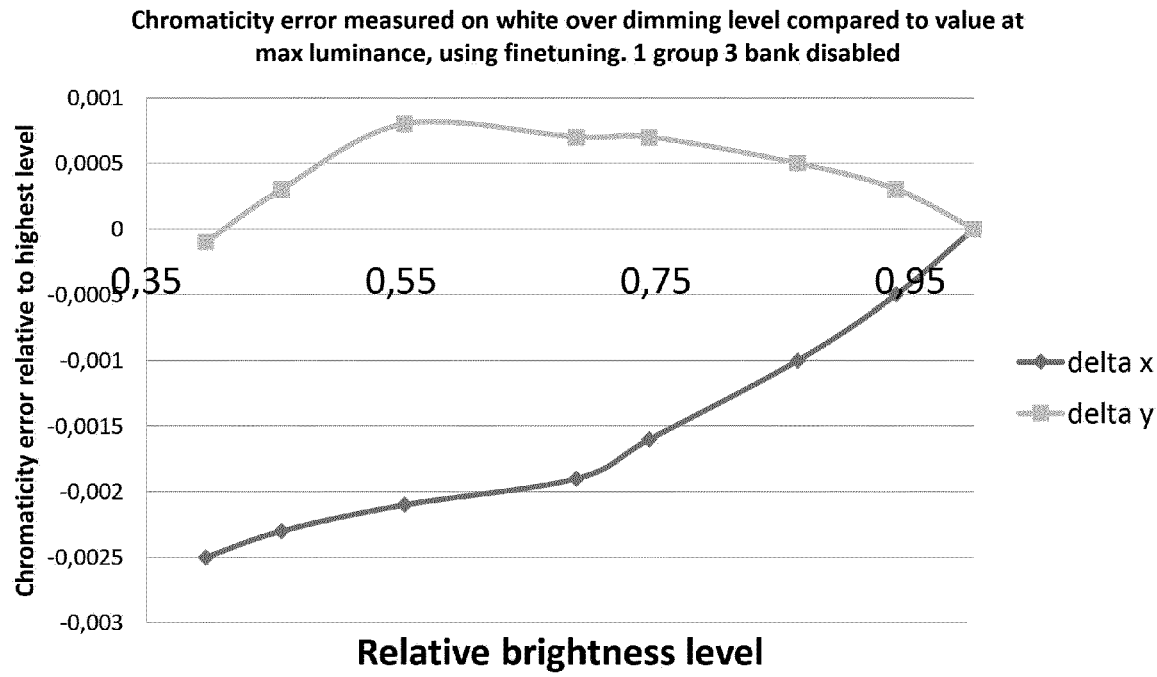
FIG. 18c shows the chromaticity error measured on white as a function of the dimming level compared to the value at max luminance, using finetuning. 1 group 3 bank disabled.

In FIG. 18*c*, a similar situation as the one in FIG. 18*b*, but instead of disabling a group 1 bank, a group 3 bank is disabled. The figure shows that in this case, very good results are obtained as well.

Figure 18D:
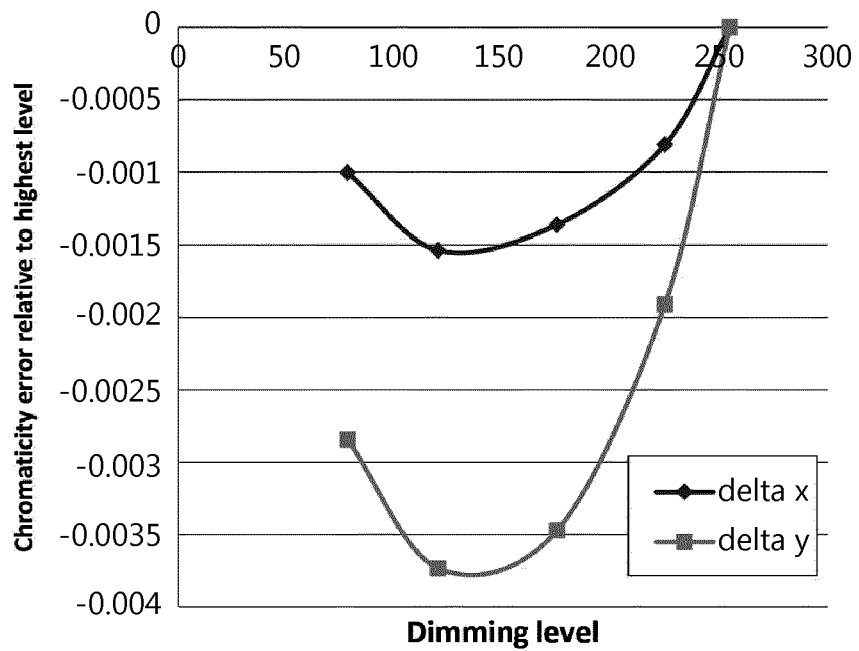
FIG. 18d shows the chromaticity error measured on white as a function of the dimming level compared to the value at max luminance, using finetuning. 8 group 1 banks disabled.
Figure 18E:
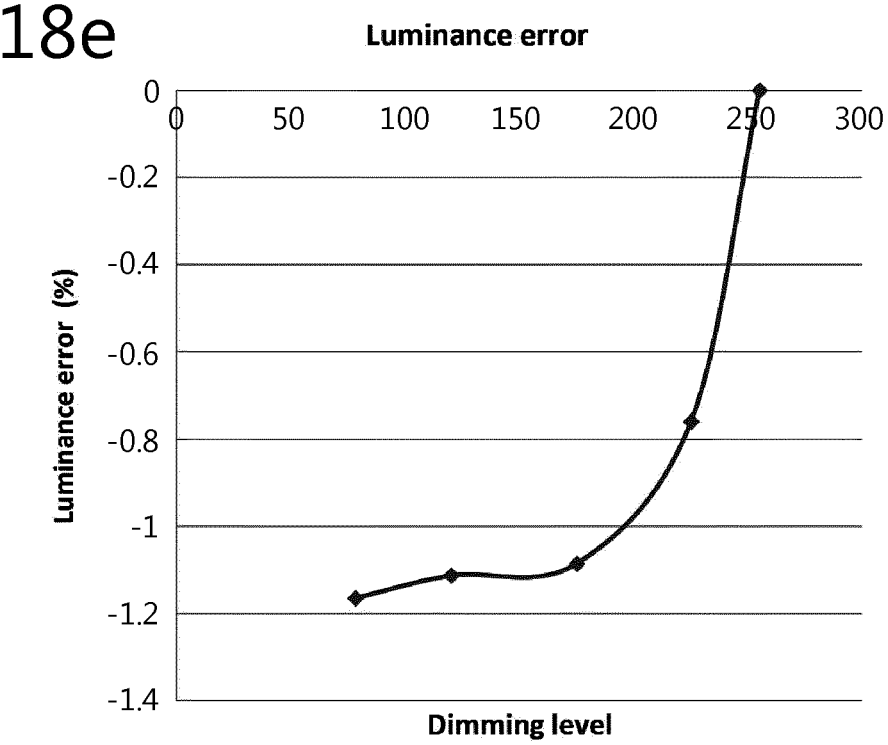
FIG. 18e shows the luminance error as a function of the dimming level.

In FIGS. 18*d* and 18*e* similar to the previous two figures, a result obtained by using the recalibration procedure is presented. In this case, a more extreme example is presented. 8 out of 24 banks (belonging to group 1) are disabled. FIG. 18*d* shows the chromaticity stability over dimming level and FIG. 18*e* shows the brightness error (measured in luminance) over dimming level. Both results are very good.

Additional Refinement: Approach Target White Chromaticity

Figure 19A:
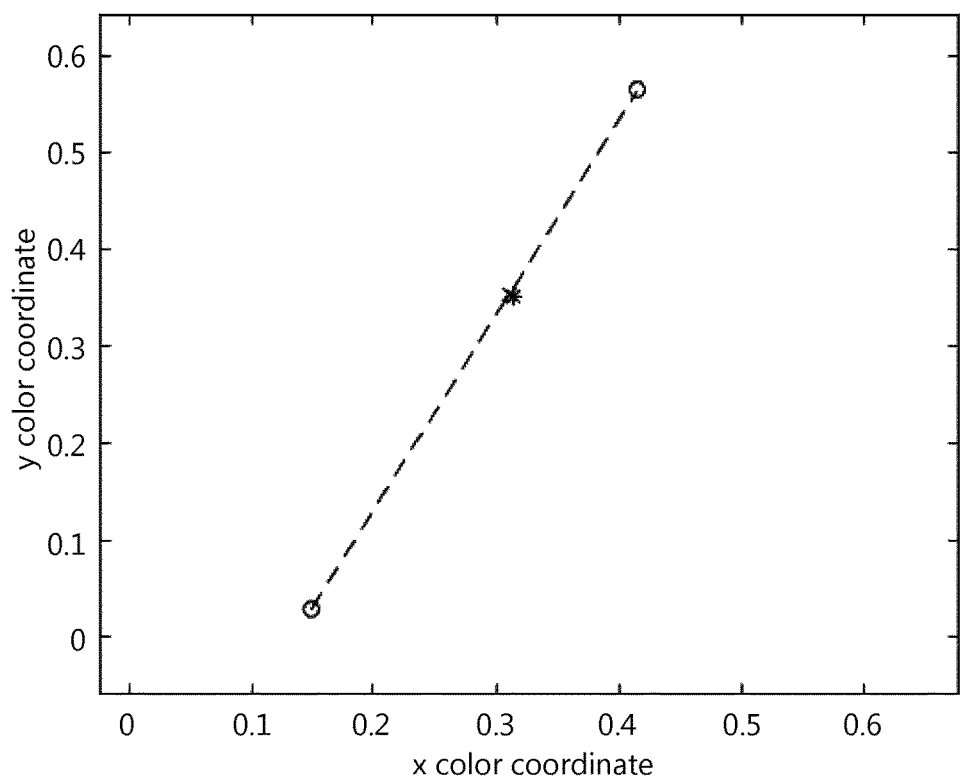
FIG. 19a shows the best possible approximation for the white point which can be achieved with two primaries.
Figure 19B:
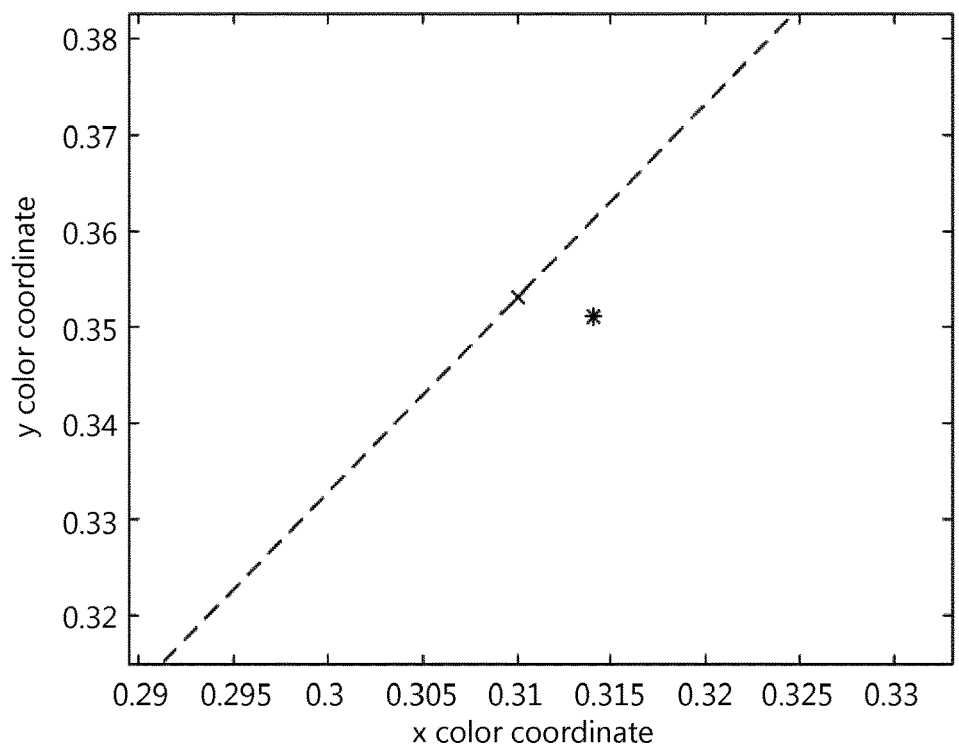
FIG. 19b shows another example of the best possible approximation for the white point which can be achieved with two primaries.

As mentioned before, adjusting the chromaticity of a projector's whitepoint is always possible by suitably adapting the driving of the DMDs. However, this results in undesired losses (contrast/luminance), as discussed above. Hence, it is better to approach the target colorpoint as good as possible by adjusting the driving of the lasers in the lightsource. Yet, one should realize that there are limitations to the possible adjustment one can achieve this way. As the source only has two primaries (yellow and blue), adjustments can only be made on a straight line in the xy chromaticity space, and not in a triangle, like one would be able to do if the source would have 3 primaries with suitable chromaticities. In the graphs of FIGS. 19*a* and 19*b*, the best possible approximation is shown: the cross marker represents the closest point one can achieve to the desired star marker point. Note that in the example, the REC709 whitepoint is taken as target.

In another embodiment, according to the present invention, additionally at least one red laser can be added to the light projection system.

In the mathematical formalism, the behavior of the red lasers can be taken into account. The new mathematical formalism becomes:

$XBT=XB1(I1)+XB2(I2)+ \ldots +XBN(IN)$ $YBT=YB1(I1)+YB2(I2)+ \ldots +YBN(IN)$ $ZBT=ZB1(I1)+ZB2(I2)+ \ldots +ZBN(IN)$ $XGT=f1(PB1,1(I1)+PB1,2(I2)+ \ldots +PB1,N(IN))$ $YGT=f2(PB2,1(I1)+PB2,2(I2)+ \ldots +PB2,N(IN))$ $ZGT=f3(PB3,1(I1)+PB3,2(I2)+ \ldots +PB3,N(IN))$ $XRT=XR1(Ir1)+ \ldots +XRn(Irn)+f4(PB4,1(I1)+ \ldots +PB4,N(IN))$ $YRT=YR1(Ir1)+ \ldots +YRn(Irn)+f5(PB5,1(I1)+ \ldots +PB5,N(IN))$ $ZRT=ZR1(Ir1)+ \ldots +ZRn(Irn)+f6(PB6,1(I1)+ \ldots +PB6,N(IN))$ Where XBT, YBT and ZBT are the target tristimulus values to be reached, and XBN, YBN and ZBN are the blue tristimulus values emitted by bank number N. This is again assuming that only the blue lasers contribute to the blue light emission. This is not a limitation of the present invention. With appropriate coatings, it is not excluded that part of the light from the wavelength conversion element contributes to the blue primary. In that case, the equations would have to be adapted accordingly. XGT, YGT and ZGT are the target tristimulus values to be reached for green, and PBN are the blue stimuli emitted by bank number N, which excite the yellow phosphor. Like before, the functions f1, f2 and f3 are the non-linear functions that describe the non-linear response in light of the phosphor when excited by the impinging blue laser.

XRT, YRT and ZRT are the target tristimulus values to be reached for red. These are obtained by combining the response of the red lasers, with the part of the yellow phosphor light emitted in the red primary.

This can be performed as follows:

The first part of the equation, XR1(Ir1)+ . . . +XRn(Irn) or YR1(Ir1)+ . . . +YRn(Irn) or ZR1(Ir1)+ . . . +ZRn(Irn) describes the response of the red lasers. Note that it is assumed that there are n independently controlled red lasers. This is a simple addition, as the sum of the responses of all the individual red lasers should be equal to the total response of all the red lasers.

The second part is the contribution from the phosphor to the red. Like before, this is modeled by non-linear functions that describe the non-linear response in light of the phosphor when excited by the impinging blue power.

In order to determine the coefficients of the mathematical equations describing the system which also comprises the red lasers, the same subtractive methodology can be used. The first 3 equations can be created in an identical way. The second set of equations can be determined also using a similar methodology, but by performing measurements on a green image instead of a yellow image. Finally, using the red image, the equation of the red laser can be derived also using the same subtractive methodology as the one used to derive the equations for the blue lasers. The red phosphor light contribution to the equations is similar to the equations for the green phosphor light, as the light is generated by the same laser and phosphor combination. Only the functions f4, f5 and f6 are slightly different compared to the respective functions f1, f2 and f3. Although they both express the non-linearity of the phosphor, the contributions of the phosphor to the red and green primary can be different, and hence they can differ by a scaling factor.

This embodiment which uses red lasers can also benefit from the finetuning algorithm detailed in the previous sections. In addition to the changes of the blue lasers over time, which are modeled by a linear correction, the red lasers can also alter over time. This change in behavior can also be modeled by a linear correction. Obtaining the scaling and offset coefficients of the red laser can be done in a similar way. In order to obtain the additional scaling and offset coefficients for the red laser, the following steps are taken:

Additional measurements are performed on a red image at the different brightness levels.

From the measurements performed on the white, red, blue and yellow images, the expected measurement results on a green image can be calculated. The finetuning methodology detailed above can then be used to derive the linear correction factors for the blue lasers.

These correction factors for the blue lasers exciting the phosphor can also be used in the model of the red phosphor light. Using the model of the red phosphor light, combined with the measurements on the red image, the linear correction coefficients on the red laser model can be determined.

With the addition of a red laser, it is possible to use a green phosphor instead of a yellow phosphor as the red light can be mostly provided by the red lasers. The green phosphor can be for example of the type LUAG:Ce.

Figure 21:
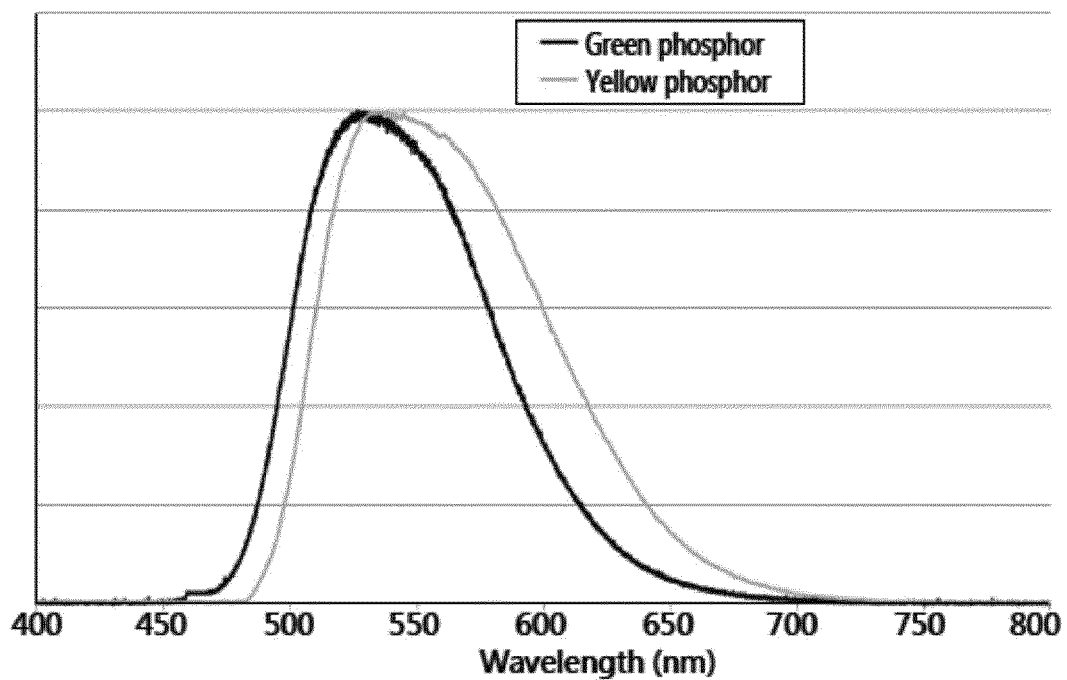
FIG. 21 shows a comparison between the optical spectrum of a typical green phosphor and a typical yellow phosphor.

The plot of FIG. 21 shows a comparison between the optical spectrum of a typical green phosphor and a typical yellow phosphor used in embodiments of the present invention. Thus, the optical spectrum with a green phosphor is shifted towards the green with respect to the yellow phosphor and comprises a smaller red component.

When a yellow type phosphor is used, it can be of the type YAG:Ce.

The present invention can be used to maintain a white point over the desired dimming range, but is not limited to that. It can also be used to any pre-determined chromaticity over the desired dimming range. This can also be used when the projection system of the present invention is to be combined with additional lasers providing additional colors to increase the gamut of the projection system.

The present invention can also be used to improve the lifetime of a projector.

Improvements of the lifetime of a projector, according to embodiments of the present invention, can be performed as follows:

Embodiments of the present invention are capable of providing the highest possible light output at the highest desired light output level. To achieve this effect, the lasers can be driven at their maximum current, in accordance with the specifications of the supplier. In the example below, the maximum currents are, as shown on FIG. 24:

2.5 A for the lasers corresponding to group 1 and group 3. The laser banks belonging to group 1 mainly contribute to the yellow light component of the beam and laser banks belonging to group 3 mainly contribute to a mix of yellow and blue components of the beam.

2.3 A for the lasers corresponding to the group 2. These lasers contribute mostly to the blue component of the beam.

Figure 24:
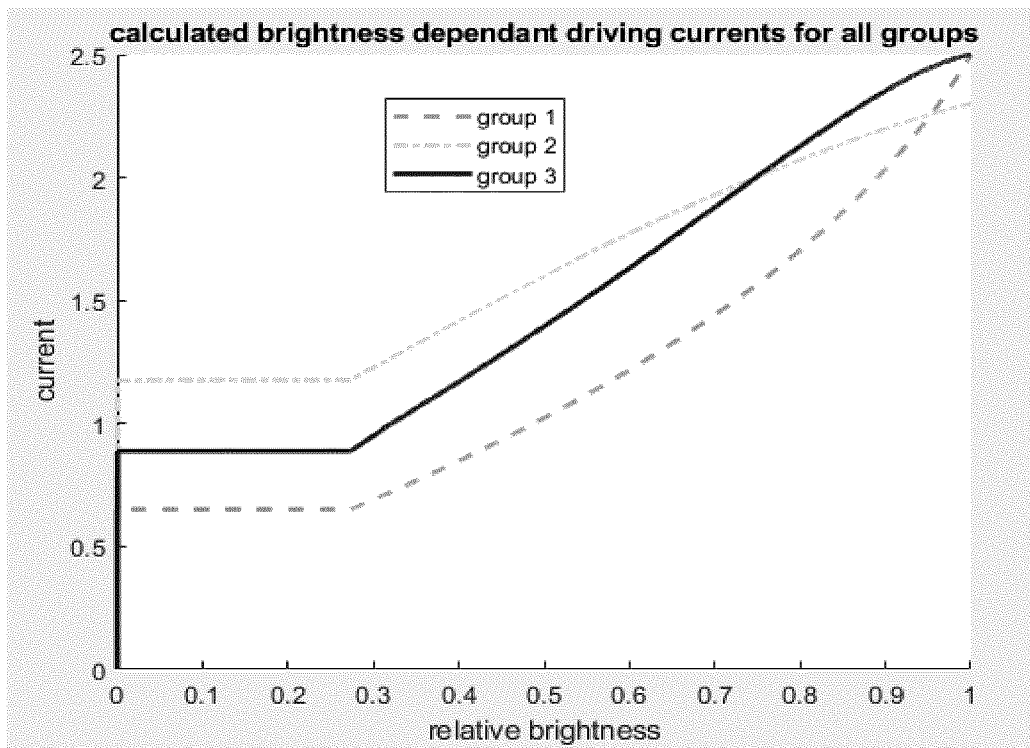
FIG. 24 shows an example of the calculated laser driving currents of the 3 groups of banks, depending on the relative desired brightness.

The curves shown on FIG. 24 are calculated such that the chromaticity is preserved over the dimming level, while making sure that the maximum currents are reached at the highest brightness level.

While the whitepoint is clearly made stable over dimming level, this does not necessarily mean that there is no discrepancy between the obtained whitepoint and the intended target whitepoint.

To assess this potential offset, one first needs to define the intended target whitepoint. For instance, a typical target is the DCI-P3 whitepoint. This is the reference whitepoint for cinema. It is defined as follows:

|  | x target | y target |
| --- | --- | --- |
| DCI-P3 Theater whitepoint target | 0.314 | 0.351 |

Note that other applications may require another whitepoint target, in the examples detailed below, this DCI whitepoint is chosen as the intended target white point.

Color Point Over Dimming Level

Figure 25:
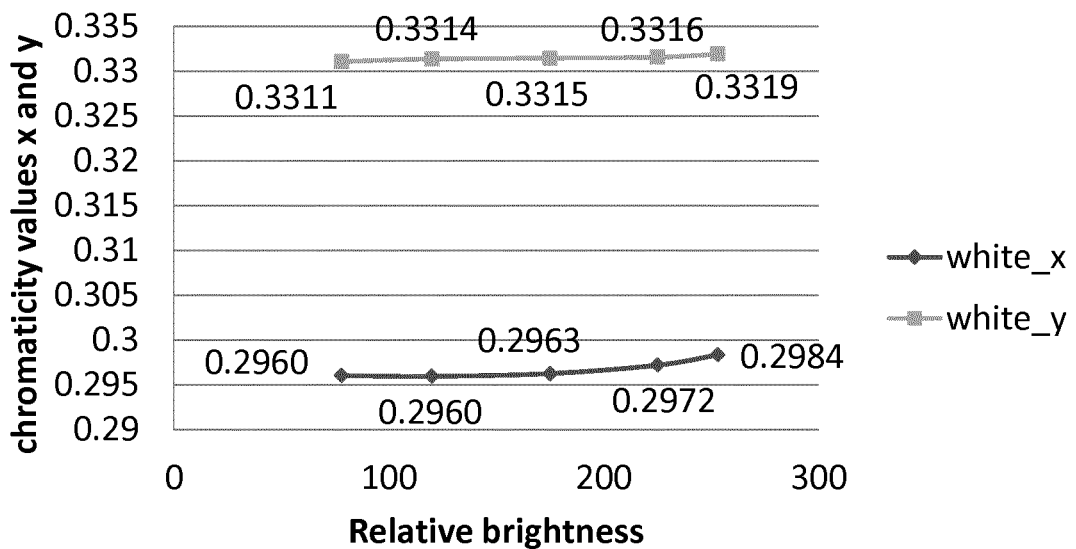
FIG. 25 shows the measured chromaticity depending on emitted projector brightness using the curves depicted in FIG. 24 on a reference projector.

FIG. 25 shows the measured color point (CP) as a function of the dimming level. When comparing these results to the DCI whitepoint target, there is clearly an offset.

In this example the projector's uncorrected whitepoint is too bluish when driving all lasers at their maximum current. This offset in whitepoint can be corrected either at the light source level, by using an alternative way of driving the lasers, or by doing an electronic correction at the light modulation device's (for instance a DMD) level, by altering the amount of red, green and blue light to obtain the desired whitepoint, or by doing a combination of both. Altering the laser driving is mostly beneficial, as lowering the laser driving will result in an extended lifetime of the laser, and thus of the projector.

Several ideas to improve the laser driving were attempted.

The First Idea is to do a DCI Finetuning, by Reducing the Max Current of the Group 2 Lasers The idea is to reduce the maximum current, to:

Approach the target whitepoint more closely by making it less bluish

Avoid major losses in maximum output lumens of the projector. As this group mostly generates blue light, and blue light only has a relatively low contribution to the lumens, the impact will not be major.

One of course needs to consider that the blue primary needs to have the correct chromaticity. As the laser banks belonging to group 2 have a slightly different wavelength compared to the other banks, dimming these lasers may affect the chromaticity of the blue primary.

Figure 26:
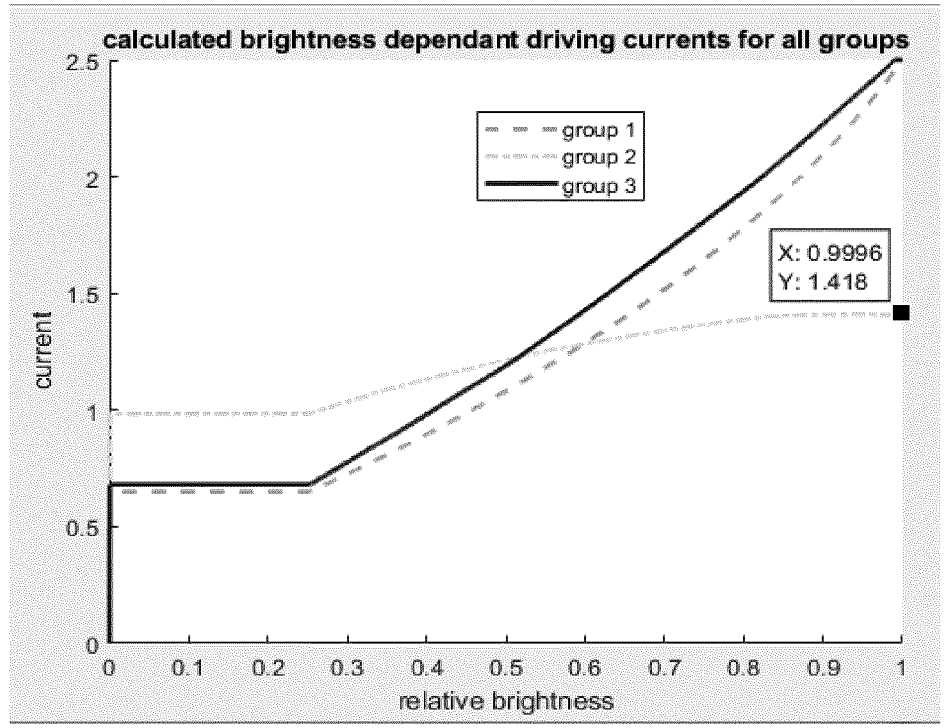
FIG. 26 shows the obtained current vs brightness curves, by reducing the maximum driving current of the group 2 lasers

FIG. 26 shows the alternative driving current curves, obtained using this methodology. The curves have been calculated to maintain a stable whitepoint over the dimming level at a lowered max driving current for the group 2 laser banks. Due to the reduced driving current, the lifetime of these banks can be strongly extended.

Figure 27:
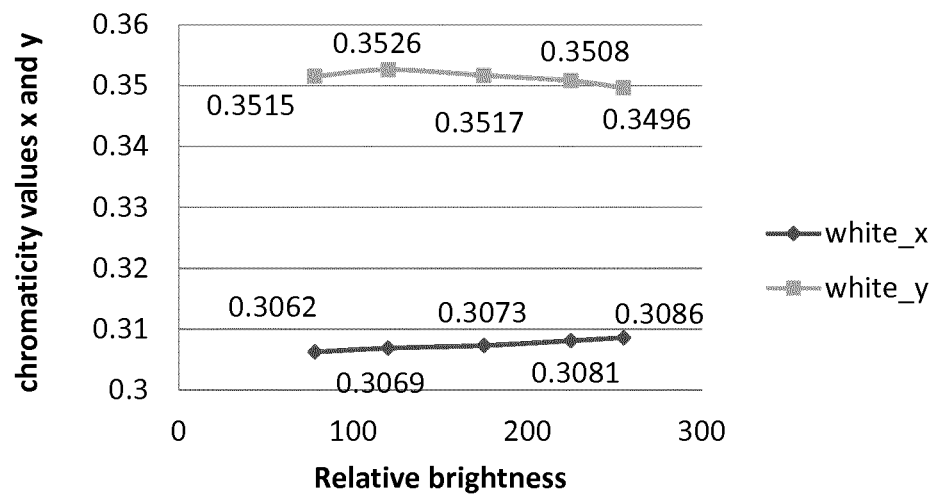
FIG. 27 shows the measured chromaticity depending on emitted projector brightness using the curves depicted in FIG. 26 on a reference projector.

FIG. 27 illustrates the measured color point as a function of the dimming level, when applying these curves to the projector.

It is clear from these plots that the DCI target whitepoint is closely approximated.

While doing so, one should be careful of the limitation that the light source may only have 2 primaries: yellow and blue. Due to that, the target whitepoint may only be approximated, and it may not be reached perfectly. Knowing that there is also an allowed tolerance on the DCI whitepoint, the obtained result is very good, within the tolerances. Only a minor electronic correction can be used to correct the remaining imperfections.

Advantages of this method:
The power of the most critical laser is reduced
Lasers corresponding to the blue curve become less critical.
Reducing the current of the lasers that mainly contribute to the blue light, will not result in a severe drop in lumens, about 3% of the lumens are lost in this particular case.

This method will probably be a good choice, but there exist other solutions explained here below.

DCI Finetuned, Alternative Method: Give Complete Freedom to the all Curves, but Keeping the Existing Residue Function Using this method, the currents will be adjusted such that the target whitepoint is attained as accurately as possible by adjusting the driving of the lasers in the light source, without altering the residue function.

Although this methodology has potential, a drawback became clear during the course of its detailed analysis: the obtained curves can be very different, due to design variations.

Figure 28:
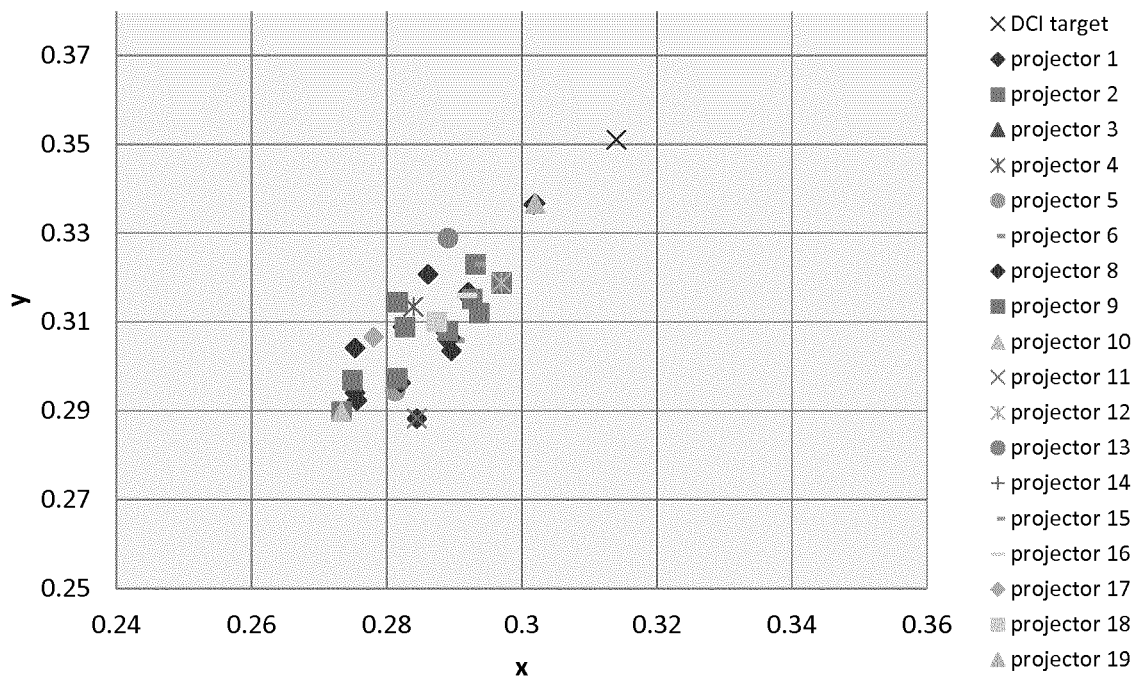
FIG. 28 shows the y vs x chromaticity values of the uncorrected whitepoint measured at maximum light output on a set of 19 projectors of the same type

The reason for these differences is detailed in the FIG. 28. FIG. 28 illustrates the spread in whitepoints of a set of 19 projectors when the currents are allowed to reach their maximum values. One can observe that there is a significant spread in the native whitepoint. Some projectors are quite close to the target (shown with an X marker), while others have a lower x and y value.

Figure 29:
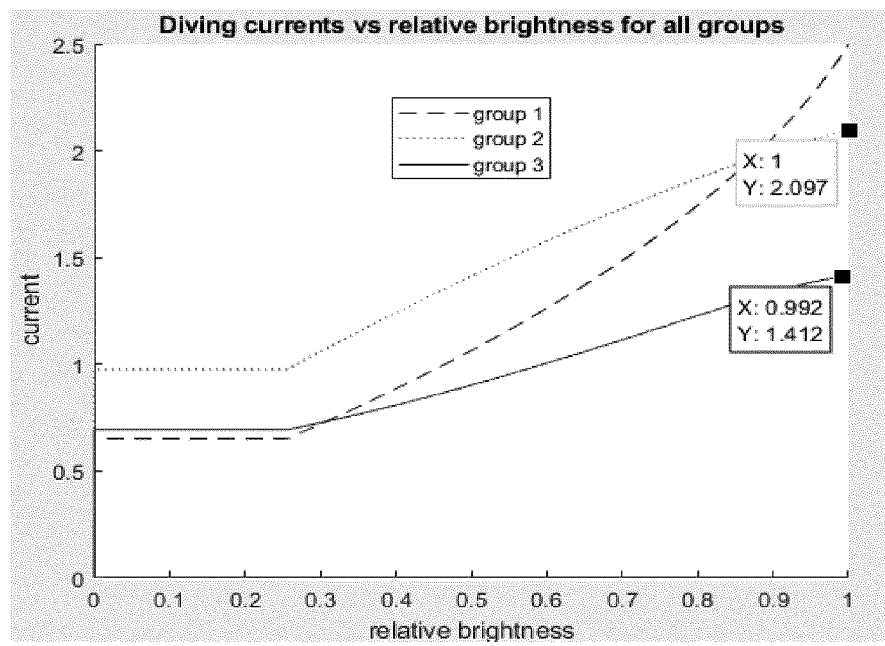
FIG. 29 shows an example of the calculated laser driving currents of the 3 groups of banks, which are calculated such that the target DCI whitepoint is approached as accurately as possible.
Figure 30:
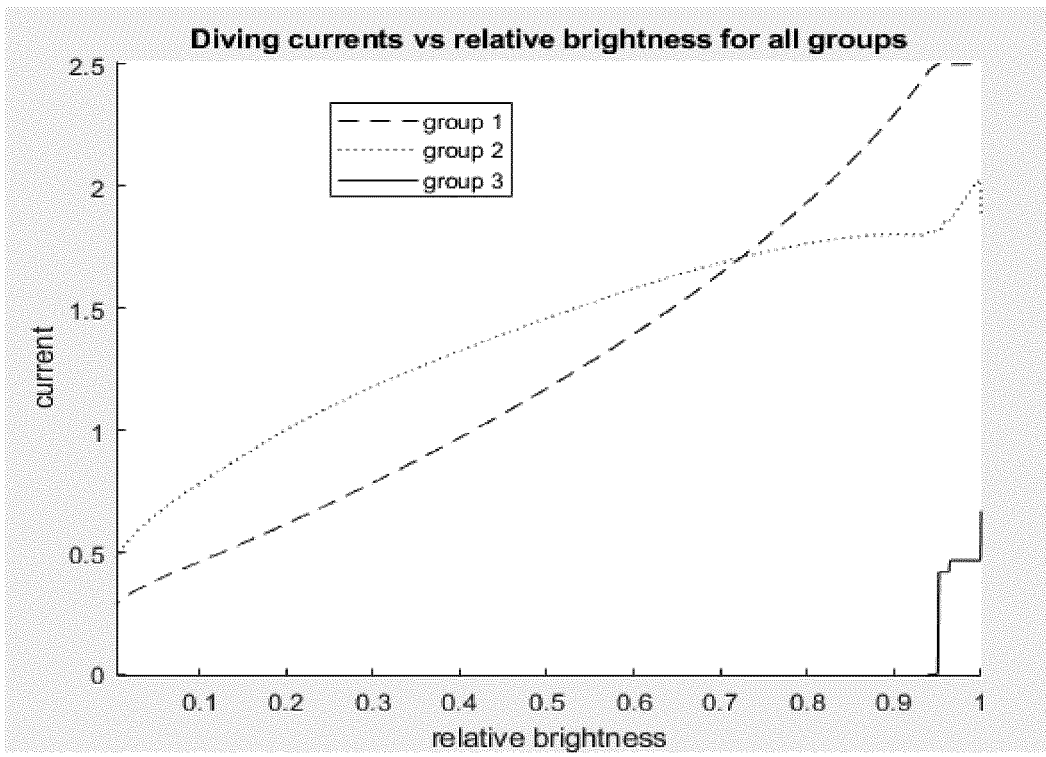
FIG. 30 shows another example of the calculated laser driving currents of the 3 groups of banks, which are calculated such that the target DCI whitepoint is approached as accurately as possible.
Figure 31:
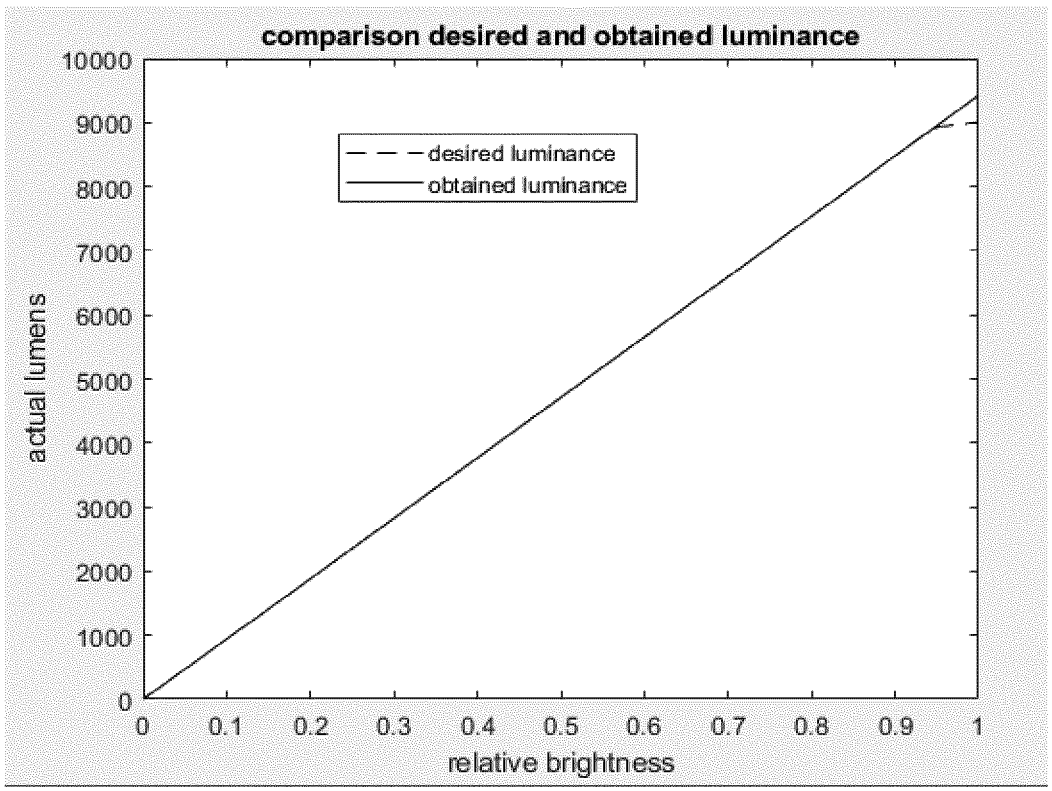
FIG. 31 shows the actual measured (relative) output lumens vs the selected relative brightness. Both the desired relation as well as the obtained luminance relation are plot, showing the obtained luminance can get capped at the highest light levels.

Two examples of obtained curves are depicted in the plots of FIGS. 29 and 30, which represent the finetuned curves of two different projectors which have a different native whitepoint. One can see that:
  The curves are very different, thus allowing the algorithm to approximate the target whitepoint without further control which can result in a huge spread of the curves.
  In the plot of FIG. 29 the groups 2 and 3 lasers have a decreased maximum current. As group 3 results both in yellow and blue light, the maximum brightness is somewhat reduced.
  Moreover, in the plot of FIG. 30 several additional effects occur.
    The group 1 lasers get capped prior to reaching the maximum desired brightness, which leads to a capping of the obtained brightness, as depicted in the plot of FIG. 31. In this plot, the expected luminance is compared to the actual obtained luminance, and, at the higher brightness levels, the desired brightness cannot be achieved.
    Lasers can go below threshold, which can have undesired side-effects. The threshold can have a spread, and in some cases the lasers can turn off while in others they don't. This may be circumvented by forcing the lasers off, or by putting some of, while leaving others on at a higher current.
    The algorithm that currently calculates the curves is optimized for color and luminance tracking, not to optimize a projector's lifetime. This could further be improved, by taking this into account in the residue function.
  The lasers belonging to the first group also get pushed harder at lower driving levels, due to the other lasers which can attain lower values. This may affect their lifetime; hence the proper balance should be found.

A combination of the 2 methods detailed below can be chosen: restrict the max current of group 2 as much as possible, and when needed and allowed, also reduce the group 3 banks, but make sure that the losses are not significantly higher than the losses obtained by using electronic correction techniques. Both the lasers of group 2 and 3 can be controlled by limiting their maximum current. Thus, restricting at least one group of lasers allows obtaining a good balance between lifetime, light output and correct chromaticity of the blue primary.

Adjustment 3: Dynamic Laser Rebalancing

Figure 32:
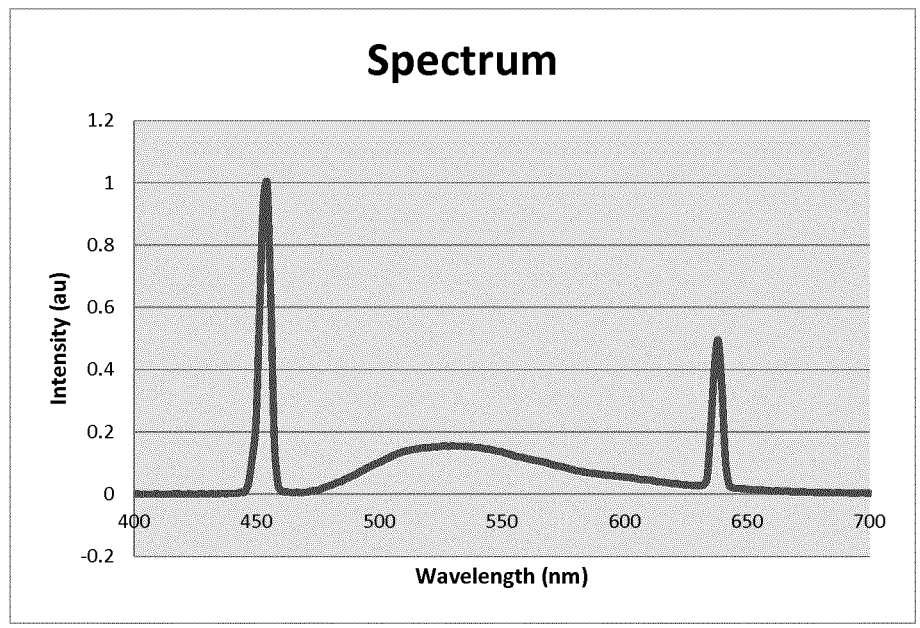
FIG. 32 shows an example of a possible spectrum emitted by a projector which has a light source that combines blue lasers with a yellow phosphor and red lasers.

Some projectors have red phosphor light combined with red laser light. The failing mechanisms are different between the red laser and the phosphor light. Hence, the gamut can alter over time. As the failure mechanisms are different for the blue lasers generating the red phosphor light, and the red lasers generating the red laser light, the relative contribution of red phosphor light vs red laser light can alter over time. This can alter the chromaticity of the red primary. The right peak of FIG. 32 shows the contribution of the red laser.

Figure 33:
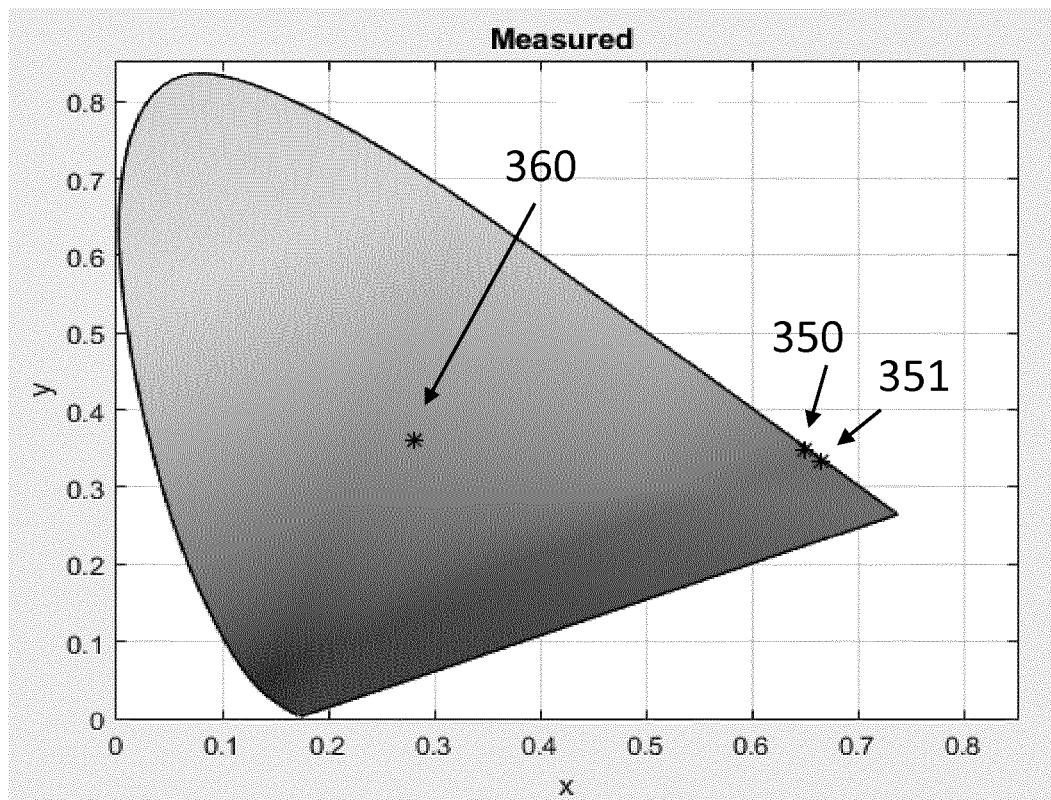
FIG. 33 shows the whitepoint and two possible red primaries in the CIE 1931 color space chromaticity diagram. These two red primaries have two different relative contributions of red laser and red phosphor light.

In FIG. 33, the CIE 1931 color space chromaticity diagram is presented, with 2 markers indicating the chromaticities of the red primary with 2 different balances between red phosphor light and red laser light.
  350 represents the less saturated red primary, caused by a relatively lower contribution of the red laser light vs the red phosphor light,
  351 represents a more saturated red primary caused by a relatively higher contribution of the red laser light vs the red phosphor light.

The ratio between laser and phosphor light can be tracked over time, for instance by using a light sensor integrated into the projector. The laser driving can be adjusted in line with the measurement, to maintain the desired gamut. This can be done for instance by measuring the laser to phosphor ratio during production, and by measuring it over time. If it starts to deviate, the laser can be adjusted to respect the initial ratio.

In other embodiments according to the present invention, the dimming can be altered during a projection without deteriorating the contrast and the bit depth of the projector while maintaining the correct chromaticity.

In further embodiments according to the present invention, the projector can be used to change the white point when changing the dimming so as to follow the scotopic vision for low light conditions, and photopic vision in day light conditions. The spectrum of scotopic vision is shifted towards the blue compared to the scotopic vision. This change of vision can be taken into account by adapting the white point of the combined light beam.

FIG. 20 illustrates an embodiment of the present invention comprising the light projection system according to the present invention.

FIG. 20 shows drivers 4 provided for a blue laser 5. Any laser can be made of a group of lasers of which the beams are combined into one exit beam. The blue laser 5 emits light 14 in the wavelength range 440 to 470 nm incident on a wavelength conversion element, either in transmission (not shown) or reflection. The wavelength conversion element can be a yellow phosphor or a green phosphor (in which case a red laser may be added). The wave converted light beam emitted from the wavelength conversion element and the blue light not converted by the wavelength conversion element, are directed by means of dichroic mirrors to create a uniform rectangular white beam with a certain half cone angle that is imaged on the one or more light valves in the imager engine.

The output of the projection system is a white beam 14 which is incident upon an imaging engine including a TIR prism and Philips prism structure, 16 for example, which splits the white light into three primary colours such as red, green and blue beams which are each incident upon a light valve 18a, 18b, 18C such as a DMD. Reflected light from the DMD's which is modulated in accordance with an image such as a video is reformed by the TIR prism and Philips prism structure 16 to form the projection beam 19 which is directed through a projection lens 20.

Figure 22A:
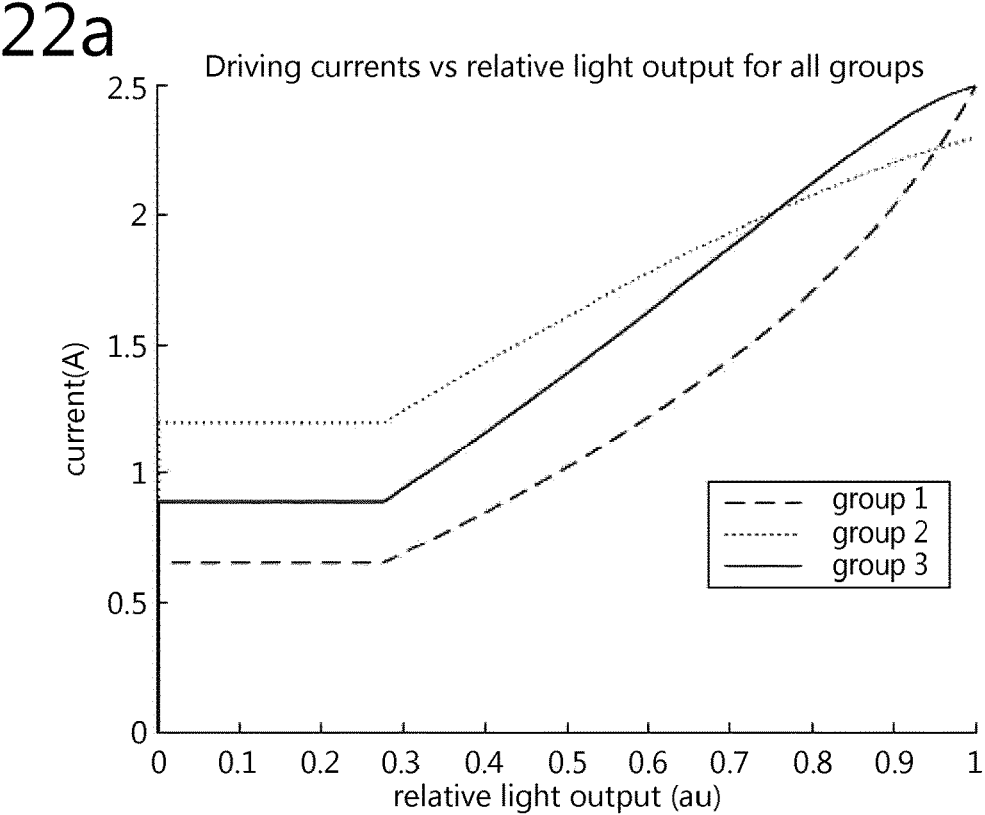
FIG. 22a shows, similar to FIG. 10, the calculated currents of the 3 groups of banks, depending on the impinging light.

FIG. 22a shows, similar to FIG. 10, the calculated currents of the 3 groups of banks, depending on the impinging light.

Figure 22B:
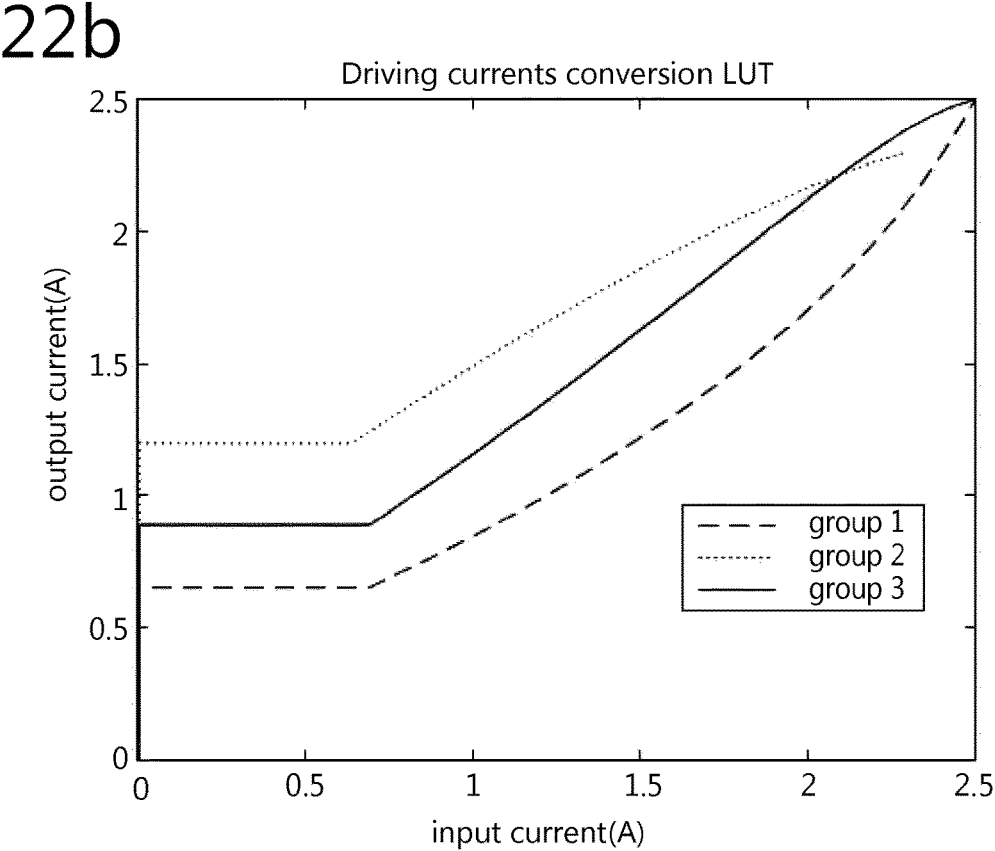
FIG. 22b shows the current conversion look up tables related to the curves depicted in FIG. 22a FIG. 23a shows the y vs x chromaticity values measured on the blue component of the combined beam.

FIG. 22b shows the current conversion look up tables related to the curves depicted in FIG. 22a illustrates the standard curves of a particular projector, more particularly the ones that were used in the previous tests as well. These are the actual conversion tables that have to be used in the light source's driving electronics, to convert the standard linear electronic driving current over the dimming range to the suitable calibrated currents. For each current level, this lookup table allows determining the suitable driving current, such that the light exhibits a stable chromaticity over dimming level.

An embodiment of the present invention of a method for a projector or to implement a projector comprise software in the form of a computer program product that can be loaded onto a digital device with processing capability including one or more microprocessors, processors, microcontrollers, or central processing units (CPU) and/or a Graphics Processing Units (GPU) adapted to carry out the respective functions programmed with software, i.e. one or more computer programs. The software can be compiled to run on any of the microprocessors, processors, microcontrollers, or central processing units (CPU) and/or a Graphics Processing Units (GPU).

Such a device may be a standalone device or may be embedded in another electronic component. The device may have memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The software can be embodied in a computer program product adapted to carry out the functions when the software is loaded onto the respective device or devices or any other device such as a projector and executed on one or more processing engines such as microprocessors, ASIC's, FPGA's etc. to perform any of the methods of the present invention or to implement any projector according to any of the embodiments of the present invention.

Any of the software mentioned above may be stored on a non-transitory signal storage means such as an optical disk (CD-ROM, DVD-ROM), magnetic tape, solid state memory such as a flash drive, magnetic disk such as a computer hard drive or similar.

The invention claimed is:

1. A light projection system for generating an image with three primary colors, in particular, blue, green, and red, each primary color being respectively defined by a first, second and third waveband, said light projection system comprising a laser module comprising a plurality of lasers comprising at least first blue lasers, second lasers, a wavelength conversion element, and at least a first and second laser driver, wherein:

the first blue lasers are controlled by the first laser driver and emit a first light beam in at least the first waveband, the second lasers are controlled by at least the second laser driver, and emit a second light beam in at least the first waveband, the wavelength conversion element being configured to emit light at a plurality of wavelengths after absorption of a light beam at an excitation wavelength in the first waveband, said wavelength conversion element being arranged such that a part of the second light beam is re-emitted from the wavelength conversion element, resulting in the emission of a converted beam having a waveband comprising at least the second waveband, the intensity of the converted beam being non-linear over a range of drive currents for the second laser driver;

the output of the module being a combined light beam of the converted light beam and the first beam so as to generate a combined beam, and wherein the first and second laser drivers are calibrated so as to provide a pre-defined chromaticity of the combined beam over a brightness range, wherein a part of the second light beam directly contributes to light in the first waveband of the combined light beam.

2. The light projection system according to claim 1, wherein the intensity of the converted beam being non-linear over impinging second light beam intensity.

3. The light projection system according to claim 1, wherein the plurality of lasers comprising at least first blue lasers, second lasers are arranged in a first and second laser bank respectively, the first and second laser bank being respectively controlled by the first and second drive current applied by the first and second laser driver dedicated to each laser bank.

4. The light projection system according to claim 3, wherein the plurality of lasers further comprise at least third lasers arranged in a third laser bank, the third laser bank being controlled by a third drive current applied by a third laser driver dedicated to the third laser bank.

5. The light projection system according to claim 1, wherein XYZ tristimulus values, XBT, YBT, ZBT for a blue component of the combined light beam are expressed as the sums of the tristimulus blue values of the first blue and second lasers, each laser being driven by its individually controlled current $I_N$, N=1 ... M, wherein M corresponds to the number of lasers, defined by first equations $$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

wherein $XB_N$, $YB_N$ and $ZB_N$ are the functions expressing the blue tristimulus values emitted by laser N as a function of the input current $I_N$ applied.

6. The light projection system according to claim 5, wherein XYZ tristimulus values, XYT, YYT, ZYT for a yellow or green component of the combined light beam are expressed as a function representing the response of the wavelength conversion element which depends on the sum of the intensities of each laser N exciting the wavelength conversion element, each laser being driven by its individually controlled current $I_N$, N=1 . . . M, defined by second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1$, $f_2$, $f_3$ are non-linear functions and $PB_{i,N}$ are representative of the intensity of the power from the blue lasers impinging on the light conversion element.

7. The light projection system according to claim 1, further comprising a red laser source emitting a third beam in the third waveband, said third red laser source having a third red laser driver, the third beam being combined with the combined beam to further form the combined beam.

8. The light projection system according to claim 7, wherein XYZ tristimulus values, XRT, YRT, ZRT for a red component of the combined light beam are expressed as a function representing the response of the wavelength conversion element which depends on the sum of the intensities of each laser N exciting the wavelength conversion element, each laser being driven by its individually controlled current $I_N$, N=1 . . . M, defined by second equations:

$XRT=XR1(Ir1)+ \ldots +XRn(Irn)+f_4(PB4,1(I_1)+ \ldots +PB4,N(I_N))$ $YRT=YR1(Ir1)+ \ldots +YRn(Irn)+f_5(PB5,1(I_1)+ \ldots +PB5,N(I_N))$ $ZRT=ZR1(Ir1)+ \ldots +ZRn(Irn)+f_6(PB6,1(I_1)+ \ldots +PB6,N(I_N))$ wherein functions $f_4$, $f_5$, $f_6$ are non-linear functions and $PB_{i,N}$ are representative of the intensity of the power from the blue lasers impinging on the light conversion element and wherein $XR_N$, $YR_N$ and $ZR_N$ are the functions expressing the red tristimulus values emitted by red laser N as a function of the input current $I_N$ applied.

9. The light projection system according to claim 8, wherein the XYZ tristimulus values for a red component of the light XRT, YRT, ZRT are pre-defined over a range of brightness levels, and the first, second and third equations are solved for the unknown currents $I_N$, N=1 . . . M, or when grouped $I_N$, N=1 . . . P.

10. A method for calibrating a light projection system emitting a combined light beam, the laser module comprising a laser module a plurality of lasers comprising first blue lasers, and second lasers, a wavelength conversion element for converting incident exciting light into yellow or green light, and a plurality of laser drivers driven by driving currents $I_N$, N=1 . . . M, wherein M corresponds to the number of lasers, wherein the method comprises the steps of:

driving the plurality of laser drivers by the driving currents $I_N$, N=1 . . . M, expressing XYZ tristimulus values, XBT, YBT, ZBT for a blue component of the combined light beam as the sums of the tristimulus blue values of the lasers, each laser being driven by its individually controlled current $I_N$, N=1 . . . M, wherein M corresponds to the number of lasers, according to first equations:

$$XBT = \sum_{N=1}^{M} XB_N(I_N)$$

$$YBT = \sum_{N=1}^{M} YB_N(I_N)$$

$$ZBT = \sum_{N=1}^{M} ZB_N(I_N)$$

and wherein $XB_N$, $YB_N$ and $ZB_N$ are the functions expressing the blue tristimulus values emitted by laser N as a function of the input current $I_N$ applied, expressing the XYZ tristimulus values, XYT, YYT, ZYT for the yellow or green component of the light of the combined light beam as a function representing the response of the wavelength conversion element which depends on the sum of the intensities of each laser N exciting the wavelength conversion element, each laser being driven by its individually controlled current $I_N$, N=1 . . . M, according to second equations:

$$XYT = f_1\left(\sum_{N=1}^{M} PB_{1,N}(I_N)\right)$$

$$YYT = f_2\left(\sum_{N=1}^{M} PB_{2,N}(I_N)\right)$$

$$ZYT = f_3\left(\sum_{N=1}^{M} PB_{3,N}(I_N)\right)$$

wherein functions $f_1$, $f_2$, $f_3$ are non-linear functions and $PB_{i,N}$ are representative of the intensity of the power from the blue lasers impinging on the light conversion element, calculating a correction based on the expressed XYZ tristimulus values, XBT, YBT, ZBT for the blue component and the expressed XYZ tristimulus values, XYT, YYT, ZYT for the yellow or green component of the light of the combined light beam, and calibrating the light projection system based on the correction.

11. The method for calibrating a light projection system according to claim 10, the laser module further comprising red lasers, wherein the method further comprises the steps of expressing XYZ tristimulus values, XRT, YRT, ZRT for a red component of the combined light beam as the sums of the tristimulus red values of the lasers, each laser being driven by its individually controlled current $I_N$, N=1 . . . M, wherein M corresponds to the number of lasers, according to third equations:

$$XRT = XR1(Ir1) + \ldots + XRn(Irn) + f_4(PB4,1(I_1) + \ldots + PB4,N(I_N))$$

$$YRT = YR1(Ir1) + \ldots + YRn(Irn) + f_5(PB5,1(I_1) + \ldots + PB5,N(I_N))$$

$$ZRT = ZR1(Ir1) + \ldots + ZRn(Irn) + f_6(PB6,1(I_1) + \ldots + PB6,N(I_N))$$

wherein functions $f_4$, $f_5$, $f_6$ are non-linear functions and $PB_{i,N}$ are representative of the intensity of the power from the blue lasers impinging on the light conversion element and wherein $XR_N$, $YR_N$ and $ZR_N$ are the functions expressing the red tristimulus values emitted by red laser N as a function of the input current $I_N$ applied.

12. The method according to claim 10, further comprising the step of dividing the plurality of lasers in a plurality of groups P, each group being characterized by the chromaticity of the light of the combined beam it produces, the number of groups P being preferably comprised in the range of 2 to 10, more preferably 3 to 5, and even more preferably 3.

13. The method according to claim 11, further comprising the step of pre-defining the XYZ tristimulus values for the blue component of the light XBT, YBT, ZBT and for the yellow component of the light XYT, YYT, ZYT, and solving the first and second equations for the unknown currents $I_N$, N=1 . . . M, or when grouped $I_N$, N=1 . . . P over a brightness range.

14. The method according to claim 12, further comprising the step of pre-defining the XYZ tristimulus values for the red component of the light XRT, YRT, and solving the third equations for the unknown currents $I_N$, N=1 . . . M, or when grouped $I_N$, N=1 . . . P over a brightness range.

15. A method for calibrating a light projection system comprising a laser module comprising blue lasers, a wavelength conversion element for converting blue light into yellow light, and a plurality of lasers driven by driving currents $I_N$, N=1 . . . M, wherein M corresponds to a number of lasers or groups of lasers driven by driving currents $I_N$, N=1 . . . P, wherein P corresponds to a number of laser groups, and wherein XBT, YBT, ZBT are the tristimulus responses for the blue component of the beam of the projection system and XYT, YYT, ZYT are the tristimulus responses for the yellow component as a function of the driving currents are known, the method comprising the steps of:
- selecting a set of brightness levels within a range,
- deriving the corresponding set of driving currents for each brightness level for each laser source or each laser group,
- driving each laser or laser group with the set of driving currents sequentially for each brightness level,
- measuring the X, Y and Z tristimulus values for the blue and yellow components of the light beam at the set of brightness levels, the combined output of all lasers is measured for the yellow or green and blue components at each brightness level,
- calculating a linear correction comprising a scaling factor and an offset factor to be applied to pre-calibrated $XB_N(I_N)$ and $PB_{i,N}(I_N)$ functions of the different lasers or laser groups.

16. The method according to claim 15, wherein the laser module further comprises red lasers driven by driving currents $I_N$, N=1 . . . M, wherein M corresponds to a number of lasers or groups of lasers driven by driving currents $I_N$, N=1 . . . P, wherein P corresponds to a number of laser groups, and wherein XRT, YRT, ZRT are the tristimulus responses for the red component of the beam of the projection system as a function of the driving currents are known from calibration, the method comprising the steps of:
- selecting a set of brightness levels within a range,
- deriving the corresponding set of driving currents for each brightness level for each laser source or each laser group,
- driving each laser or laser group with the set of driving currents sequentially for each brightness level,
- measuring the X, Y and Z tristimulus values for the red components of the light beam at the set of brightness levels, the combined output of all lasers is measured for the red component at each brightness level,
- calculating a linear correction comprising a scaling factor and an offset factor to be applied to pre-calibrated $XR_N(I_N)$ and $PB_{i,N}(I_N)$ functions of the different lasers or laser groups.

17. The projection system according to claim 1 further comprising a controller.

18. A non-transitory signal storage means storing a computer program product which when executed on a processor carries out the method of claim 10.

19. A non-transitory signal storage means storing a computer program product which when executed on a processor carries out the method of claim 15.

20. The method for calibrating a light projection system according to claim 10, wherein the correction is solved using an algorithm for solving non-linear equations.

* * * * *